United States Patent
Bakaraju

(10) Patent No.: US 12,265,284 B2
(45) Date of Patent: Apr. 1, 2025

(54) APPARATUS AND METHODS OF ANCILLARY SPECTACLE KIT SOLUTION FOR MYOPIA MANAGEMENT

(71) Applicants: Nthalmic Holding Pty Ltd, Sydney (AU); Zhong Jing Wei Shi (Suzhou) Optical Technology Ltd, Suzhou (CN)

(72) Inventor: Ravi Chandra Bakaraju, Sydney (AU)

(73) Assignees: Nthalmic Holding Pty Ltd, Sydney (AU); Zhong Jing Wei Shi (Suzhou) Optical Technology Ltd, Suzhou (CN)

( * ) Notice: Subject to any disclaimer, the term of this patent is extended or adjusted under 35 U.S.C. 154(b) by 342 days.

(21) Appl. No.: 17/799,591

(22) PCT Filed: Feb. 6, 2021

(86) PCT No.: PCT/AU2021/050098
§ 371 (c)(1),
(2) Date: Aug. 12, 2022

(87) PCT Pub. No.: WO2021/159168
PCT Pub. Date: Aug. 19, 2021

(65) Prior Publication Data
US 2023/0085534 A1 Mar. 16, 2023

(30) Foreign Application Priority Data
Feb. 14, 2020 (AU) ................. 2020900413

(51) Int. Cl.
*G02C 7/08* (2006.01)
*G02C 7/06* (2006.01)

(52) U.S. Cl.
CPC ............. *G02C 7/086* (2013.01); *G02C 7/061* (2013.01); *G02C 2202/16* (2013.01); *G02C 2202/24* (2013.01)

(58) Field of Classification Search
CPC .... G02C 7/086; G02C 7/061; G02C 2202/16; G02C 2202/24; G02C 13/005
(Continued)

(56) References Cited

U.S. PATENT DOCUMENTS 7,036,929 B1   5/2006  Harvey
8,950,860 B2 * 2/2015  Tse .................... G02C 7/042
                                                  351/159.41
(Continued)

FOREIGN PATENT DOCUMENTS

AU    2013203024 A1    5/2013
WO    2015151955 A1   10/2015
WO    2018076057 A1    5/2018

OTHER PUBLICATIONS

Extended European Search Report received in European application No. 21754345.3, mailed Apr. 12, 2024.
(Continued)

*Primary Examiner* — William R Alexander
(74) *Attorney, Agent, or Firm* — Cognition IP, P.C.; Edward Steakley

(57) ABSTRACT

The present disclosure relates to means of managing eye-length disorders, like myopia. The invention includes an apparatus and methods for the prescription, selection, supply and fitting of sets, stocks, or kits of pairs of myopia management spectacles, or spectacle fronts, attachable impermanent auxiliary optical films, or mini optical elements, used in conjunction with standard single vision spectacles, said auxiliary optical films, or optical elements possess one or more meridionally and azimuthally variant power distributions resulting in a delta power and said power distributions are devoid of mirror symmetry, wherein the apparatus and methods are configured to provide a conoid of partial blur, or at least one regional conoid of partial blur, at the retina of the myopic eye to decelerate, (Continued)

ameliorate, control, inhibit, or reduce the rate of myopia progression over time, wherein the method is a prescribed care regimen providing temporal and spatial variation to the directional optical cues or stop signals.

14 Claims, 43 Drawing Sheets

(58) Field of Classification Search
USPC .................................................. 351/159.41
See application file for complete search history.

(56) References Cited

U.S. PATENT DOCUMENTS

| | | | | |
|---|---|---|---|---|
| 10,203,522 | B2* | 2/2019 | Bakaraju | G02C 7/02 |
| 10,884,264 | B2* | 1/2021 | Hones | G02C 7/027 |
| 10,921,612 | B2* | 2/2021 | Zhou | G02C 7/022 |
| 2012/0062836 | A1* | 3/2012 | Tse | G02C 7/042 |
| | | | | 351/159.41 |
| 2012/0194780 | A1 | 8/2012 | Back | |
| 2014/0347622 | A1 | 11/2014 | Wu | |
| 2017/0212363 | A1* | 7/2017 | Bakaraju | A61F 2/145 |
| 2017/0336653 | A1 | 11/2017 | Bakaraju | |
| 2018/0157065 | A1* | 6/2018 | Curley | G02C 9/00 |
| 2018/0275427 | A1 | 9/2018 | Lau et al. | |
| 2019/0235279 | A1* | 8/2019 | Hones | G02C 7/10 |
| 2019/0302481 | A1* | 10/2019 | Zhou | G02C 7/088 |

OTHER PUBLICATIONS

International Search Report in PCT International Application No. PCT/AU/2021/050098 mailed Mar. 16, 2021.

* cited by examiner

APPARATUS AND METHODS OF ANCILLARY SPECTACLE KIT SOLUTION FOR MYOPIA MANAGEMENT

CROSS-REFERENCE

This application is a 35 U.S.C. § 371 national stage application of PCT International Application No. PCT/AU2021/050098, filed on Feb. 6, 2021, which claims the benefit of Australian Application No. 2020900413, filed Feb. 14, 2020, which are hereby incorporated by reference in their entirety.

FIELD OF THE INVENTION

The present disclosure relates to means of managing eye-length disorders, like myopia. The invention includes an apparatus and methods for the prescription, selection, supply and fitting of sets, stocks, or kits of pairs of myopia management spectacles or spectacle fronts, wherein the apparatus and methods are configured to provide at least one conoid of partial blur as optical directional cue to decelerate, ameliorate, control, inhibit, or reduce the rate of myopia progression over time, wherein the method is a prescribed care regimen providing temporal and spatial variation to the directional cues or optical stop signals.

The invention further includes an apparatus and methods for the prescription, selection, supply and fitting of sets, stocks, or kits of attachable impermanent auxiliary optical films or elements used in conjunction with standard single vision spectacles used for correcting the refractive error of an individual, wherein the apparatus and methods are configured to provide at least one conoid of partial blur as directional cue to decelerate, ameliorate, control, inhibit, or reduce the rate of myopia progression over time, wherein the method is a prescribed care regimen providing temporal and spatial variation to the directional cues or optical stop signals.

BACKGROUND

Human eyes are hyperopic at birth, where the length of the eyeball is too short for the total optical power of the eye. As the person ages from childhood to adulthood, the eyeball continues to grow until the eye's refractive state stabilises.

The growth of the eye is controlled by a feedback mechanism and regulated predominantly by the visual experience of the world, to match the eye's optics with the eye length and maintain homeostasis. This process is referred to as emmetropisation.

The signals that guide the emmetropisation process are initiated by the modulation of light energy received at the retina. The retinal image characteristics are monitored by a biological process that modulates the signal to start or stop, accelerate, or slow eye growth. This process coordinates between the optics and the eyeball length to achieve or maintain emmetropia. Derailing from this emmetropisation process would potentially result in refractive disorders like myopia. It is hypothesised that increased retinal activity inhibits eye growth and vice versa.

The rate of incidence of myopia is increasing at alarming rates in many regions of the world, particularly in the East Asia region. In myopic individuals, the axial length of the eye is mismatched to the overall power of the eye, leading to the distant objects being focused in front of the retina.

A simple pair of negative single vision lenses can correct myopia. While such devices can optically correct the refractive error associated with eye-length, they do not address the underlying cause of the excessive eye growth in myopia progression.

Excessive eye growth in high degrees of myopia is associated with significant vision-threatening conditions like cataract, glaucoma, myopic maculopathy, and retinal detachment. Thus, there remains a need for specific optical devices for such individuals, that not only correct the underlying refractive error but would also substantially prevent excessive eye lengthening over time.

To date, numerous spectacle lens designs have been proposed to control the rate of myopia progression. The prior art includes the use of executive, D-shaped, and concentric bifocals, symmetric and asymmetric progressive additional lenses, simultaneous defocus regions on the spectacle lenses, and spectacles with positive spherical aberration also referred to as peripheral plus lenses. In other words, all the designs have some degree of addition power related to the prescription power of the lens, distributed either rotationally symmetrically or asymmetrically across the optical axis of the spectacles.

Each of these options has its strengths and weaknesses with respect to retarding the rate of myopia progression in an individual. Some of the weaknesses are described herein.

For example, some problems with the existing spectacle designs that are based on various types of bifocal lenses or peripheral plus power compromise the quality of the vision at various other viewing angles by introducing significant visual disturbances like swing-effects, image-jumps, residual aberrations, peripheral distortions, etc.

These side effects are primarily attributable to the significant levels of multiple defocus regions, multiple defocus zones or segments, or use of significant amounts of positive spherical aberration in the lens, or drastically changing the power within a given zone of the spectacle lens. Given the influence of compliance of spectacle lens wear on the efficacy of such lenses, a significant reduction of visual performance may promote poor compliance, thus resulting in a poorer efficacy with such lenses.

Accordingly, what is needed are spectacle designs for the correction of myopia and retardation of progression, without causing at least one or more of the shortcomings discussed herein.

Further, some of the prior art may not be cosmetically appealing to the children, teenagers, and young adults, for example, the demarcating lines of D-shaped bifocals, executive bifocals, etc. Other solutions will become apparent as discussed herein.

It appears that the approaches disclosed in the prior art for addressing progression of myopia may fall short in one or more ways of serving the needs of an individual to offer effective myopia control solution lenses while functioning effectively for their daily routines. Therefore, the systems involving kits and sets and methods of prescribing the kits and sets for solving problems disclosed herein become desirable.

One of the disadvantages of prior art myopia management spectacles is its associated high access costs setting the entry barrier too high for a common individual in need of the solution. Thus, there is a need for an apparatus and/or a method that provides a budget-friendly solution for the problem of myopia, which can improve the uptake of the solutions by the population in need.

Definitions

Terms are used herein as generally used by a person skilled in the art unless otherwise defined in the following:

The term "myopic eye" means an eye that is either already experiencing myopia, is in the stage of pre-myopia, is at risk of becoming myopic, or is diagnosed to have a refractive condition that is progressing towards myopia.

The term "progressing myopic eye" means an eye with established myopia that is diagnosed to be progressing, as gauged by either the change in refractive error of at least −0.25 D/year or the change in axial length of at least 0.1 mm/year.

The term "pre myopic" or "an eye at risk of becoming myopic" means an eye, which could be emmetropic or is low hyperopic at the time but has been identified to have an increased risk of becoming myopic based on genetic factors (e.g., both parents are myopic) and/or age (e.g., being low hyperopic at a young age) and/or environmental factors (e.g., time spent outdoors) and/or behavioural factors (e.g., time spent performing near tasks).

The term "optical stop signal" or "stop signal" means an optical signal or directional cue that may facilitate slowing, reversing, arresting, retarding, inhibiting, or controlling the growth of an eye and/or refractive condition of the eye.

The term "spatially varying optical stop signal" means an optical signal or a directional cue, provided at the retina, which changes spatially across the retina of the eye. The term "temporally varying optical stop signal" means an optical signal or a directional cue, provided at the retina, which changes with time. The term "temporally and spatially varying optical stop signal" means an optical signal or a directional cue, provided at the retina, which changes with time and spatially across the retina of the eye.

The term "through-focus" generally refers to the space-dimension in front and/or behind the retina, usually measured in image space, in millimetres. However, in some embodiments, a surrogate measure of "through-focus" term referred in the object space and measured in Dioptres or Diopters, generally refers to the same thing, as disclosed herein.

The term "spectacle lens" may mean a finished or semi-finished blank lens. The term "standard single vision spectacle lens" or "commercially available single vision spectacles" "standard spectacles" or "habitual single vision" means spectacle lenses used to correct the underlying refractive error of the eye; wherein the refractive error may be myopia, with or without astigmatism.

The term "myopia management spectacle lens" or "myopia management spectacles" means spectacle lenses used to not only correct the underlying refractive error of the eye but also manage the progression of refractive error; wherein the refractive error may be myopia, with or without astigmatism.

The term "optical zone" or "optic zone" means the region on the myopia management spectacle lens or spectacle front which has the prescribed optical effect. The term "optical centre" means the geometric centre of the optical zone of the spectacle lens. The term "optical axis" means line passing through the optical centre and substantially perpendicular to the plane containing the edge of the spectacle lens. The term or phrase "spherical optical zone" may mean that the optical zone has a uniform power distribution with or without spherical aberration. The term or phrase "non-spherical optical zone" may mean that the optical zone does not have uniform optical power distribution. The non-spherical optical zone may be further classified into the non-spherical optical zone with lower order aberrations like astigmatism or higher-order aberrations like coma, trefoil, and spherical aberration. The terms or phrases "astigmatic optical zone" or "toric optical zone" may mean that the optical zone has sphero-cylindrical power distribution.

The term "radial" means in the direction radiating out from the optical centre to the edge of the optic zone, defined along an azimuthal angle. The phrase "radial spoke" means a spoke radiating outward from the centre to the end of the optic zone, at a predetermined azimuthal angle.

The phrase "radial power distribution" means the one-dimensional power distribution of localised optical power across an arbitrary radial spoke, as disclosed herein.

The phrase "radially invariant power distribution" means an arbitrary radial spoke having a substantially uniform power distribution, as disclosed herein.

The phrase "radially variant power distribution" means an arbitrary radial spoke having a substantially non-uniform power distribution, as disclosed herein.

The term "meridian" means two opposing radial spokes spread across a predetermined azimuthal angle on the optical zone, as disclosed herein.

The phrase "meridional power distribution" means the one-dimensional power distribution of localised optical power across an arbitrary meridian across the optic zone, as disclosed herein.

The phrase "meridionally invariant power distribution" means an arbitrary meridian having a substantially uniform power distribution, as disclosed herein. The phrase "meridionally variant power distribution" means an arbitrary meridian having a substantially non-uniform power distribution, as disclosed herein.

The phrase "meridional power distribution with mirror symmetry" means an arbitrary meridian having substantially same power distributions across its two opposing radial spokes.

The phrase "meridional power distribution devoid of mirror symmetry" means an arbitrary meridian having two substantially different power distributions across its two opposing radial spokes.

The terms "azimuth or azimuthal angles" mean in the direction along the circumference of the optic zone about the optical axis, defined at an arbitrary radial distance.

The phrase "azimuthal power distribution" means the one-dimensional power distribution of localised optical power across arbitrary azimuthal angles measured at a given radial distance about the optical axis.

The phrase "azimuthally invariant power distribution" means that the azimuthal power distribution has a substantially uniform power distribution, as disclosed herein.

The phrase "azimuthally variant power distribution" means that the azimuthal power distribution has a substantially non-uniform power distribution, as disclosed herein.

The phrase "azimuthal power distribution with mirror symmetry" means that the azimuthal power distribution between 0 and $\pi$ radians is substantially similar to the azimuthal power distribution between $\pi$ and $2\pi$ radians, as disclosed herein.

The phrase "azimuthal power distribution devoid of mirror symmetry" means that the azimuthal power distribution between 0 and $\pi$ radians is substantially different to the azimuthal power distribution between $\pi$ and $2\pi$ radians, as disclosed herein.

The term "model eye" may mean a schematic, raytracing, or a physical model eye.

The terms "Diopter", "Dioptre" or "D" as used herein is the unit measure of dioptric power, defined as the reciprocal of the focal distance of a lens or an optical system, in meters, along an optical axis. The term "DS" signifies spherical dioptric power, and term "DC" signifies cylindrical dioptric power.

The terms "conoid of Sturm" or "interval of Sturm" means the resultant through-focus image profile formed on or about the retina due to the induced astigmatic, or toric, or asymmetric, power profile employing a myopia management spectacle lens, or a spectacle front, or an optical film, or a mini optical element, represented as elliptical blur patterns including the sagittal and tangential planes, and a circle of least confusion.

The terms "conoid of partial blur" or "interval of partial blur" means the resultant through-focus retinal image formed due to the introduced meridionally and azimuthally variant power distributions within the optic zone, represented with irregular blur patterns with sagittal and tangential planes.

The term "power profile" means the one-dimensional power distribution of localised optical power across a myopia management spectacle lens or spectacle front, either as a function of radial distance at a given azimuthal angle with the optical centre as a reference; or as a function of an azimuthal angle measured at a given radial distance.

The term "power map" means the two-dimensional power distribution of a myopia management spectacle lens or spectacle front in cartesian or polar coordinates.

The term "radial" in context of describing a myopia management spectacle lens or spectacle front means in the direction radiating out from the optical centre of the spectacle lens or spectacle front, defined along an azimuthal angle. The term "azimuthal" in the context of describing a myopia management spectacle lens or spectacle front means in the direction circumferential about the optical centre of the spectacle lens or spectacle front defined at a radial distance.

The term "power map of the optical film" means the two-dimensional power distribution across substantially the entire optical film used in conjunction with standard single vision spectacle lens.

The term "power map of the mini optical element" means the two-dimensional power distribution across the mini optical element in cartesian or polar coordinates, which may be circular or elliptical.

The term "radial" in context of describing the mini optical element means in the direction radiating out from the geometric centre of the mini optical element, defined along an azimuthal angle. The term "azimuthal" in the context of describing mini optical element means in the direction circumferential along the geometric centre of optical film or mini optical element defined at a radial distance.

The term "back vertex power" means the reciprocal of back vertex focal length over the entire or a specified region over the optical zone, expressed in Dioptres (D).

The terms "SPH" or "Spherical" power means substantially uniform power between all meridians of the optic zone.

The terms "CYL", "Cylinder" power means the difference in back vertex powers between the two principal meridians within the optical zone.

The terms "Delta power" means the difference between the maximum and the minimum powers within the pluralities of the meridionally varying power distributions across the optic zone and azimuthally varying power distributions about the optical axis.

The terms "base prescription for correcting the refractive error" means the standard spectacle prescription required to correct underlying myopia in an individual, with or without astigmatism.

The term "sub-foveal region" means the region immediately adjacent to the foveal pit of the retina, approximately a region of 0.5 mm diameter. The term "foveal region" means approximately a region of 1.5 mm diameter about the foveal pit.

The term "parafoveal region" means the region adjacent to the foveal region, approximately outside the 1.5 mm and within 3 mm diameter about the foveal pit.

The term "para macular region" means the region the region immediately adjacent to the foveal region, approximately outside the 1.5 mm and within 3 mm diameter about the foveal pit.

The phrases "specific care regimen", "wearing care regimen", "wearing schedule", "care regimen" mean the prescribed method purposefully aimed at providing a temporal and spatial variation to the optical stop signals provided by the kit or set of myopia management devices disclosed herein, with the specific aim to maintain the efficacy to reduce the progression of eye growth substantially consistent over time. The wearing care regimen includes the set of instructions relating to the application of the various embodiments on the spectacle lens, as disclosed herein.

SUMMARY OF THE INVENTION

Certain disclosed embodiments are directed towards apparatus, supply and configuration of sets and kits comprising pairs of myopia management spectacles or pairs of spectacle fronts used in conjunction with pairs of standard single vision spectacle lenses, and methods of use of the said sets and kits of pairs of spectacles or spectacle fronts for correcting and managing myopia.

Certain disclosed embodiments are directed towards apparatus, supply and configuration of sets and kits of impermanent auxiliary optical films, sheets, or mini optical elements used in conjunction with standard single vision spectacle lenses, and methods of use of the said sets and kits of impermanent auxiliary optical films, sheets, or mini optical elements in conjunction with standard single vision spectacle lenses for correcting and managing myopia. Certain disclosed embodiments are aimed to both correct the myopic refractive error and simultaneously provide directional cues serving as optical stop signals to reduce the progression of eye growth; certain methods of the disclosure include care regimen to provide temporal and spatial variation to the optical stop signals; such that the efficacy to reduce the progression of eye growth remains substantially consistent over time.

Certain disclosed embodiments consist of methods involving the sets or kits of pairs of myopia management spectacles lenses, or pairs of spectacle fronts, impermanent auxiliary optical films, sheets or mini optical elements to be used in conjunction with standard single vision spectacle lenses, wherein the method involves selection, prescription, fitting and use of the apparatus from the set or kit under a prescribed care regimen, wherein the prescribed care regimen provides temporally and spatially varying optical stop signal, for example, at least one conoid of partial blur, on the central and/or peripheral retinal region of an eye. In some examples, the method may include a prescribed care regimen that offers the temporally varying or time changing optical stop signal to vary in an hourly, daily, weekly, or monthly pattern. In other examples, the methods may include a prescribed care regimen that offers the temporally varying or time changing optical stop signal to vary in a more regular or a more irregular pattern, once in every day for the following week, once in two days for the following week, once in three days, or once in four days.

In some examples, the methods may include a prescribed care regimen that offers the spatially varying or space-changing optical stop signal to vary within at least 2.5 degrees, 5-degrees, 10-degrees, 15-degrees, or 20-degrees, or 30-degrees visual field of the wearer. In other examples, the methods may include a prescribed care regimen that offers the spatially varying stop signal to vary in more than one desirable retinal regions.

Certain other disclosed embodiments are directed to the ongoing need for enhanced spectacle designs that may inhibit the progression of myopia substantially consistent over time while providing reasonable and adequate visual performance to the wearer for a range of activities that the wearer may undertake as a daily routine. Various aspects of the embodiments of the present invention disclosure address such needs of a wearer.

Certain disclosed embodiments include a set or kit of at least two, three, four or five pairs of myopia management spectacles, or pairs of spectacle fronts to be used in conjunction with standard single vision spectacle lenses, each pair purposefully configured with one or more meridionally and azimuthally variant power distributions, wherein at least one of the meridionally and azimuthally variant power distribution is devoid of mirror symmetry, in addition to the base prescription required to correct the refractive error, wherein the configured pair of myopia management spectacles, or the pair of spectacle fronts used in conjunction with standard single vision spectacle lenses, results at least in part, in a foveal correction of the myopic eye and, at least in part, results in a conoid of partial blur at the retina of the myopic eye that inhibits further eye growth or progression of myopia for the wearer. When the said set or kit of myopia management spectacles, or the pairs of spectacle fronts used in conjunction with standard single vision spectacle lenses, is worn under a prescribed care regimen it provides a temporally and spatially varying stop signal on the central and/or peripheral retina. In one example, the set or kit of pairs of myopia management spectacles, or the pairs of spectacle fronts used in conjunction with standard single vision spectacle lenses, is configured such that the meridionally and azimuthally variant power distributions are substantially different between each pair of myopia management spectacles, or each pair of spectacle fronts, of the said set or kit.

The present disclosure relates to spectacles for managing eye-length disorders, like myopia. The proposed methods include correcting the myopic refractive error and controlling, inhibiting, or reducing the rate of myopia progression substantially consistent over time using a myopia management spectacle lens kit or set prescribed under a specific care regimen. The present disclosure relates to a set or kit of optical interventions that utilise the effects of a conoid of partial blur in at least one region of the retina to reduce myopia progression. This disclosure also relates to methods of the introduction of a conoid of partial blur that may serve as a temporally and spatially varying stop signal to the myopic eye. The present disclosure relates to an apparatus and methods relating to a myopia management set or kit that is purposefully configured and prescribed under a care regimen for reducing the rate of myopia progression in a wearer substantially consistent over time.

Certain embodiments of the present disclosure are directed towards devices, methods and/or systems of modifying the incoming light through spectacle lenses that utilise directional cues, i.e., a conoid of partial blur, imposed at least on one region of the retina to decelerate the rate of myopia progression. In some embodiments, the region or regions of the retina imposed with a conoid of partial blur may be imposed at the fovea, parafoveal, macular and/or the paramacular region of the retina. In some embodiments, the region or regions of the retina imposed with a conoid of partial blur may be in the temporal, nasal, inferior, and/or superior portion of the retina.

Certain embodiments of the present disclosure are directed towards devices, methods and/or systems, that consist of a set or kit of spectacles, including at least two pairs, three pairs, four pairs, or five pairs of spectacles, or spectacle fronts that are prescribed under a prescribed care regimen, to provide a temporally and spatially varying stop signal to retard the rate of myopia progression; such that the efficacy of myopia management remains substantially consistent over time.

Certain embodiments of the present disclosure are directed towards methods including procedures for the prescription, selection, fitting and supply of sets, stocks or kits of pairs of spectacles, or pairs of spectacle fronts, auxiliary optical films/sheets, or auxiliary mini optical elements used in conjunction with standard single vision spectacle lenses, configured to provide a conoid of partial blur, i.e., a stop signal, to decelerate the rate of myopia progression. Certain embodiments of the disclosure are directed towards an apparatus and methods, including an optical film for converting a standard single vision spectacle lens for correction of myopia to a myopia management spectacle lens for both the correction of myopia and retarding, decelerating, reducing and/or managing the progression of myopia; wherein the optical film may be configured on the standard single vision spectacle lens using a desired power profile variation across the optical film. In some embodiments, the power profile of the optical film may be different in different regions of the optical film, such that when the optical film is configured on or adhered to the single vision spectacle lens, it provides a conoid of partial blur for at least one specific region of the retina of the wearer to reduce the rate of myopia progression. The desired power profile variation in an optical film may be configured by varying the thickness profile of the optical film.

In some examples, the specific region or regions of the retina for introducing a conoid of partial blur may be in the nasal, temporal, superior, and/or inferior portion of the retina. In some other examples, other retina locations may be identified. In some other embodiments, the one specific region or regions of the retina of the wearer for introducing a conoid of partial blur may be in the sub-foveal, foveal, parafoveal, macular, and/or paramacular region of the retina.

In some other embodiments, the one specific region or regions of the retina of the wearer for introducing a conoid of partial blur may be at least within 2.5 degrees, 5 degrees, 10 degrees, 15 degrees, 20 degrees, or 25 degrees of the visual field. The specific region or regions of the retina may be different between the left and right eyes of the wearer. In some examples, the differences may be configured as differences in size, orientation and/or location of the optical stimulus. In other examples, the differences may be chosen such that at least one eye would maintain adequate visual performance comparable to that of a standard single vision lens at any given angle.

In some embodiments, the contemplated optical film or sheet may cover the entire standard single vision spectacle lens; while in other embodiments, the optical film embodiment may only be configured in a specific region on the spectacle lens. In certain other embodiments of the present disclosure, a kit or set of optical films is provided such that the desired optical features are configured to offer a temporally and spatially varying stop signal to the wearer when used under a prescribed care regimen. Certain examples may include optical films configured to provide the wearer with the desired conoid of partial blur that is configured in elliptical shape, circular shape or an irregular shape. In some other examples, the prescribed method may involve the use of an optical film or sheet that starts degrading after a certain wear time or period to aid compliance to the care regimen.

The present invention is directed to the provision of a kit or set including a plurality of attachable impermanent auxiliary mini optical elements, each of the mini optical elements to be used individually, in conjunction with a standard single vision spectacle lens prescribed for the correction of myopia in a wearer, a prescribed method providing a period and/or manner of use; wherein each of the mini optical elements is substantially configured with one or more meridionally and azimuthally variant power distributions, wherein at least one of the meridionally and azimuthally variant power distribution is devoid of mirror symmetry, and when the at least one mini optical element used in conjunction with the standard single vision spectacle lens results at least in part, in a foveal correction of the myopic eye and, at least in part, results in a regional conoid of partial blur, or optical stop signal, within the desired location of the retina of the wearer's eye; wherein the prescribed period and prescribed method provides a temporally and spatially varying optical stop signal to control the rate of eye growth of the myopic eye of the wearer; such that the efficacy of myopia management remains substantially consistent over time.

In some embodiments of the disclosure, the individual attachable impermanent auxiliary mini optical elements of the aforementioned kit or set, configured with desired meridionally and azimuthally variant power distribution, may be either glued onto the standard single vision spectacle lens, or is made to adhere with finger pressure to the standard single spectacle lens, or may be used as a sticker on one of the surfaces of the standard single vision spectacle lens, or may be used as a peel-able adhesive on one of the surfaces of the standard single vision spectacle lens, or a combination thereof.

In some other examples, the prescribed method providing a manner of use may include identification of certain specific locations on the base spectacle lens and marking these locations with tiny embossing or miniature engravings within the matrix of the standard single vision spectacle lens to allow the user to periodically vary the positioning of the impermanent auxiliary mini optical elements to be placed on the base spectacle lens as prescribed in a care regimen.

In some embodiments of the disclosure, the pairs of spectacle fronts provided in the aforementioned kit to be used in conjunction with standard single vision spectacle lenses may be screwed onto, hooked onto, or adhered onto using a magnetic mechanism to the frame of the standard single-vision spectacles.

In some embodiments of the disclosure, the individual attachable impermanent auxiliary mini optical element configured with the desired meridionally and azimuthally variant power distribution may be configured using a clear, elastic, thin, conformable material and may be implemented as a sticker on a standard single vision spectacle lens aimed to correct refractive errors, for example, myopia with or without astigmatism.

In some embodiments of the disclosure, the individual attachable impermanent auxiliary mini optical element configured with the desired meridionally and azimuthally variant power distribution, configured as one or more stickers on the standard single vision spectacle lens aimed to correct myopia may cover only a regional portion of the spectacle lens. In some examples, the regional portion of the spectacle lens covered by the said sticker may have a surface area of at least 3 mm$^2$, at least 4 mm$^2$, at least 5 mm$^2$, at least 6 mm$^2$, at least 7 mm$^2$, at least 8 mm$^2$ or at least 10 mm$^2$.

DETAILED DESCRIPTION

Figure 1:
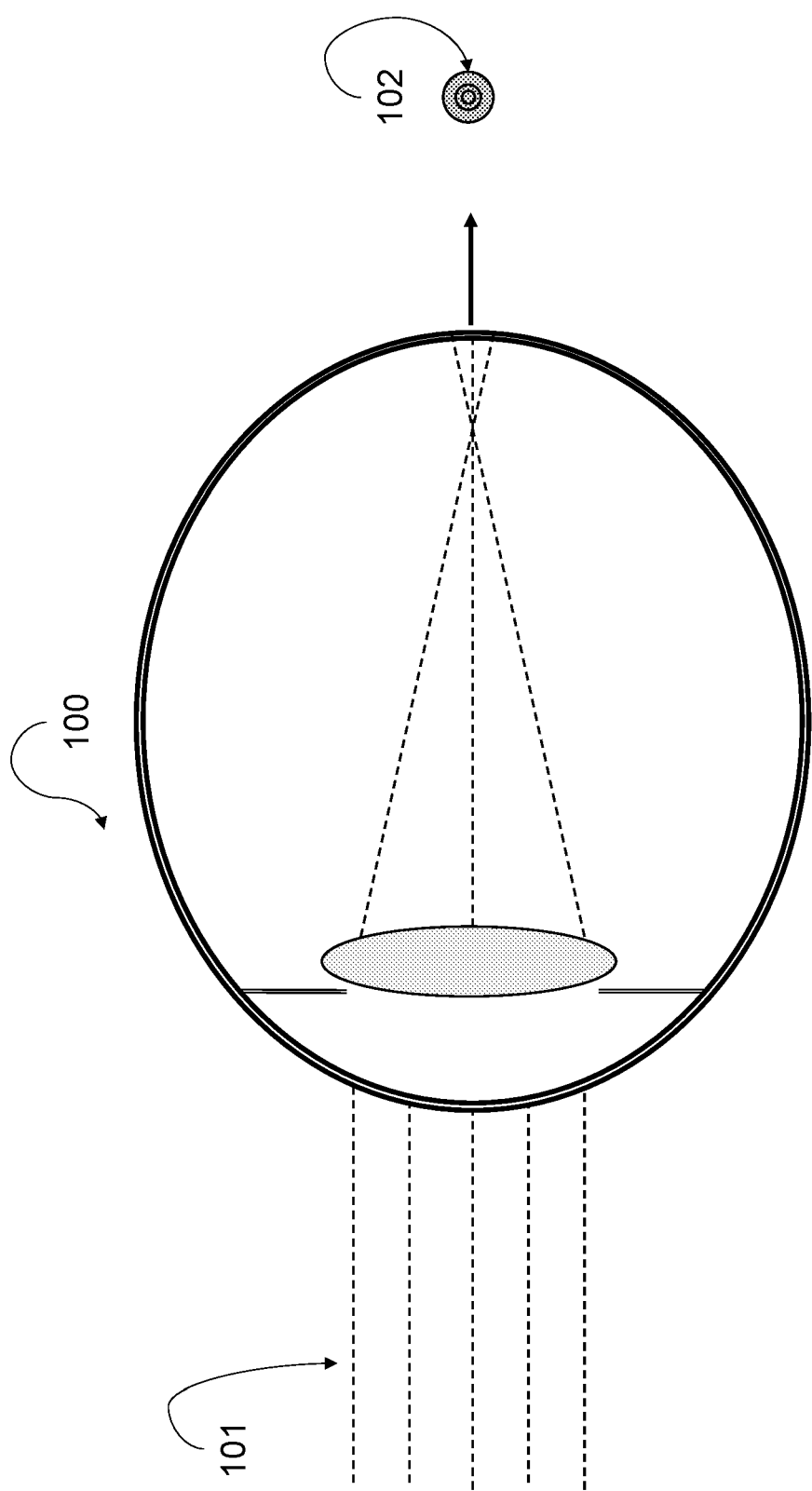
FIG. 1 illustrates a schematic diagram of an on-axis, geometric spot analysis at the retinal plane, when the incoming light, with a visible wavelength (for example, 589 nm) and a vergence of 0 D, is incident on an uncorrected −3 D myopic model eye.

The efficacy rates of the prior art spectacle designs are established through randomised control clinical trials. The duration of these trials including spectacle designs range between 6 months and 3 years and the reported efficacy ranges between 10% and 50% when compared to the single vision control lenses.

A simple linear model of emmetropisation suggests that the magnitude of a stop signal accumulates over time. In other words, the accumulated stop signal depends on the total magnitude of exposure and not its temporal distribution.

A striking observation in all clinical trials is the fact that almost all the slowing effect on the rate of progression occurs as an initial burst of the treatment-effect observed in the first 6 to 12 months and seem to fade away with time. So, a more faithful model of emmetropisation to line up with the clinical results suggests that there may be a delay before the stop signal builds, then saturation occurs with time and perhaps a decay in the effectiveness of the stop signal.

There is a need in the art for spectacle lenses that avoids or minimises this saturation effect by providing a temporarily and spatially varying stop signal to retard the rate of myopia progression, for example, with a prescribed care regimen that requires switching of pairs of myopia management spectacle lenses from a set or kit, or switching pairs of myopia management spectacle fronts or impermanent auxiliary optical films, sheets, or mini optical elements used in conjunction with standard single vision spectacle lenses during a prescribed period. In addition to the pairs of spectacle lenses from a set or a kit prescribed under a care regimen, this disclosure also describes the use of auxiliary spectacle fronts and/or impermanent optical films and mini optical elements of a set or a kit to be used in conjunction with standard pair of spectacle lenses prescribed under a care regimen.

Accordingly, there exists a need for optical interventions with a mechanism to achieve substantially greater, and/or substantially consistent, efficacy over time in reducing and/or slowing myopia progression without significantly compromising visual performance. In one or more examples, the substantially consistent efficacy over time may be considered to be at least 6, 12, 18, 24, 36, 48 or 60 months.

In this section, the present disclosure will be described in detail with reference to one or more embodiments, some are illustrated and supported by accompanying figures. The examples and embodiments are provided by way of explanation and are not to be construed as limiting to the scope of the disclosure. The following description is provided in relation to several embodiments that may share common characteristics and features of the disclosure. It is to be understood that one or more features of one embodiment may be combined with one or more features of any other embodiments which may constitute additional embodiments. The functional and structural information disclosed herein is not to be interpreted as limiting in any way and should be construed merely as a representative basis for teaching a person skilled in the art to employ the disclosed embodiments and variations of those embodiments in various ways. The sub-titles and relevant subject headings used in the detailed description section have been included only for the ease of reference of the reader and in no way should be used to limit the subject matter found throughout the invention or the claims of the disclosure. The sub-titles and relevant subject headings should not be used in construing the scope of the claims or the claim limitations.

Risk of developing myopia or progressive myopia may be based on one or more of the following factors: genetics, ethnicity, lifestyle, environmental, excessive near work, etc.

Certain embodiments of the present disclosure are directed towards a person at risk of developing myopia or progressive myopia.

One or more of the following advantages are found in one or more of the disclosed optical devices, and/or methods of the myopia management kit. A kit or set of pairs of myopia management spectacle lenses or spectacle fronts, impermanent auxiliary optical films, sheets, or mini optical elements used in conjunction with standard single vision spectacle lenses or method providing a stop signal to retard the rate of eye growth or stop the eye growth (or the state of refractive error) of the wearer's eye based on at least one conoid of partial blur signal.

A kit or set of pairs of myopia management spectacle lenses or spectacle fronts, impermanent auxiliary optical films, sheets, or mini optical elements used in conjunction with standard single vision spectacle lenses or method providing a temporally and spatially varying stop signal for increasing the effectivity of managing progressive myopia. The current invention contemplates apparatus and/or methods that are not based on positive spherical aberration, or simultaneous defocus, which suffers from saturation effects of efficacy due to rotational symmetry of the optical stop signal.

FIG. 1 shows an uncorrected −3 D myopic model eye (100). When incoming light (101) of a visible wavelength (for example, 589 nm) of a vergence 0 D, is incident on the uncorrected myopic eye, the resultant image on the retina has a symmetrical blur (102) caused by defocus. This schematic diagram represents an on-axis, geometric spot analysis at the retinal plane.

Figure 2:
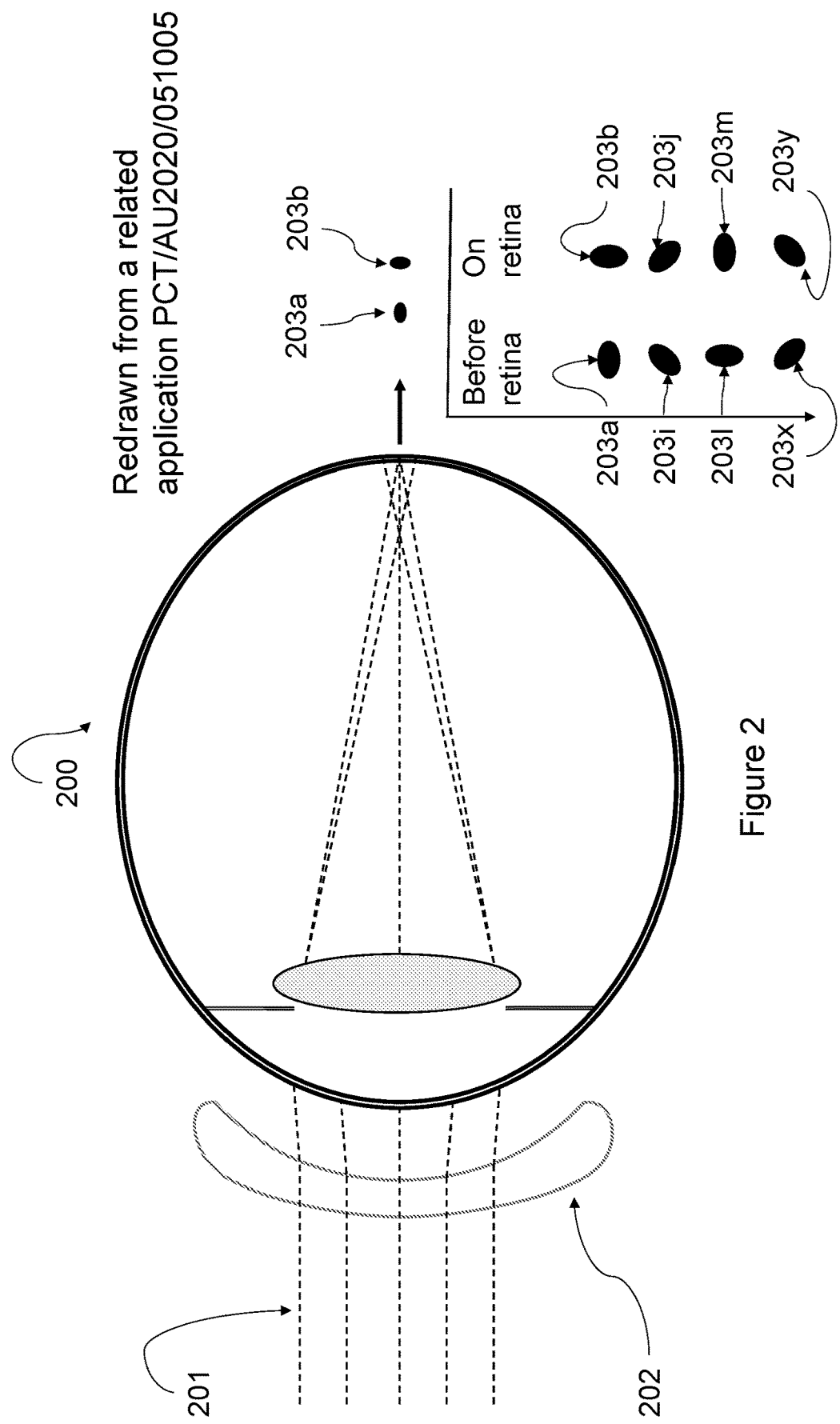
FIG. 2 illustrates a schematic diagram of an on-axis, through-focus geometric spot analysis at the retinal plane, when the incoming light, with a visible wavelength (589 nm) and a vergence of 0 D, is incident on a −3 D myopic model eye corrected with one of the spectacle lens embodiments of a kit or set as previously disclosed in PCT/AU2020/051005.

FIG. 2 shows the schematic diagram of an on-axis, geometric spot analysis at the retinal plane when the −3 D myopic model eye (200) of FIG. 1 is corrected with one of the spectacle lens embodiments of a kit or set as previously disclosed in a related application PCT/AU2020/051005 (202). Here in this example, when the incoming light (201) of a visible wavelength (for example, 589 nm) of a vergence 0 D, is incident on the corrected myopic eye, the resultant through-focus images on the retina form a conoid or interval of Sturm having the least circle of confusion in between 203a and 203b and elliptical blur patterns with sagittal and tangential planes (203a and 203b). The use of the kit of spectacle lenses as disclosed in PCT/AU2020/051005 offers spatially and temporally varying astigmatic cues (i.e. stop signal) at the retina of the eye (203a and 203b, 203i and 203j, 203l and 203m, and 203x and 203y).

Figure 3:
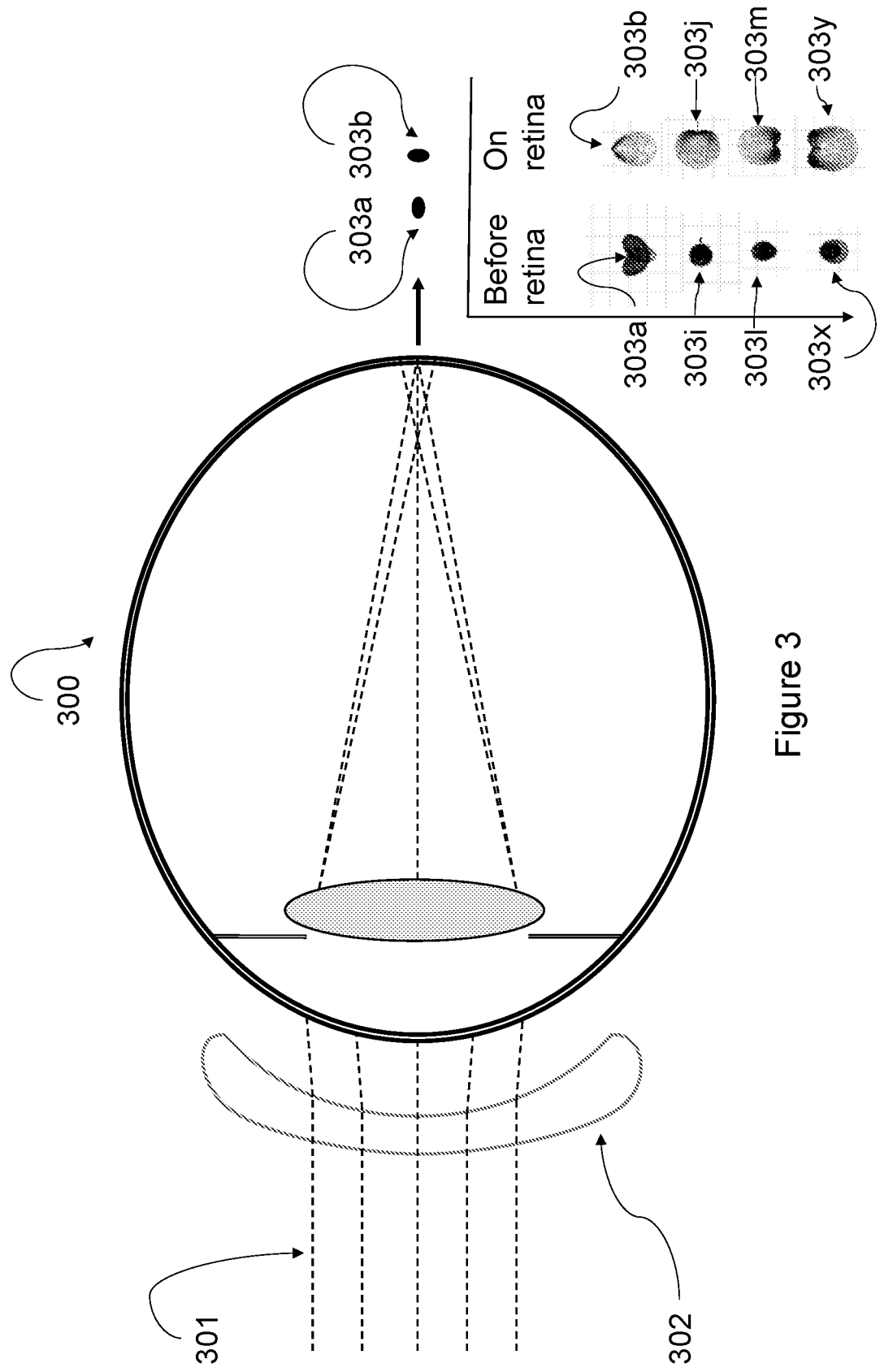
FIG. 3 illustrates a schematic diagram of an on-axis, through-focus geometric spot analysis at the retinal plane, when the incoming light, with a visible wavelength (589 nm) and a vergence of 0 D, is incident on a −3 D myopic model eye corrected with one of the myopia management spectacle lens embodiments of a kit or set disclosed herein.

FIG. 3 shows the schematic diagram of an on-axis, through-focus, geometric spot analysis at the retinal plane when the −3 D myopic model eye (300) of FIG. 1 is corrected with one of the exemplary embodiments (302) disclosed herein. Here in this example, when the incoming light (301) of a visible wavelength (for example, 589 nm) of a vergence 0 D, is incident on the corrected myopic eye (300), the resultant through-focus images on the retina form a partial conoid or interval of blur having irregular blur patterns with sagittal and tangential planes (303a and 303b). The use of the myopia management kit of spectacle lenses as disclosed herein offers spatially and temporally varying optical stop signal with at least one conoid of partial blur at the retina of the eye (303a and 303b, 303i and 303j, 303l and 303m, and 303x and 303y).

The improvements contemplated in the current disclosure over the related PCT/AU2020/051005 is two-fold. (i) although the regular toric or astigmatic power distribution contemplated in PCT/AU2020/051005 results in a desired spatial and temporal variation in optical performance, it may demand a greater visual compromise for some individuals. To account for this limitation, the current disclosure contemplates azimuthally and meridionally varying power distributions that provide a more balanced optical performance while maintaining the desired spatial and temporal variation; (ii) the use of embodiments disclosed in PCT/AU2020/051005 results in optical signals which are restricted only to a conoid of sturm, that is, creating respective sagittal and tangential elliptical blur patterns on the retina. On the contrary, the current disclosure provides several conoid of partial blur patterns on the retina due to numerous permutations and combinations of azimuthally and meridionally varying power distributions. This in turn create numerous different irregular patterns of partial blur comprising various spatial features that contribute towards a greater variability within the spatial and temporal optical stop signals, which may be more desirable in some individuals.

Certain exemplary embodiments are directed to methods of modifying the incoming light through a spectacle lens system that offers the standard prescription used for correction of myopia and at least one conoid of partial blur (i.e., stop signal) at the retina of the eye. A conoid of partial blur may be achieved by using one or more meridionally and azimuthally variant power distributions, wherein at least one of the meridionally and azimuthally variant power distribution is devoid of mirror symmetry. In short, the use of meridionally and azimuthally varying power distributions may be used to reduce the rate of myopia progression by introducing at least one conoid of partial blur (i.e., stop signal) at the retinal level. In certain embodiments, the use of at least one conoid of partial blur obtained with a myopia management kit may be configured to provide temporally and spatially varying stop signals.

A schematic model eye (Table 1) was chosen for illustrative purposes in FIGS. 1 to 3. However, in other exemplary embodiments, schematic raytracing model eyes like Liou-Brennan, Escudero-Navarro and others may be used instead of the above simple model eye. One may also alter the parameters of the cornea, lens, retina, ocular media, or combinations thereof, to aid further simulation of the embodiments disclosed herein. The examples provided herein have used a −3 D myopic model eye to disclose the present invention, however, the same disclosure can be extended to other degrees of myopia, for example, −1 D, −2 D, −5 D or −6 D. Further, it is understood that the scope of the invention can be extended to eyes with varying degrees of myopic refractive error, with or without astigmatism.

In the example embodiments, reference was made to a specific wavelength of 589 nm, however, it is understood that a person skilled in the art can draw extension to other visible wavelengths between 420 nm and 760 nm. Specific structural and functional details disclosed in these figures and examples are not to be interpreted as limiting, but merely as a representative basis for teaching a person skilled in the art to employ the disclosed embodiments in numerous variations.

Certain embodiments of the present disclosure are directed to a myopia management kit or set that may provide a temporally and spatially varying, in other words varying with retinal location over time, stop signal to the progressing myopic eye, achieved with the help of a prescribed wearing regimen. This temporally and spatially varying stop signal may minimise the implicit saturation effects of efficacy that are observed in the prior art.

In certain embodiments, the portion with one or more meridionally and azimuthally variant power distributions, wherein at least one of the meridionally and azimuthally variant power distribution is devoid of mirror symmetry of a myopia management spectacle lens or a spectacle front when used in conjunction with standard single vision spectacle lens provides at least in part, a foveal correction for a myopic eye and at least in part, produces a temporally and spatially varying stop signal, i.e., at least one conoid of partial blur, on the central and/or peripheral retinal region of an eye, to reduce the rate of myopia progression when worn under a care regimen. In certain embodiments, the induced depth of the conoid of partial blur (i.e., stop signal) configured within the pairs of myopia management spectacle lenses or spectacle lens fronts used in conjunction with standard single vision spectacle lenses of a kit or set may be at least +0.5 DC, +0.75 DC, +1 DC or +1.25 DC. In certain embodiments, the induced depth of the conoid of partial blur configured within the pairs of myopia management spectacle lenses or spectacle lens fronts used in conjunction with standard single vision spectacle lenses of a kit or set may be between +0.5 DC and +1.75 DC, +0.5 DC and +2 DC, or +0.5 DC and +2.5 DC.

Figure 4:
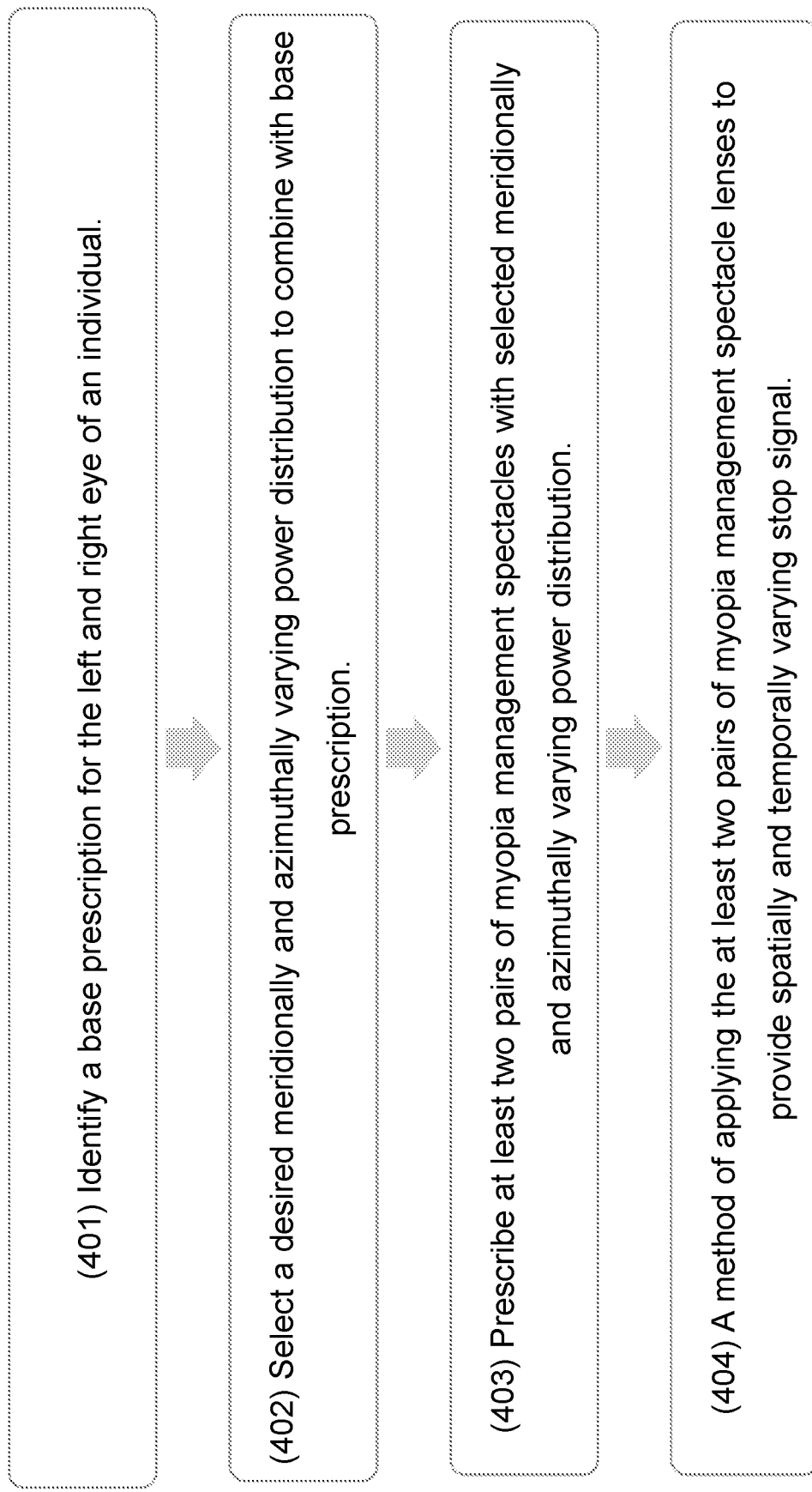
FIG. 4 illustrates a flow diagram for an exemplary method of prescribing myopia management spectacle lens kit or set, for reducing, inhibiting, or controlling the rate of progression of myopia for an individual according to an exemplary aspect of the disclosure.

FIG. 4 illustrates a flow diagram for an exemplary method of prescribing the disclosed myopia management spectacle lens kit or set, for reducing, inhibiting, or controlling the rate of progression of myopia for an individual according to an exemplary aspect of the disclosure.

In this example, the base prescription for the left and right eyes of an individual is identified by performing an optimal objective or subjective refraction for each eye of the individual (401).

Select an appropriate meridionally and azimuthally varying power distribution to be combined with the base prescription for at least two pairs of myopia management spectacles for the individual (402).

The at least two pairs of myopia management spectacles are configured to provide at least in part a foveal correction for the myopic eye and at least in part, provide a conoid of partial blur at the retina of the myopic eye to serve as an optical signal to the eye (403).

Further, the method of use of the at least two pairs of myopia management spectacle lenses prescribed under a care regimen provides a spatially and temporally varying stop signal to the eye (404).

In some examples, the appropriate depths of the conoid of partial blur configured within the pairs of myopia management spectacle lenses used in conjunction with standard single vision spectacle lenses of a kit or set may be at least +0.5 D, +0.75 D, +1 D, +1.25 D or +1.75 D.

In some examples, the appropriate depths of the conoid of partial blur configured within the pairs of myopia management spectacle lenses used in conjunction with standard single vision spectacle lenses of a kit or set may be between +0.5 D and +1.75 D, +0.5 D and +2 D, or +0.5 D and +2.25 D.

In some examples, the appropriate differences of axes orientations (i.e., the axes of the flattest half-meridian) of the individual spectacle lenses of the pairs of myopia management spectacle lenses may be at least 15 degrees, 30 degrees, 45 degrees, 60 degrees or 75 degrees.

In some examples, the appropriate differences of axes orientations (i.e., the axes of the flattest half-meridian) of the individual spectacle lenses of the pairs of myopia management spectacle lenses may be between 15 and 30 degrees, 30 to 60 degrees, 45 to 75 degrees, 60 and 90 degrees, 15 and 90 degrees.

To demonstrate the effects of other embodiments, other schematic model eyes like Atchison, Escudero-Navarro, Liou-Brennan, Polans, Goncharov-Dainty may be used instead of the above schematic model eye.

One may also alter the parameters of the individual parameters of the model eye; for example, the cornea, lens, retina, media, or combinations thereof, to aid a better simulation of the effect is described. Schematic eyes were used for simulation of the optical performance results of the exemplary embodiments of the current disclosure.

The prescription parameters of the schematic model eye used for optical modelling and simulation of the performance are tabulated in Table 1.

The prescription offers a −3 D myopic eye defined for a monochromatic wavelength of 589 nm. The prescription described in Table 1 should not be construed as an imperative method to demonstrate the effect of the contemplated exemplary embodiment. It is just one of many methods that may be used by the person skilled in the art for optical simulation purposes.

TABLE 1

Prescription of a schematic model eye that offers a −3 D myopic model eye.

| Description | Radius | Thickness | Refractive Index | Semi Diameter | Conic Constant |
|---|---|---|---|---|---|
| | Infinity | Infinity | | 0.00 | 0.000 |
| Start | Infinity | 5.000 | | 4.00 | 0.000 |
| Anterior Cornea | 7.750 | 0.550 | 1.376 | 5.75 | −0.250 |
| Posterior Cornea | 6.400 | 3.000 | 1.334 | 5.50 | −0.400 |
| Pupil | Infinity | 0.450 | 1.334 | 5.00 | 0.000 |
| Anterior Lens | 10.800 | 3.800 | 1.423 | 4.50 | −4.798 |
| Posterior Lens | −6.250 | 17.675 | 1.334 | 4.50 | −4.101 |
| Retina | −12.000 | 0.000 | | 10.00 | 0.000 |

Figure 5:
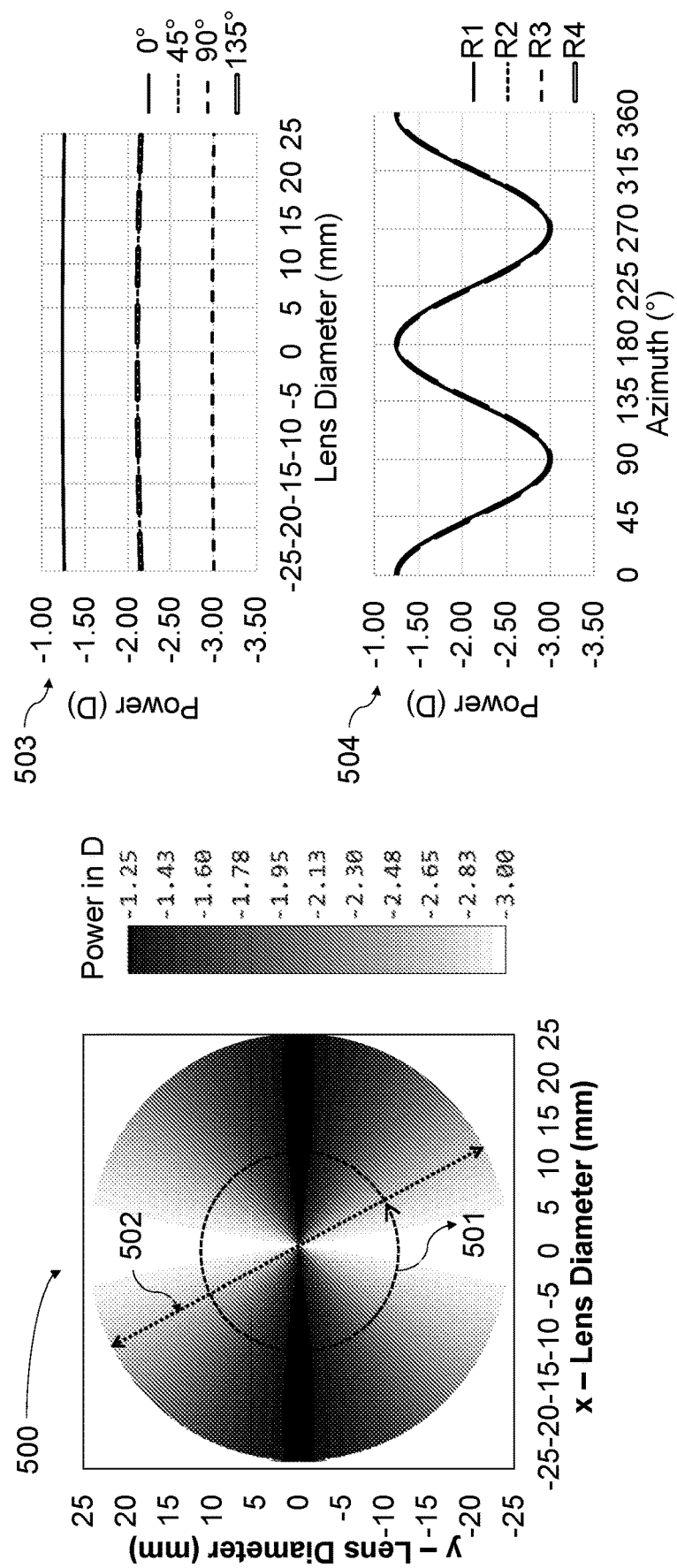
FIG. 5 illustrates the power distribution (i.e., power map, power as a function of lens diameter and power as a function of azimuth) within the optical zone of a standard toric or astigmatic spectacle lens (power: −3 DS/+1.75 DC) configured using standard sphero-cylindrical power distribution.

FIG. 5 illustrates the power map distribution (500) within the optical zone of one of the toric or astigmatic spectacle lenses as previously disclosed in PCT/AU2020/051005, and the power changes along one azimuth (501) and along one meridian (502) within the power map. FIG. 5 also shows the corresponding power profiles as a function of optic zone diameter for four representative sample meridians 0°, 45°, 90° and 135° (503), and its corresponding power profiles as a function of azimuth for four representative sample radial positions R1, R2, R3 and R4 (504) with radial distances of 0.5, 1.5, 2.5 and 3.5 mm, respectively.

The toric or astigmatic lens is configured using a standard sphero-cylindrical power distribution function, wherein one principal meridian (vertical meridian, 90°) has a power of approximately −3.00 D, the other principal meridian (horizontal meridian, 0°) has a power of approximately −1.25 D and the oblique meridians 45° and 135° have a power of approximately −2.12 D. The difference between the two principal meridians is the cylinder power, which in this exemplary embodiment is 1.75 DC. The power distribution of the toric or astigmatic lens is symmetrical as it has a radially and meridionally invariant power distribution that follows a cosine function with normal frequency, which results in an azimuthally varying power distribution with two axes of mirror-symmetry (i.e., two cosine cycles over 360°). The term normal frequency contemplated in a standard toric or an astigmatic contact lens can be observed or seen in FIG. 5.

Figure 6:
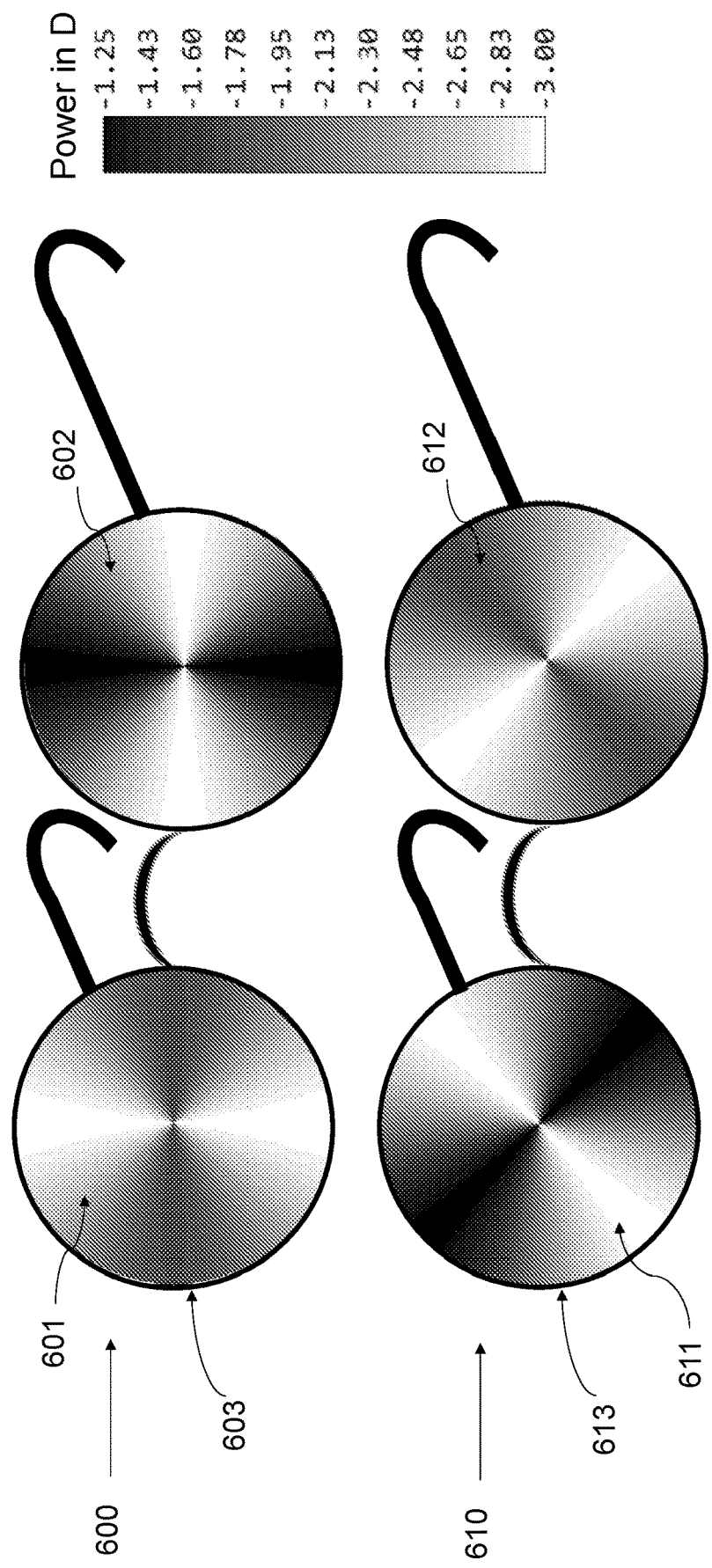
FIG. 6 illustrates a set of two pairs of myopia management spectacle lenses prescribed for reducing, inhibiting, or controlling the rate of progression of myopia for an individual according to the previous disclosure in PCT/AU2020/051005. The astigmatic blur (i.e. stop signal) signals are combined with the base prescription for each eye.

FIG. 6 illustrates two pairs of spectacles (600 and 610), each spectacle comprising a spectacle frame (603 and 613), a right spectacle lens (601 and 611) and a left spectacle lens (602 and 612) prescribed for reducing, inhibiting, or controlling the rate of progression of myopia for an individual according to the previous disclosure PCT/AU2020/051005.

The astigmatic blur (i.e., stop signal) of each spectacle lens (601, 611, 602, 612) is combined with the base prescription of −3 DS for each eye. The prescription for the right (601) and left (611) lenses of the first pair (600) are −3 DS/+1.25 DC×0° and −3 DS/+1.75 DC×90°, respectively. The prescription for the right (602) and left (612) lenses of the second pair (610) are −3 DS/+1.75 DC×135° and −3 DS/+1.25 DC×45°, respectively. As disclosed previously in PCT/AU2020/051005, the first pair of spectacles (600) is prescribed to be used in the $1^{st}$ period and the second pair of spectacles (610) is prescribed to be used in the $2^{nd}$ period.

Figure 7:
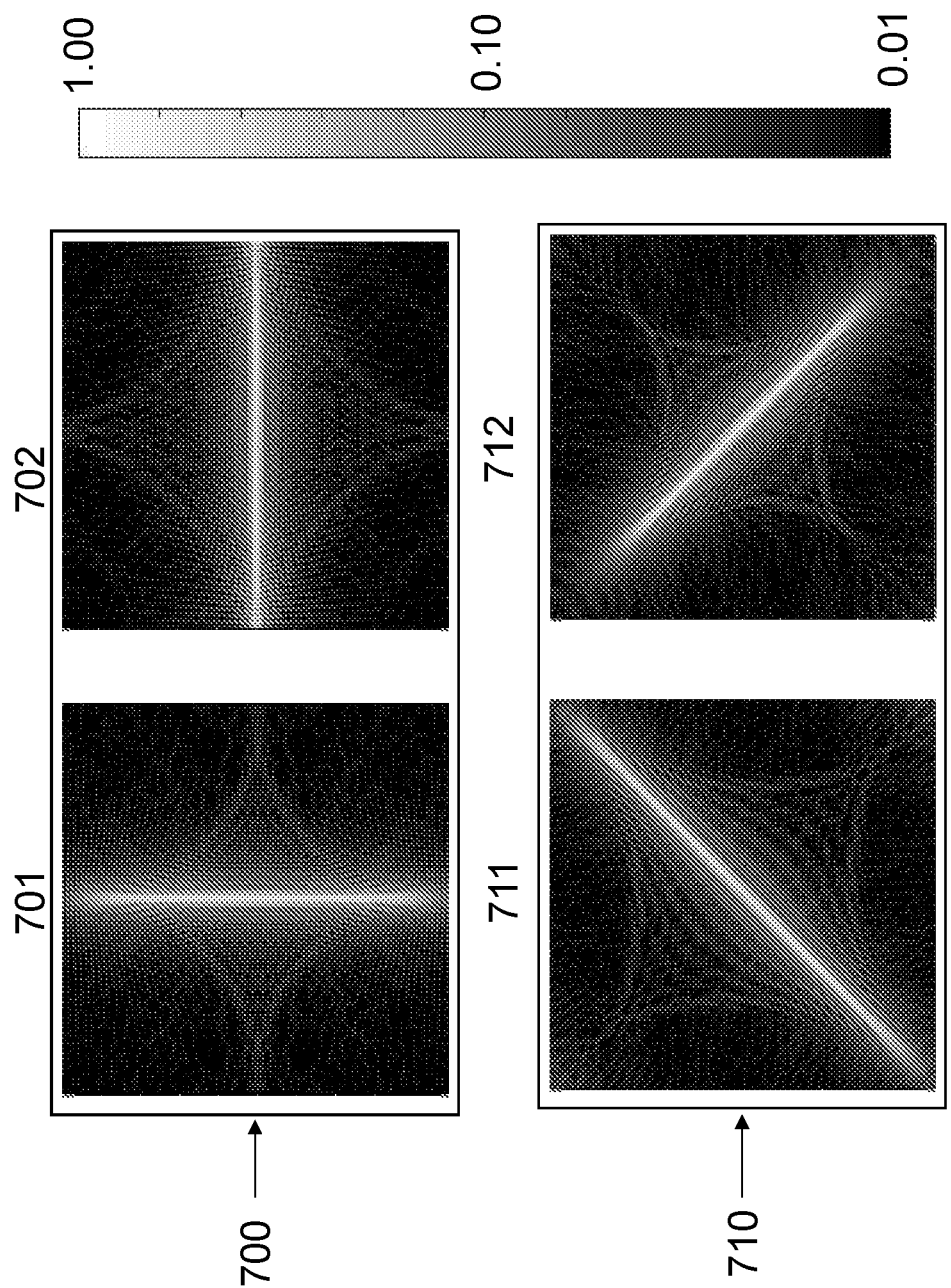
FIG. 7 illustrates the temporally and spatially varying signals over the prescribed periods, depicted as on-axis point spread function at the retinal plane, when the incoming light with a visible wavelength (589 nm) and a vergence of 0 D, is incident on a −3 D myopic model eye corrected with the two pairs of myopia management spectacle lenses described in FIG. 6.

When the incoming light of a visible wavelength (for example, 589 nm) of vergence 0 D, incident on the myopic eye (Table 1) is corrected with two pairs of the spectacles 601 and 610 of FIG. 6, the resultant on-axis temporally and spatially varying point spread functions at the retinal plane for Pair 1 and 2 are illustrated in FIG. 7.

The two rows of point spread functions 700 and 710 represent on-axis temporally and spatially varying optical signals to the retina of the wearer, when the pairs of myopia management spectacle lenses described in FIG. 6 are used as per the prescribed care regimen. As can be seen, the first pair of myopia management spectacles 701 provides an astigmatic blur in the vertical and horizontal meridians (701 and 702) of the retina of the wearer; while the second pair 710 provides an astigmatic blur in the oblique meridians (711 and 712).

Figure 8:
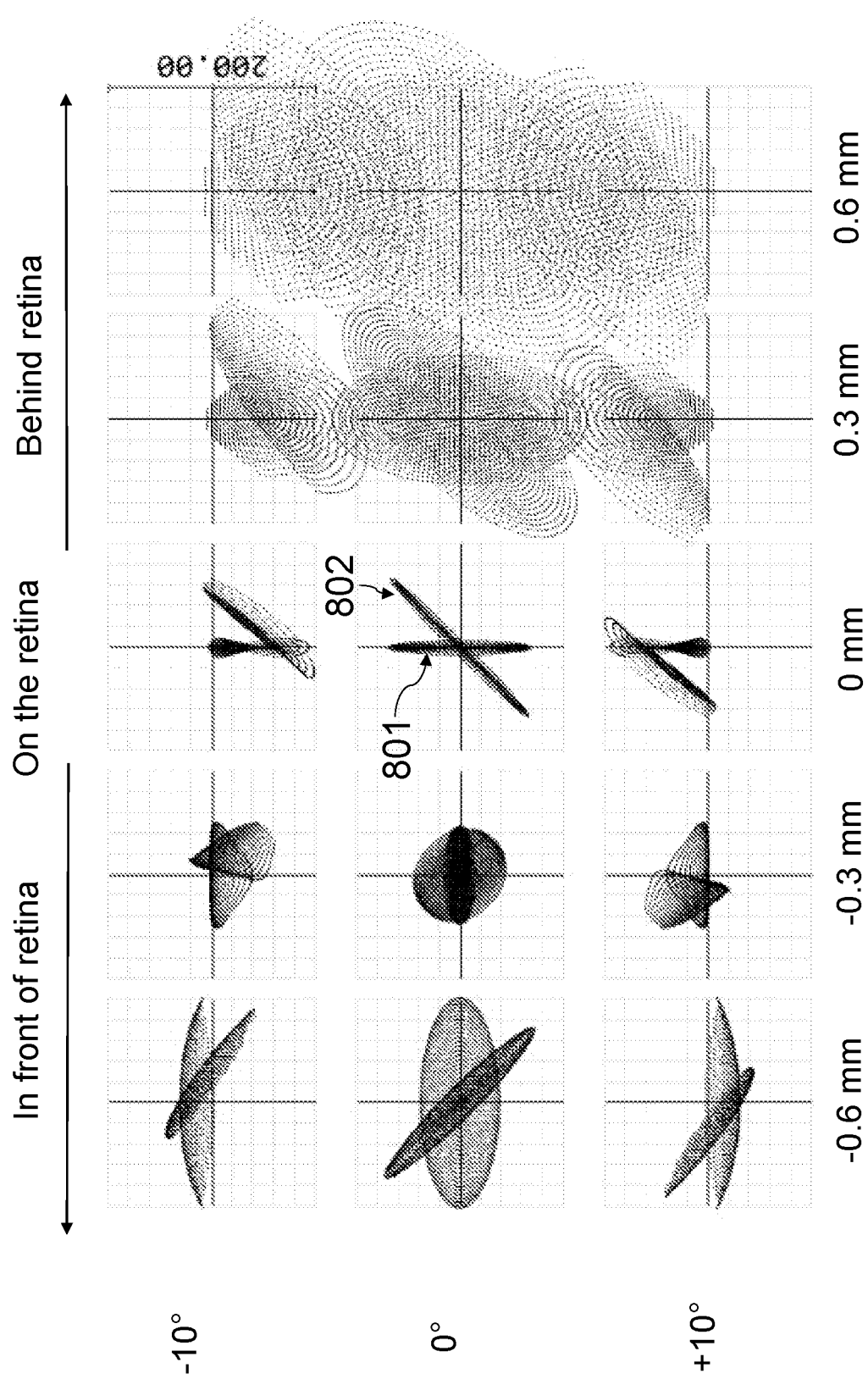
FIG. 8 illustrates a temporally and spatially varying signal, depicted as a wide-angle through-focus spot diagram when the incoming light is incident on the right eye of a −3 D myopic model eye corrected with the 1$^{st}$ and the 2$^{nd}$ right lenses of the two pairs of the spectacle lenses described in FIG. 6 and as disclosed previously in PCT/AU2020/051005 over prescribed periods. The 1$^{st}$ and 3$^{rd}$ rows represent off-axis field angles: −10 degrees and +10 degrees, respectively.

FIG. 8 illustrates a temporally and spatially varying signal, depicted as a wide-angle through-focus spot diagram when the incoming light is incident on a right −3 D myopic model eye corrected with two (2) pairs of the spectacles described in FIG. 6 over the prescribed two (2) periods under the prescribed care regimen. The rows represent optical performance over various field angles: −10 degrees, 0 degree and 10 degrees. The elliptical blur pattern 801 is the resulting spot diagram when the right eye is corrected with the right lens 601 of the first pair of spectacles 600 and the elliptical blur pattern 802 is the resulting spot diagram when the right eye is corrected with the right lens 611 of the second pair of spectacles 611.

The through-focus spot diagrams of FIG. 8 are representations of a time integral of the optical signals obtained by integrating the resultant responses when the right lenses of the two pairs of spectacles are fitted on a −3 D myopic model eye. The time integral means combining the effects of pairs of spectacles worn over the prescribed two (2) periods in one through-focus spot diagram representation.

Figure 9:
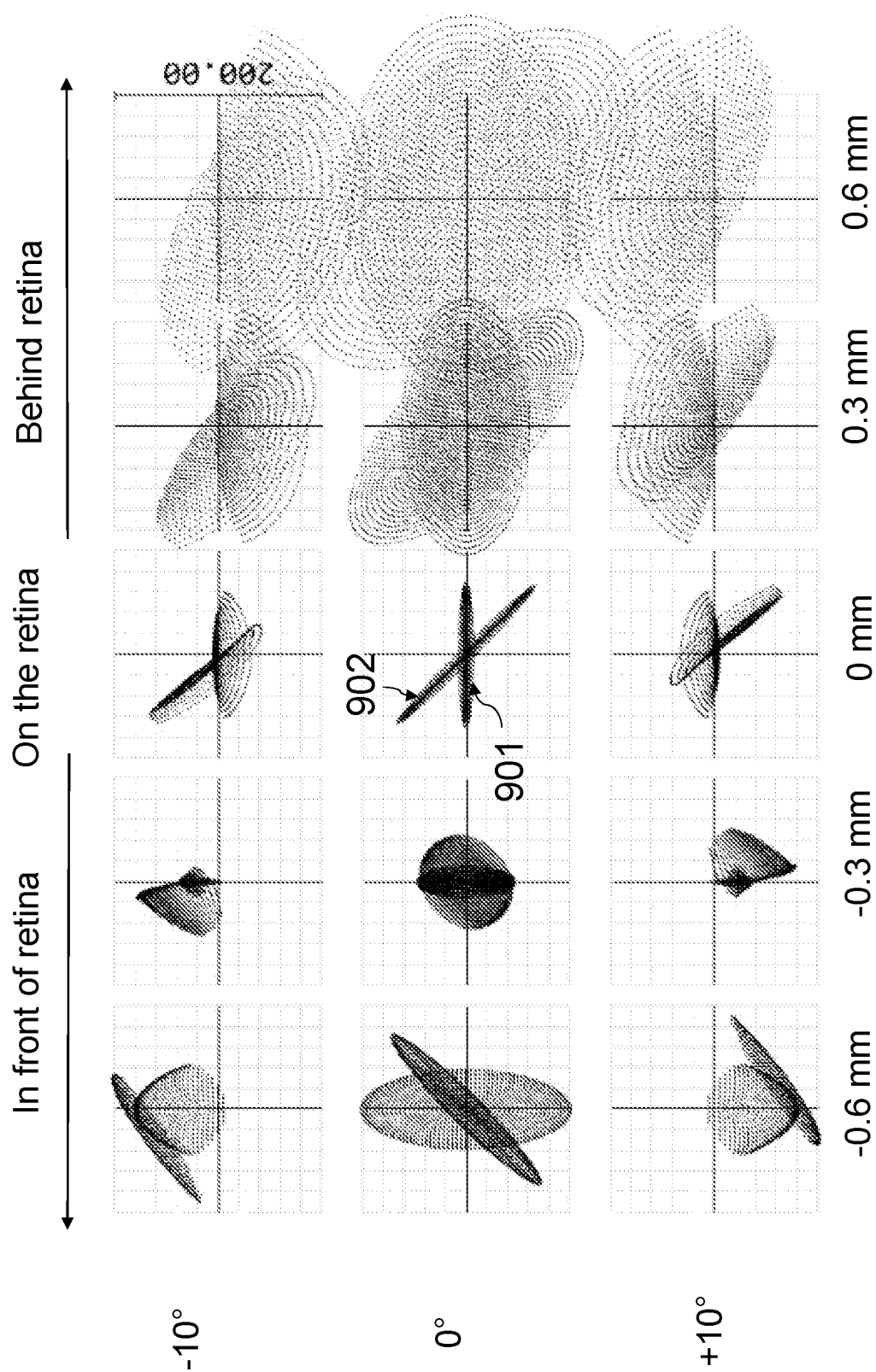
FIG. 9 illustrates a temporally and spatially varying signal, depicted as a wide-angle through-focus spot diagram when the incoming light is incident on the left eye of a −3 D myopic model eye corrected with the 1$^{st}$ and the 2$^{nd}$ left lenses of the two pairs of the spectacle lenses described in FIG. 6 and as disclosed previously in PCT/AU2020/051005 over prescribed periods. The 1$^{st}$ and 3$^{rd}$ rows represent off-axis field angles: −10 degrees and +10 degrees, respectively.

FIG. 9 illustrates a temporally and spatially varying signal, depicted as a wide-angle through-focus spot diagram when the incoming light is incident on a left −3 D myopic model eye corrected with two (2) pairs of the spectacles described in FIG. 6 over the prescribed two (2) periods under the prescribed care regimen. The rows represent optical performance over various field angles: −10 degrees, 0 degree and 10 degrees. The elliptical blur pattern 901 is the resulting spot diagram when the left eye is corrected with the left lens 602 of the first pair of spectacles 600 and the elliptical blur pattern 902 is the resulting spot diagram when the left eye is corrected with the left lens 612 of the second pair of spectacles 611.

The through-focus spot diagrams of FIG. 9 are representations of a time integral of the optical signals obtained by integrating the resultant responses when the left lenses of the two pairs of spectacles are fitted on a −3 D myopic model eye. The time integral means combining the effects of pairs of spectacles worn over the prescribed two (2) periods in one through-focus spot diagram representation.

The through-focus geometric spot analysis about the retinal plane is computed at five locations, i.e., from −0.6 to +0.6 mm in 0.3 mm steps; wherein the retinal locations −0.6 mm and −0.3 mm are in front of the retina; the retinal location 0 mm is on the retina; and the retinal locations +0.3 mm and +0.6 mm are behind the retina.

As can be seen, in this example where the right and left myopic eyes are corrected with the right and left spectacle lenses of the first and second pair of spectacles (FIG. 6) the resulting elliptical blur patterns (FIG. 8 and FIG. 9) vary in size and shape for the different spectacle lens pairs, i.e., resulting in a spatially and temporally varying stop signal. This also results in changes to visual performance between the two spectacle wearing periods.

Figure 10:
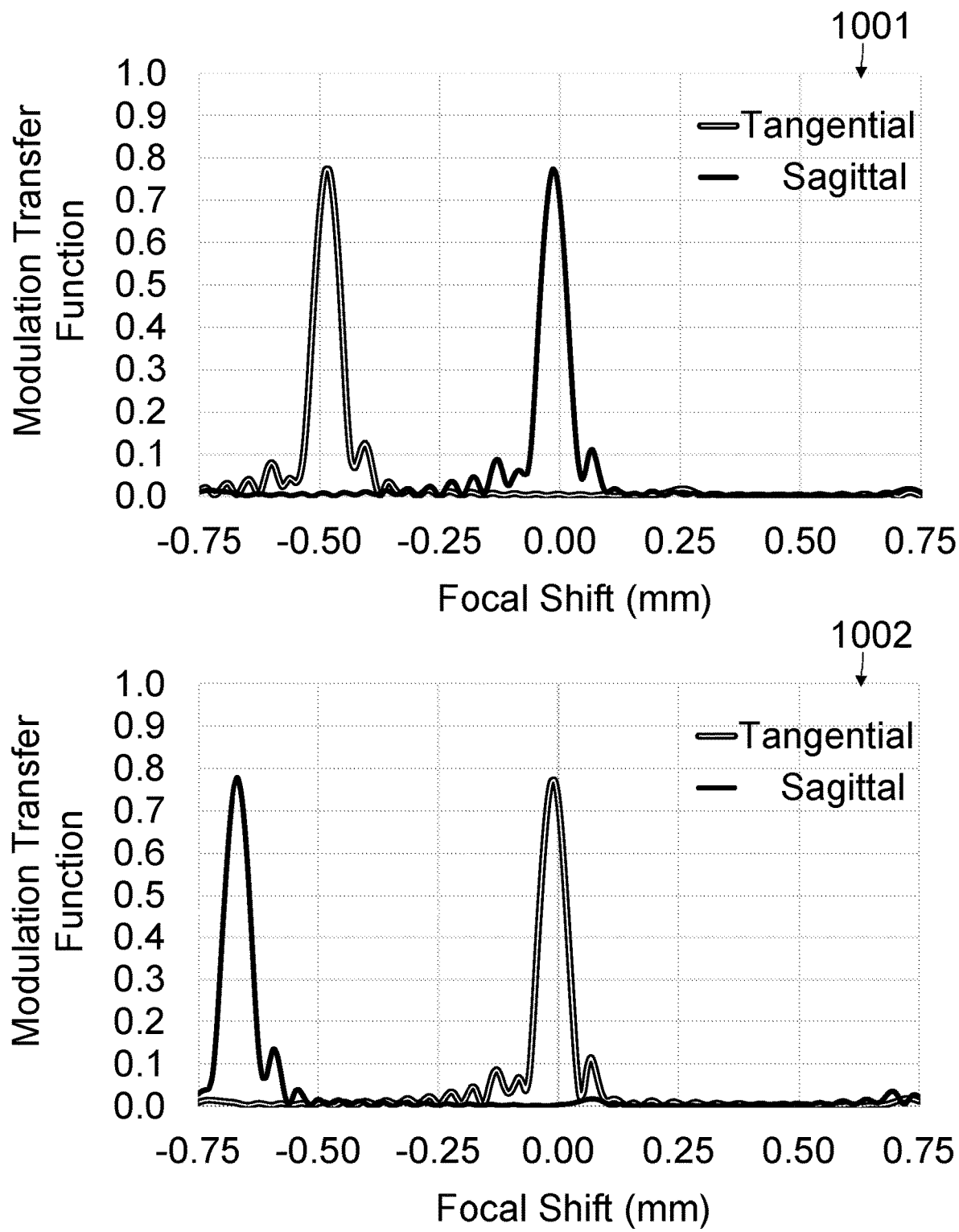
FIG. 10 illustrates the retinal signal (conoid of Sturm) depicted as on-axis, through-focus, modulation transfer function for the tangential and sagittal meridians, which were computed when the incoming light with a visible wavelength (589 nm) and a vergence of 0 D, is incident on a right −3 D myopic model eye corrected with the two pairs of myopia management spectacle lenses described in FIG. 6.

When the incoming light of a visible wavelength (589 nm) of vergence 0 D, is incident on the schematic model eye with a prescription of −3 DS (Table 1), is corrected with the right spectacle lenses (601 and 611), the retinal signal depicted as on-axis, through-focus, modulation transfer functions 1001 and 1002 for the tangential and sagittal meridians are illustrated in FIG. 10, for the first and the second pair, respectively. The difference in focal shift (i.e., the depth of the conoid of sturm) between the tangential and sagittal meridians was approximately 0.4 mm and 0.65 mm, respectively for the two right lenses. The magnitude of the peaks in front of and approximately on the retina are similar, i.e., about 0.77. Although the contemplated spectacle lens pairs described in FIG. 6 offer the desirable temporally and spatially varying stimulus when fitted on the myopic eye, the difference in visual performance when changing from one pair of spectacle lenses to the next is determined by the difference in focal shift and the magnitude of the peaks of the tangential and sagittal meridians. The higher the peak or peaks in front of the retina and the greater the focal shift, the lower the performance of the spectacle lens.

It is desirable to minimise significant variations in performance between the different spectacle pairs in the myopia management kit. Various disclosed embodiments of the current invention resolve the problem by minimising the variation with the contemplated designs in this disclosure, which becomes apparent through the embodiment examples that follow.

Figure 11:
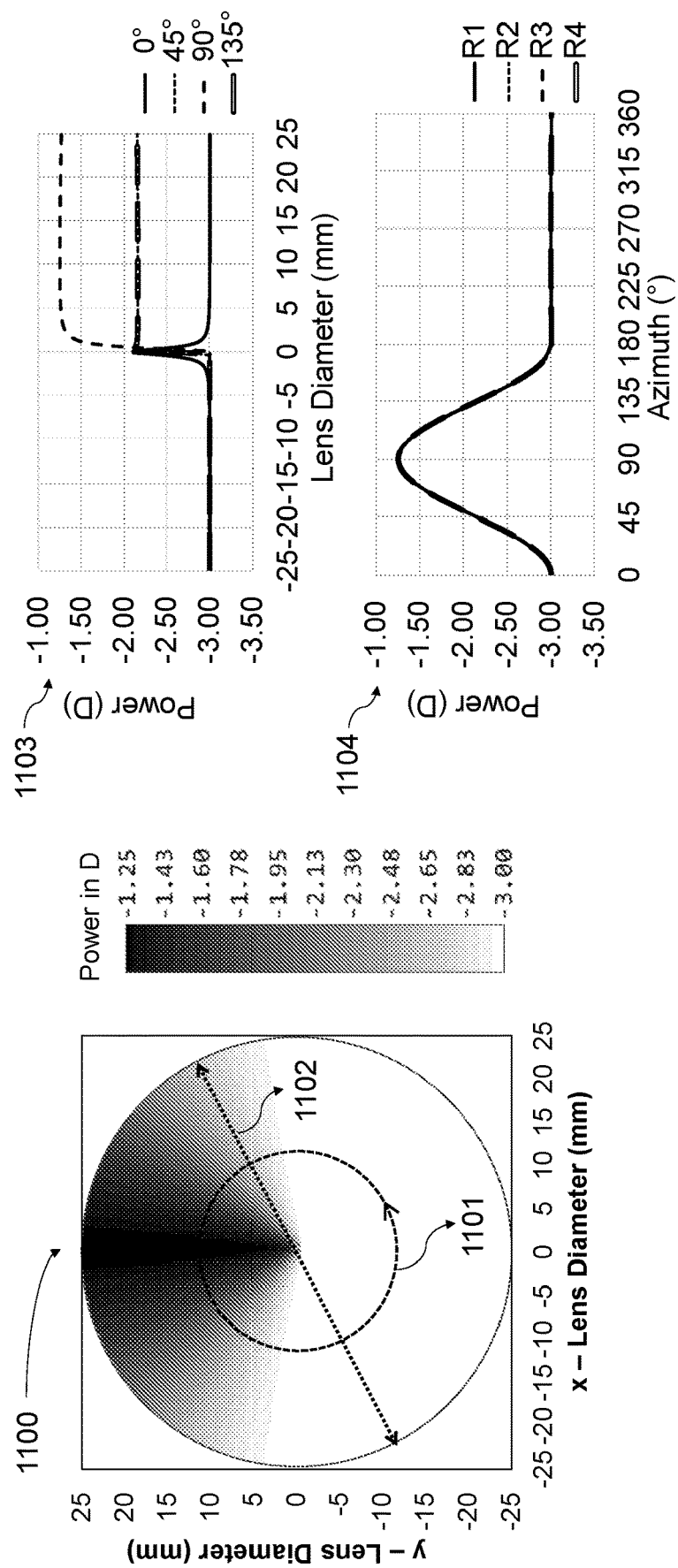
FIG. 11 illustrates the power distribution (i.e., power map, power as a function of lens diameter and power as a function of azimuth) within the optical zone of a spectacle lens embodiment of the present disclosure with a substantially radially invariant, meridionally and azimuthally variant, power distribution (power: −3 DS/+1.75 D, Hem i-Sphere Lens).

FIG. 11 illustrates the power map distribution (1100) within the optical zone of a spectacle lens embodiment (50 mm diameter) of the present disclosure, and the power changes along one azimuth (1101) and along one meridian (1102) within the power map. FIG. 11 also shows the corresponding power profiles as a function of optic zone diameter for four representative sample meridians 0°, 45°, 90° and 135° (1103), and its corresponding power profiles as a function of azimuth for four representative sample radial positions R1, R2, R3 and R4 (1104) with radial distances of 5, 10, 20 and 30 mm, respectively.

The spectacle lens is configured with a substantially radially invariant, meridionally and azimuthally variant, power distribution (power: −3 DS/+1.75 D, Hem i-Sphere Lens), wherein the flattest half-meridian (vertical meridian, 90°) has a power of approximately −1.25 DS, the steepest half-meridian (e.g., horizontal meridian, 0°) has a power of approximately −3.00 DS and the oblique meridians 45° and 135° have a power of approximately −2.16 DS. The difference between the flattest and the steepest half-meridian is the delta power, which in this exemplary embodiment is 1.75 D.

In all the exemplary examples of the present disclosure, any reference to cylinder power is in addition to any prescribed cylinder power to correct the underlying myopia with inherent astigmatism.

Figure 12:
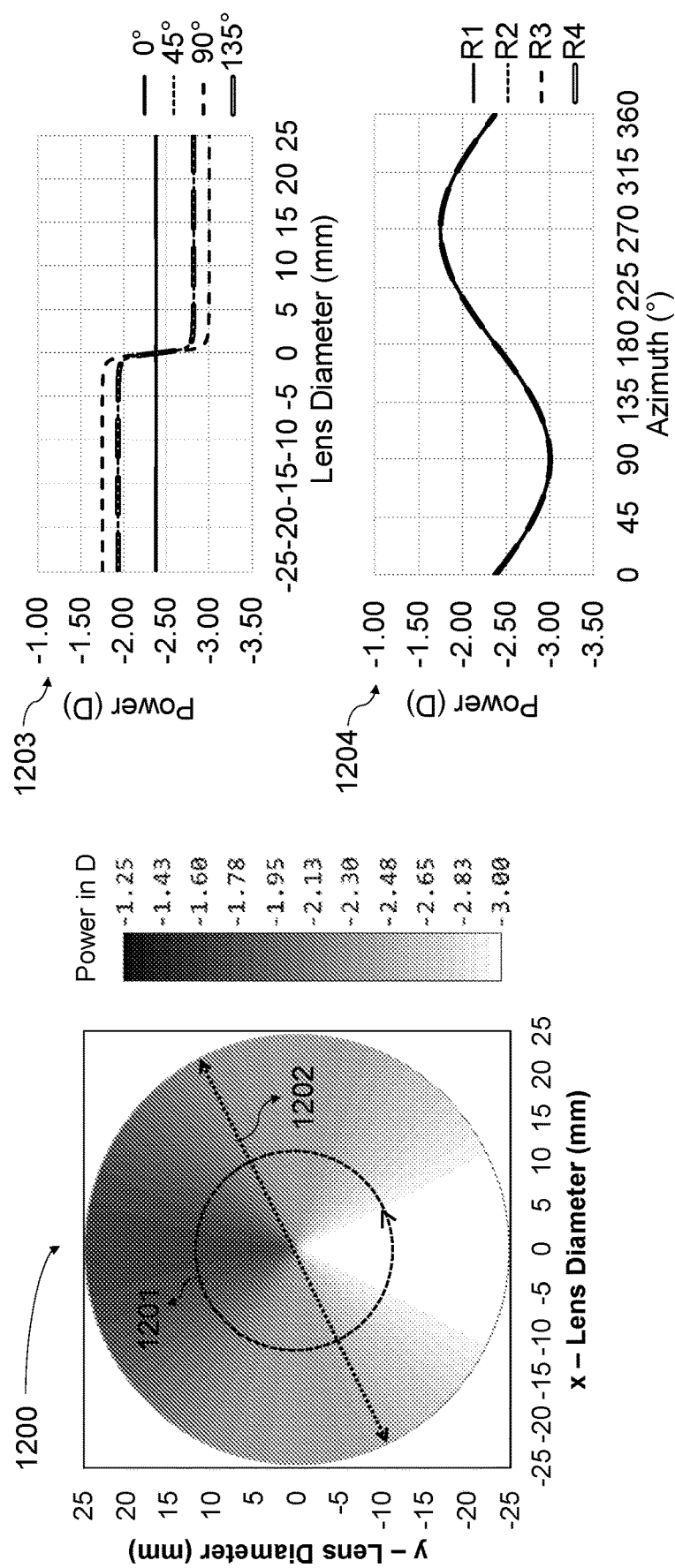
FIG. 12 illustrates the power distribution (i.e., power map, power as a function of lens diameter and power as a function of azimuth) within the optical zone of a spectacle lens embodiment of the present disclosure with a substantially radially invariant, meridionally and azimuthally variant, power distribution (power: −3 DS/+1.25 D, Cosine-Variant Lens I).

FIG. 12 illustrates the power map distribution (1200) within the optical zone of a spectacle lens embodiment (50 mm diameter) of the present disclosure, and the power changes along one azimuth (1201) and along one meridian (1202) within the power map. FIG. 12 also shows the corresponding power profiles as a function of optic zone diameter for four representative sample meridians 0°, 45°, 90° and 135° (1203), and its corresponding power profiles as a function of azimuth for four representative sample radial positions R1, R2, R3 and R4 (1204) with radial distances of 5, 10, 20 and 30 mm, respectively.

The spectacle lens is configured with a substantially radially invariant, meridionally and azimuthally variant, power distribution (power: −3 DS/+1.25 D, Cosine-Variant Lens I). As can be seen in 1203 and 1204, the power distribution in the area defined by the azimuthal angle of 0° to 180° varies between approximately −2.4 D, −2.9 D and −3 D for the 0°, 45°/135° and 90° meridians, respectively, and in the area defined by the azimuthal angle of 180° to 360° the power varies between approximately −2.4 D, −1.9 D and −1.75 D for the 0°, 45°/135° and 90° meridians, respectively, resulting in a delta power of approximately 1.25 D.

Figure 13:
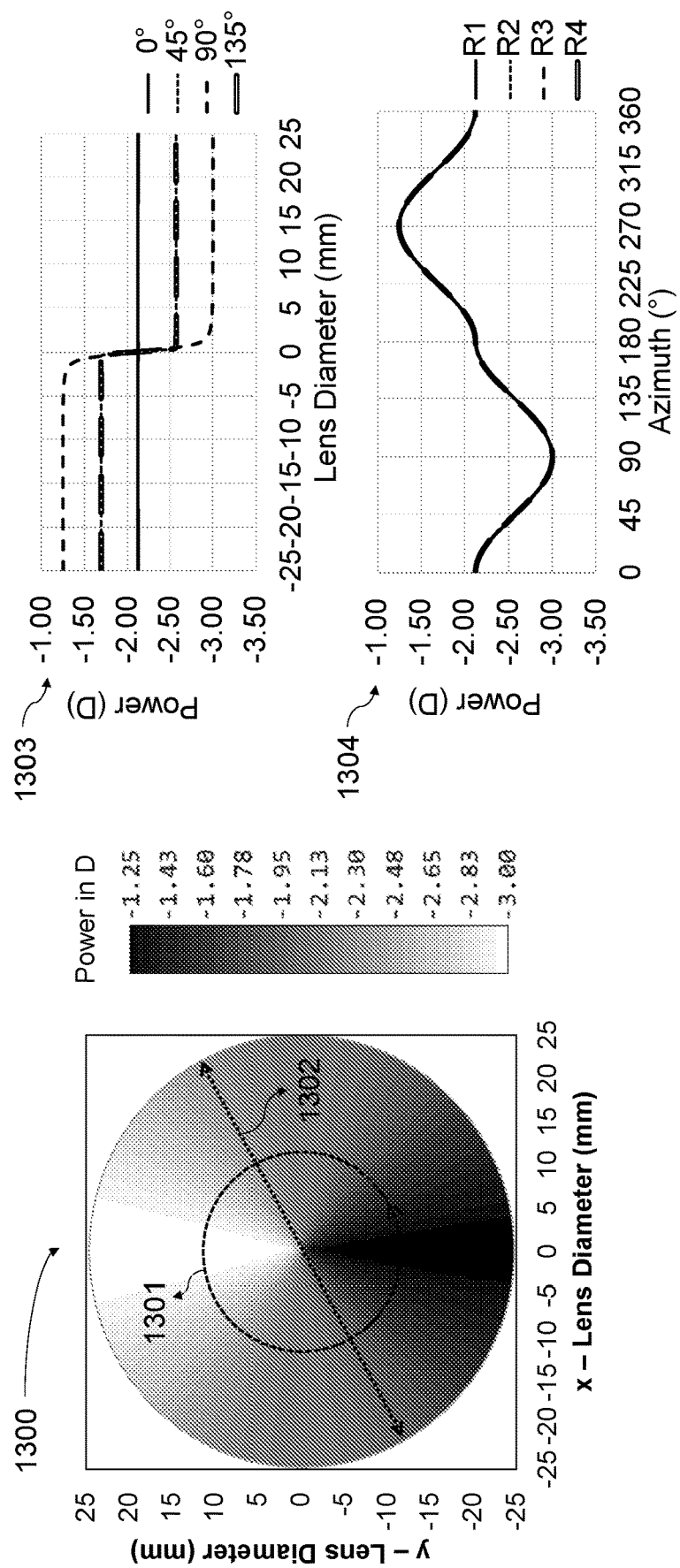
FIG. 13 illustrates the power distribution (i.e., power map, power as a function of lens diameter and power as a function of azimuth) within the optical zone of a spectacle lens embodiment of the present disclosure with a substantially radially invariant, meridionally and azimuthally variant, power distribution (power: −3 DS/+1.75 D, Cosine-Variant Lens II).

FIG. 13 illustrates the power map distribution (1300) within the optical zone of a spectacle lens embodiment (50 mm diameter) of the present disclosure, and the power changes along one azimuth (1301) and along one meridian (1302) within the power map. FIG. 13 also shows the corresponding power profiles as a function of optic zone diameter for four representative sample meridians 0°, 45°, 90° and 135° (1303), and its corresponding power profiles as a function of azimuth for four representative sample radial positions R1, R2, R3 and R4 (1304) with radial distances of 5, 10, 20 and 30 mm, respectively.

Figure 14:
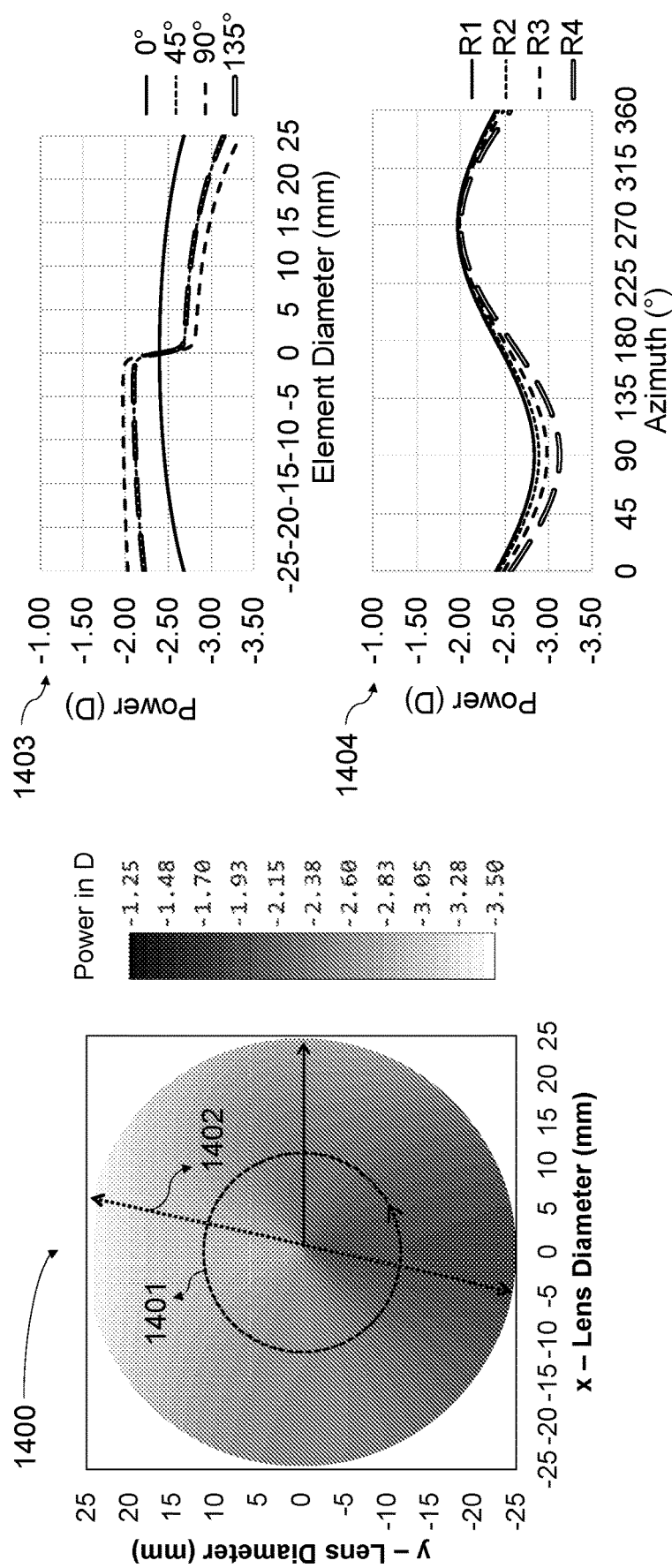
FIG. 14 illustrates the power distribution (i.e., power map, power as a function of lens diameter and power as a function of azimuth) within the optical zone of a spectacle lens embodiment of the present disclosure with a substantially radially, meridionally and azimuthally variant, power distribution (power: −3 DS/+1.25 D, Cosine-Variant Lens III).

The spectacle lens is configured with a substantially radially invariant, meridionally and azimuthally variant, power distribution (power: −3 DS/+1.75 D, Cosine-Variant Lens II). As can be seen in 1303 and 1304, the power distribution in the area defined by the azimuthal angle of 0° to 180° varies between approximately −3 D, −2.57 D and −2.12 D for the 0°, 45°/135° and 90° meridians, respectively, and in the area defined by the azimuthal angle of 180° to 360° the power varies between approximately −2.12 D, −1.7 D and −1.25 D for the 0°, 45°/135° and 90° meridians, respectively, resulting in a delta power of approximately 1.75 D. FIG. 14 illustrates the power map distribution (1400) within the optical zone of a spectacle lens embodiment (50 mm diameter) of the present disclosure, and the power changes along one azimuth (1401) and along one meridian (1402) within the power map. FIG. 14 also shows the corresponding power profiles as a function of optic zone diameter for four representative sample meridians 0°, 45°, 90° and 135° (1403), and its corresponding power profiles as a function of azimuth for four representative sample radial positions R1, R2, R3 and R4 (1404) with radial distances of 5, 10, 20 and 30 mm, respectively.

The spectacle lens is configured with a substantially radially, meridionally and azimuthally variant, power distribution (power: −3 DS/+1.25 D, Cosine-Variant Lens III). As can be seen in 1403 and 1404, the power distribution in the area defined by the azimuthal angle of 0° to 180° varies between approximately −2.4 to −2.6 D, −2.7 to −3.2 D and −2.8 to −3.25 D for the 0°, 45°/135° and 90° meridians, respectively, and in the area defined by the azimuthal angle of 180° to 360° the power varies between approximately −2.7 to −2.4 D, −2.2 to −2.1 D and −2 to −1.9 D for the 0°, 45°/135° and 90° meridians, respectively, resulting in a delta power of approximately 1.25 D (at a radial distance of about 20 mm).

Figure 15A:
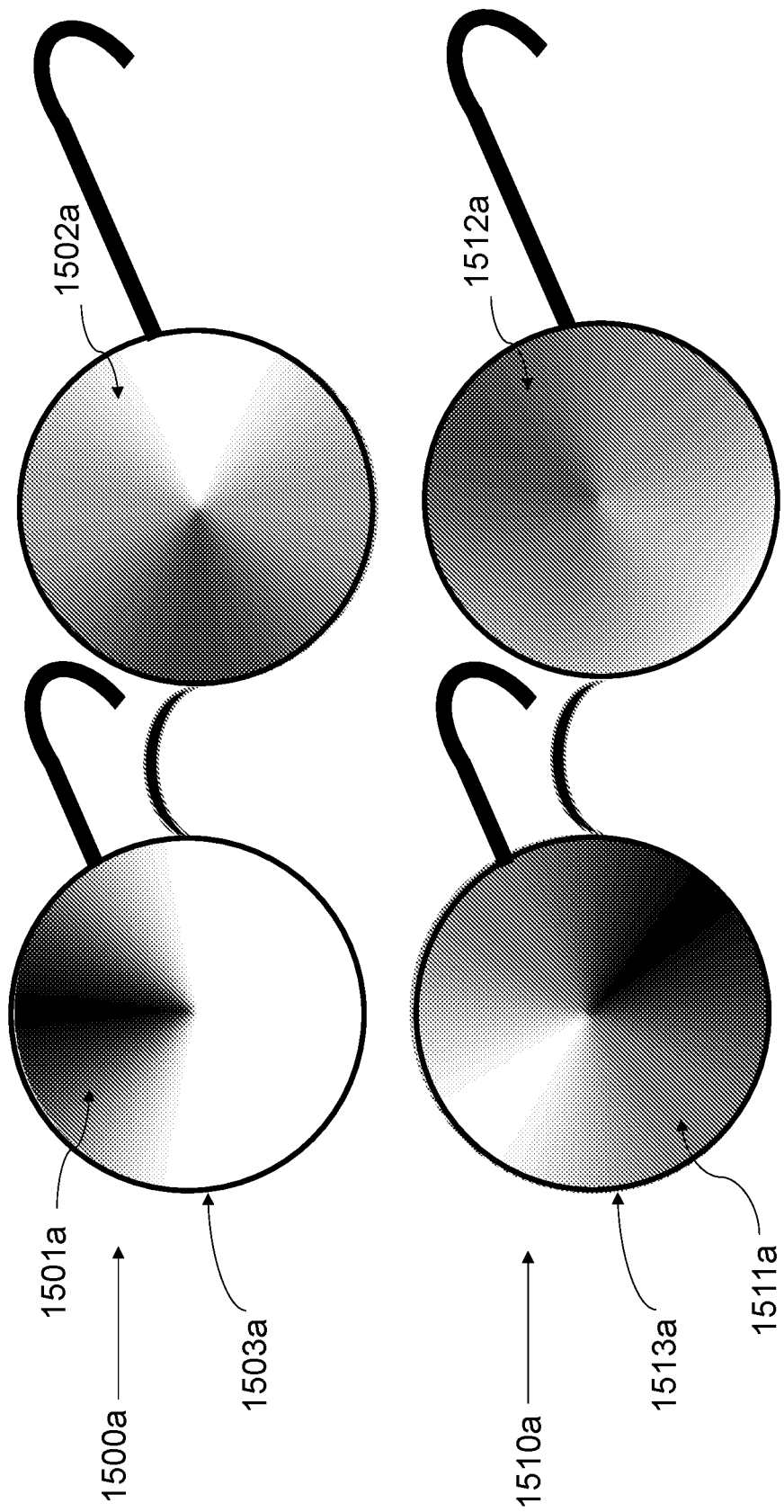
FIG. 15A illustrates power maps, as described in FIGS. 11 to 14, of the set of two pairs of exemplary myopia management spectacles for reducing, inhibiting, or controlling the rate of progression of myopia for an individual as disclosed herein.

FIG. 15A illustrates power maps, as described in FIGS. 11 to 14, of a set of two pairs of exemplary myopia management spectacles 1500a and 1510a for reducing, inhibiting, or controlling the rate of progression of myopia for an individual as disclosed herein. The first pair of spectacles (1500a) comprises of a right lens 1501a and a left lens 1502a fitted into a spectacle lens frame 1503a. The right lens is configured with a power profile as described in FIG. 11 wherein the axis of the flattest meridian is located at 90° and the left lens 1502a is configured with a power profile as described in FIG. 12 wherein the axis of the flattest meridian is located at 180°. The second pair of spectacles (1510a) comprises of a right lens 1511a and a left lens 1512a fitted into a spectacle lens frame 1513a. The right lens is configured with a power profile as described in FIG. 13 wherein the axis of the flattest meridian is located at 315° and the left lens 1502a is configured with a power profile as described in FIG. 14 wherein the axis of the flattest meridian is located at 45°.

Figure 15B:
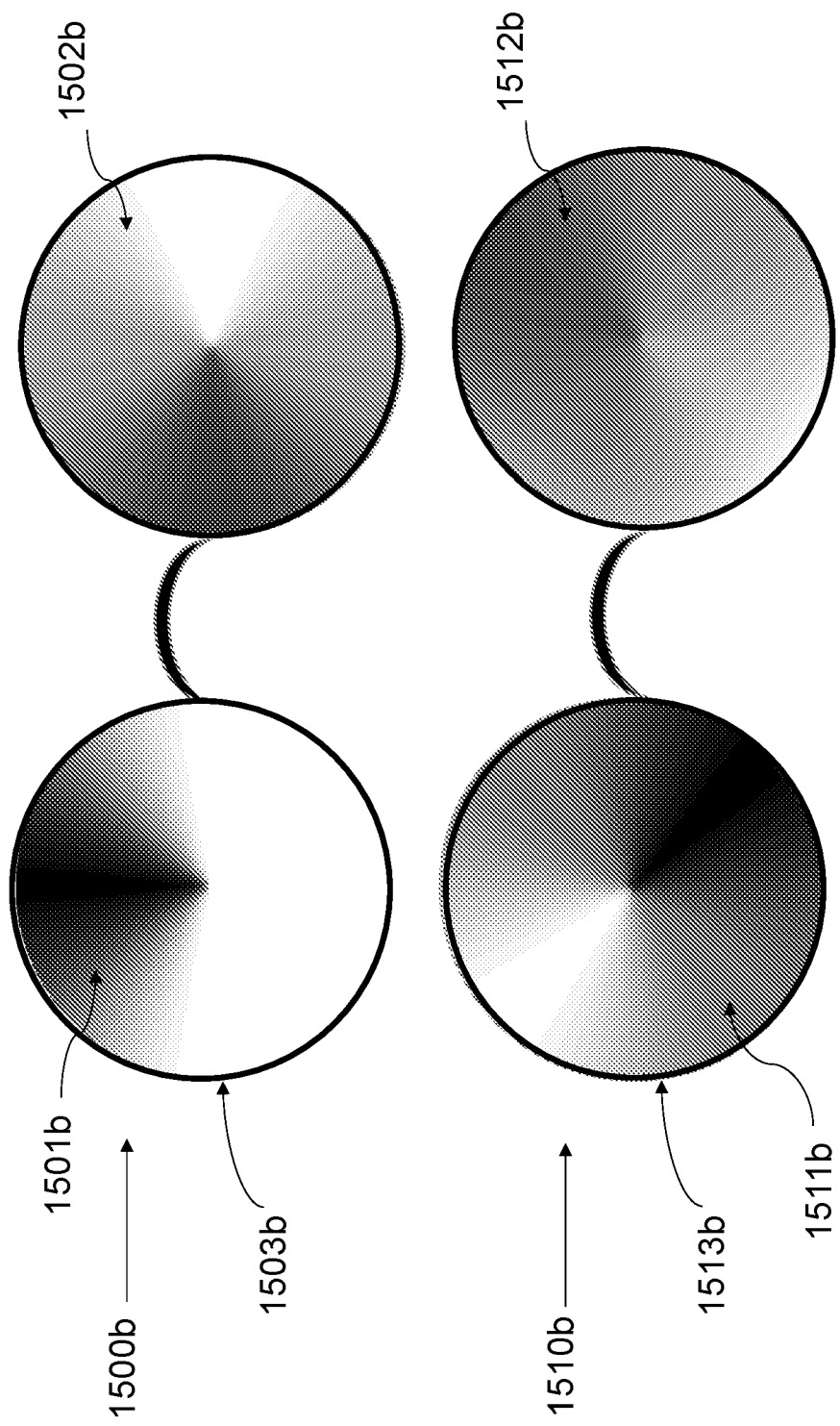
FIG. 15B illustrates power maps, as described in FIGS. 11 to 14, of a set of two pairs of exemplary auxiliary myopia management spectacle fronts to be used in juxtaposition to a standard pair of single vision spectacle lenses for reducing, inhibiting, or controlling the rate of progression of myopia for an individual as disclosed herein.

FIG. 15B illustrates power maps, as described in FIGS. 11 to 14, of a set of two pairs of exemplary auxiliary myopia management spectacle fronts 1500b and 1510b to be used in juxtaposition to a standard pair of single vision spectacle lenses for reducing, inhibiting, or controlling the rate of progression of myopia for an individual as disclosed herein. The first pair of spectacle fronts (1500b) comprises of a right lens 1501b and a left lens 1502b within the spectacle lens front frame 1503b. The right lens is configured with a power profile as described in FIG. 11 wherein the axis of the flattest meridian is located at 90° and the left lens 1502b is configured with a power profile as described in FIG. 12 wherein the axis of the flattest meridian is located at 180°. The second pair of spectacles (1510b) comprises of a right lens 1511b and a left lens 1512b fitted into a spectacle lens frame 1513b. The right lens is configured with a power profile as described in FIG. 13 wherein the axis of the flattest meridian is located at 315° and the left lens 1502b is configured with a power profile as described in FIG. 14 wherein the axis of the flattest meridian is located at 45°.

In FIGS. 15A, 15B, the spectacle front or frame examples have circular lenses of same diameter. This is one of the preferred embodiments of the disclosure, however in some other embodiments, non-circular spectacle fronts, frames, or lenses, for example, oval, rectangular, and any other common spectacle shapes may be contemplated. Furthermore, the spectacle fronts or frames or lenses, for example FIGS. 15A and 15B may have diameter ranging from 25 mm to 60 mm.

The two pairs of spectacles or auxiliary spectacle fronts of FIGS. 15A and 15B are configured with meridionally and azimuthally varying power distributions varying magnitudes of delta power and varying orientations of axes (i.e., axis of the flattest half-meridian) in each eye.

The two pairs of spectacles or auxiliary spectacle fronts of FIGS. 15A and 15B are prescribed to be used over different periods. For example, changing each pair every day, two days, three days, 4 days, 5 days, 7 days, 10 days, 14 days, or 21 days.

In some examples, the two (2) wearing periods described in the methods of use of two pairs of myopia management spectacles shown in FIG. 15 may be every alternate day of the week, for example, Monday, Wednesday, Friday. In some other example, the two wearing periods may be a specific day of the week; while in some other examples, the two (2) wearing periods may include a specific day of the month.

Figure 16:
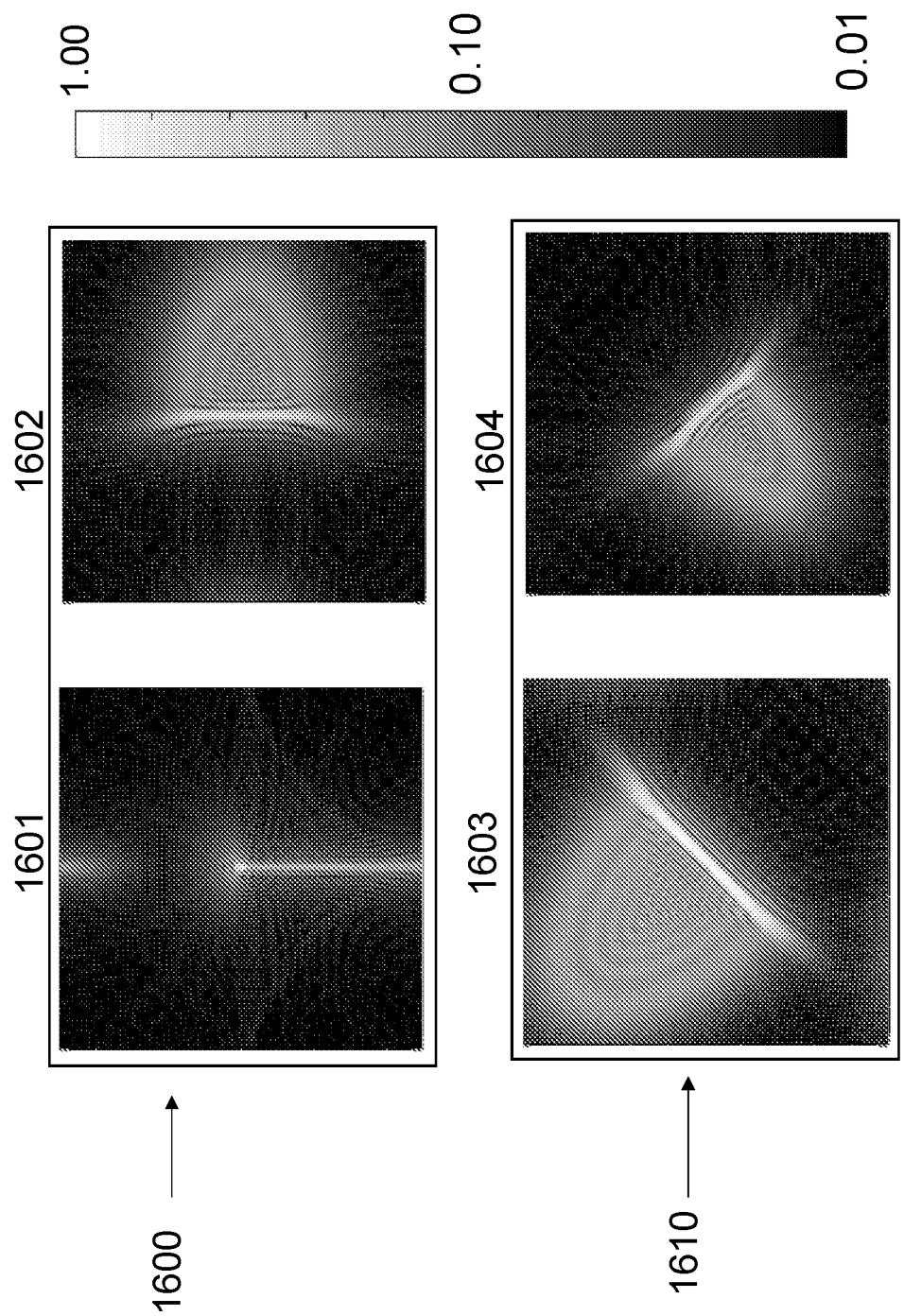
FIG. 16 illustrates the temporally and spatially varying signal over the prescribed periods, depicted as on-axis point spread function at the retinal plane, when the incoming light with a visible wavelength (589 nm) and a vergence of 0 D, is incident on a −3 D myopic model eye corrected with the two pairs of myopia management spectacles or spectacle fronts as described in FIGS. 15A and B over prescribed periods.

When the incoming light of a visible wavelength (for example, 589 nm) of vergence 0 D, incident on the myopic eye (Table 1) is corrected with the two pairs of the spectacles 1500a and 1510a or the two pairs of spectacle lens fronts 1500b and 1510b, the resultant on-axis temporally and spatially varying point spread functions at the retinal plane for Pair 1 and 2 are illustrated in FIG. 16.

The two rows of point spread functions 1600 and 1610 represent on-axis temporally and spatially varying optical signals to the retina of the wearer, when the two pairs of myopia management spectacle lenses described in FIG. 15A or the two pairs of spectacle lens fronts described in FIG. 15B are used as per the prescribed care regimen. The point spread function of the Hemi-Sphere Lens, as described in FIG. 11, is shown in 1601. The point spread function of the Cosine-Variant Lens I, as described in FIG. 12, is shown in 1602. The point spread function of the Cosine-Variant Lens II, as described in FIG. 13, is shown in 1603 and the point spread function of the Cosine-Variant Lens III, as described in FIG. 14, is shown in 1604. As can be seen, each lens in the myopia management spectacles or spectacle fronts 1501, provides a different irregular point spread function on the retina of the wearer.

Figure 17:
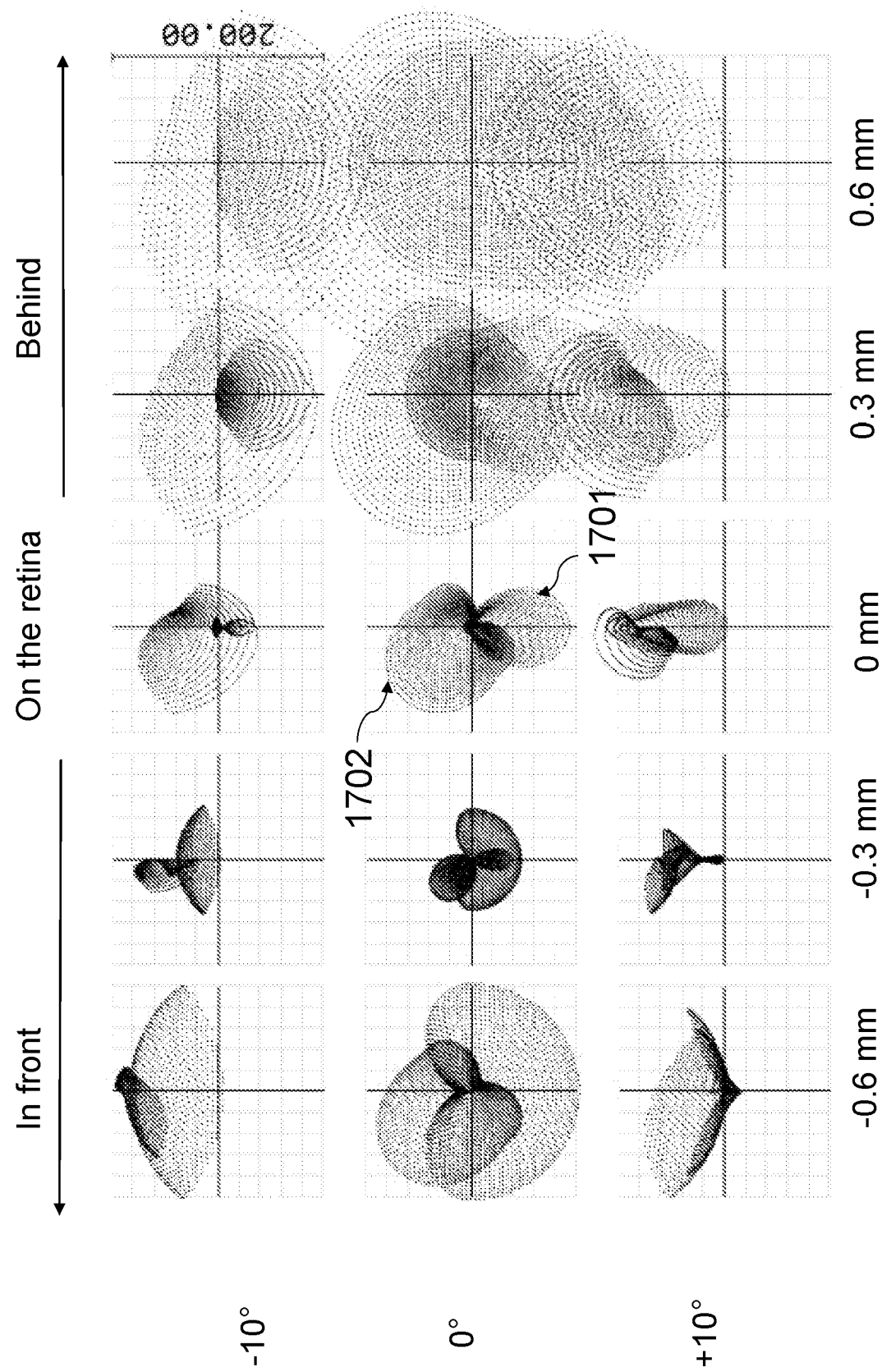
FIG. 17 illustrates a temporally and spatially varying signal, depicted as a wide-angle through-focus spot diagram when the incoming light is incident on a right −3 D myopic model eye corrected with two right lenses of the two pairs of the myopia management spectacles or spectacle fronts as described in FIGS. 15A and B as disclosed herein over prescribed periods. The 2$^{nd}$ row represents on-axis field angle 0 degrees and the 1$^{st}$ and 3$^{rd}$ rows represent off-axis field angles: −10 degrees and +10 degrees.

FIG. 17 illustrates a temporally and spatially varying signal, depicted as a wide-angle through-focus spot diagram when the incoming light is incident on a right −3 D myopic model eye corrected with the right lenses of the two (2) pairs of the spectacles described in FIG. 15 over the prescribed two (2) periods under the prescribed care regimen. The rows represent optical performance over various field angles: −10 degrees, 0 degree and 10 degrees. The irregular blur pattern 1701 is the resulting spot diagram when the right eye is corrected with the right lens 1501a of the first pair of spectacles 1500a and the irregular blur pattern 1702 is the resulting spot diagram when the right eye is corrected with the right lens 1511a of the second pair of spectacles 1510a.

The through-focus spot diagrams of FIG. 17 are representations of a time integral of the optical signals obtained by integrating the resultant responses when the right lenses of the two pairs of spectacles are fitted on a −3 D myopic model eye. The time integral means combining the effects of pairs of spectacles worn over the prescribed two (2) periods in one through-focus spot diagram representation.

Figure 18:
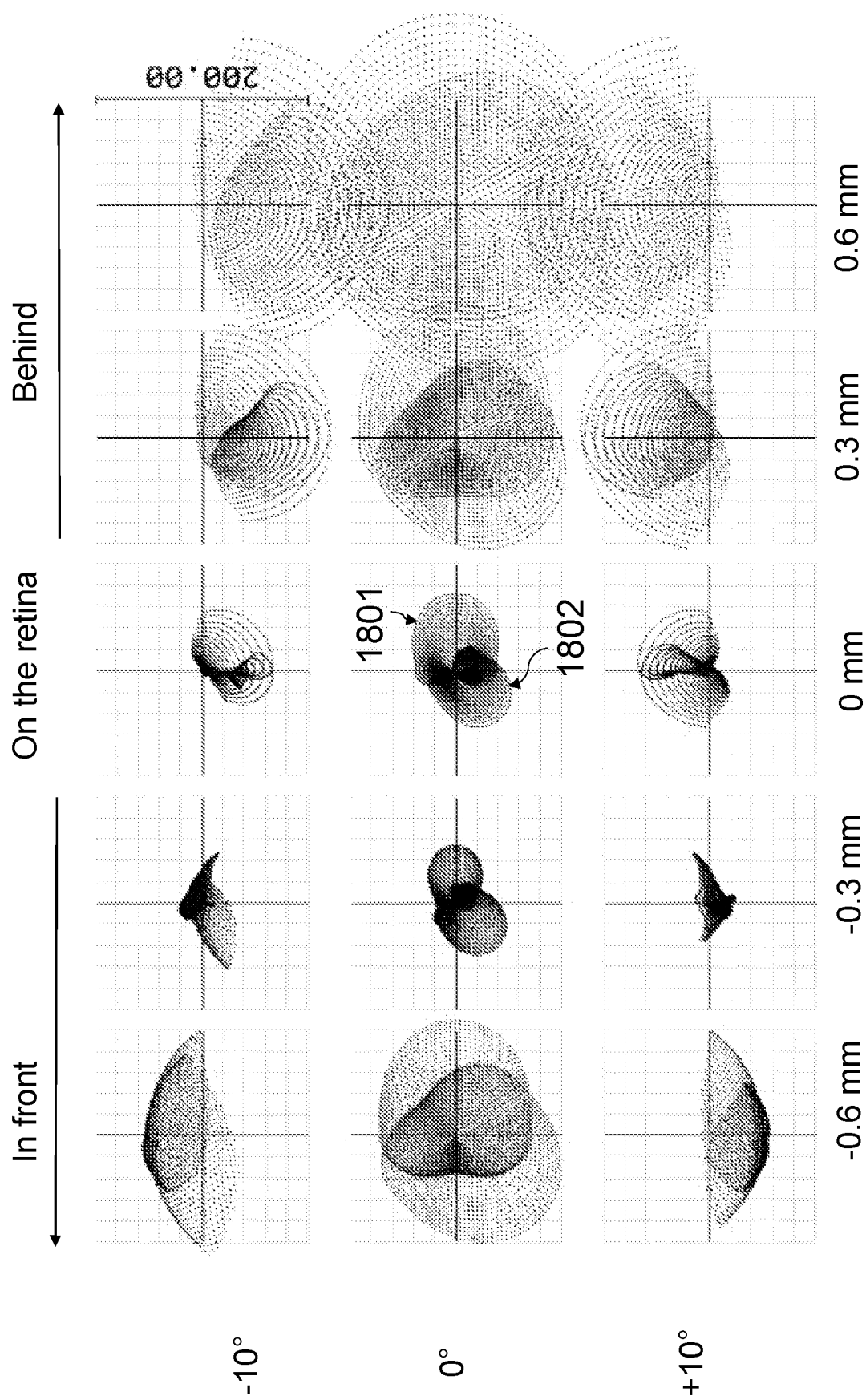
FIG. 18 illustrates a temporally and spatially varying signal, depicted as a wide-angle through-focus spot diagram when the incoming light is incident on a left −3 D myopic model eye corrected with two left lenses of the two pairs of the myopia management spectacles or spectacle fronts as described in FIGS. 15A and B as disclosed herein over the prescribed periods. The 2$^{nd}$ row represents on-axis field angle 0 degrees and the 1$^{st}$ and 3$^{rd}$ rows represent off-axis field angles: −10 degrees and +10 degrees.

FIG. 18 illustrates a temporally and spatially varying signal, depicted as a wide-angle through-focus spot diagram when the incoming light is incident on a left −3 D myopic model eye corrected with two the left lenses of the (2) pairs of the spectacles described in FIG. 15 over the prescribed two (2) periods under the prescribed care regimen. The rows represent optical performance over various field angles: −10 degrees, 0 degree and 10 degrees. The irregular blur pattern 1801 is the resulting spot diagram when the left eye is corrected with the left lens 1502a of the first pair of spectacles 1500a and the irregular blur pattern 1802 is the resulting spot diagram when the left eye is corrected with the left lens 1512a of the second pair of spectacles 1511a.

The through-focus spot diagrams of FIG. 18 are representations of a time integral of the optical signals obtained by integrating the resultant responses when the left lenses of the two pairs of spectacles are fitted on a −3 D myopic model eye. The time integral means combining the effects of pairs of spectacles worn over the prescribed two (2) periods in one through-focus spot diagram representation.

The through-focus geometric spot analysis about the retinal plane is computed at five locations, i.e., from −0.6 to +0.6 mm in 0.3 mm steps; wherein the retinal locations −0.6 mm and −0.3 mm are in front of the retina; the retinal location 0 mm is on the retina; and the retinal locations +0.3 mm and +0.6 mm are behind the retina.

As can be seen, in this example where the right and left myopic eyes are corrected with the right and left spectacle lenses of the first and second pair of spectacles (FIG. 15A) the resulting irregular blur patterns (FIG. 17 and FIG. 18) vary in size and shape for the different spectacle lens pairs, i.e., resulting in the desired spatially and temporally varying stop signal. This also results in changes to visual performance between the two spectacle wearing periods.

Figure 19:
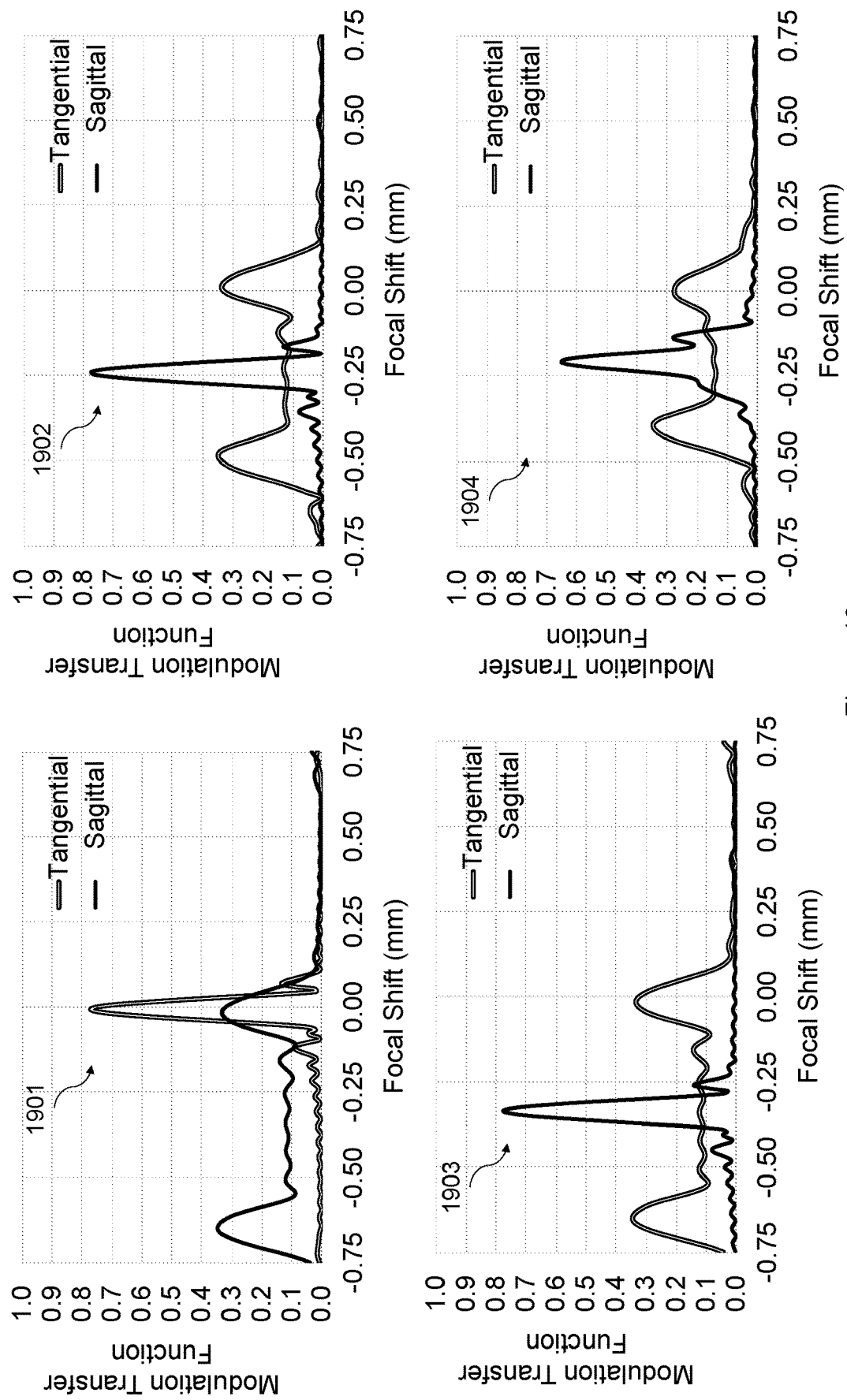
FIG. 19 illustrates the retinal signal depicted as on-axis, through-focus, modulation transfer function for the tangential and sagittal meridians, which were computed when the incoming light with a visible wavelength (589 nm) and a vergence of 0 D, is incident on a model eye with −3 DS of myopia corrected with the each of the lenses of the two pairs of myopia management spectacles or spectacle fronts as described in FIGS. 11 to 14.

When the incoming light of a visible wavelength (589 nm) of vergence 0 D, is incident on the schematic model eye with a prescription of −3 DS (Table 1), is corrected with the right spectacle lenses (1501a and 1511a), the retinal signal depicted as on-axis, through-focus, modulation transfer functions 1901 and 1903 for the tangential and sagittal meridians are illustrated in FIG. 19. When the incoming light of a visible wavelength (589 nm) of vergence 0 D, is incident on the schematic model eye with a prescription of −3 DS (Table 1), is corrected with the left spectacle lenses (1502a and 1512a), the retinal signal depicted as on-axis, through-focus, modulation transfer functions 1902 and 1904 for the tangential and sagittal meridians are illustrated in FIG. 19.

When compared to the spectacle lens pairs described in FIG. 6 (as previously disclosed in PCT/AU2020/051005), the variations in visual performance when changing from one pair of spectacles to the next is minimised, i.e., more balanced, with the current exemplary spectacle lens designs, as the peak of at least one plane (sagittal or tangential) in front of the retina is reduced.

Figure 20:
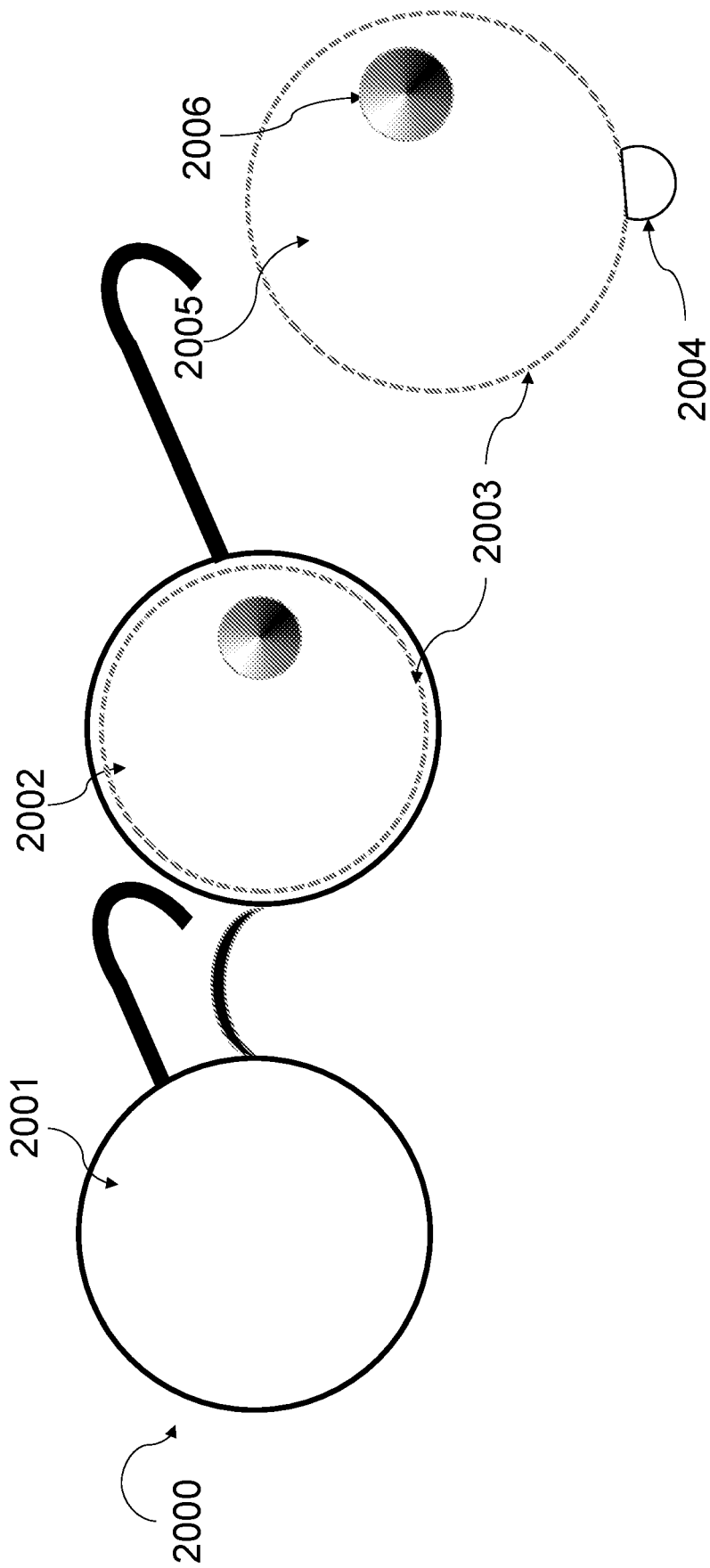
FIG. 20 illustrates a standard pair of single vision spectacles used for correction of myopia to which an auxiliary optical sheet or film (from the kit or set disclosed herein) is applied over substantially the entire surface area of the left spectacle lens to convert the left lens of the said standard pair of single vision spectacles to a myopia management spectacle lens, wherein methods of the dispensing the auxiliary optical sheets or films are described herein.

FIG. 20 illustrates a standard pair of spectacles used for correction of myopia to which an auxiliary optical sheet or film drawn from the kit or set disclosed herein, is applied over substantially the entire surface area of the left spectacle lens to convert the said standard pair of single vision spectacles to a pair of myopia management spectacles, wherein methods of dispensing the auxiliary optical sheet or film are described herein.

The left portion of FIG. 20 shows a pair of standard single vision spectacle lenses 2000 with a right (2001) and left lens (2002) that may be used to correct the myopic refractive error with or without astigmatism.

The right portion of FIG. 20 shows an exemplary embodiment including an optical film or sheet designed to substantially cover the left lens 2002 shown by dotted borders; wherein the optical film or sheet 2003 is configured with substantially plano power 2005 across the optical film or sheet and one circular optical element 2006 configured such that the optical element falls in the temporal region of the left lens of the spectacle lens.

The optical film or sheet may be peeled using the 2004 portion of the film allowing it to be placed on the spectacle lens. In this example, the diameter of the circular optical element is approximately 4 mm. The optical element is configured with one or more meridionally and azimuthally variant power distributions, wherein at least one of the meridionally and azimuthally variant power distribution is devoid of mirror symmetry. In some examples, the impermanent auxiliary optical film or sheet configured with at least one circular optical element of the present invention includes an adhesive backing to adhere the optical sheet or film to the standard single vision spectacle lens. The impermanent adhesive backing may be a peel-able, a self-sticking, or any other suitable adhesive means to adhere to the impermanent auxiliary optical film or sheet to the standard single vision spectacle lens.

An exemplary method of use of the disclosed impermanent auxiliary optical film or sheet to be used in conjunction with the wearer's own spectacle lenses are described herein. For example, the shape of the wearer's own spectacle lenses and/or frame may be traced by an eye care practitioner, or an optical dispenser, or any other trained professional, to ascertain the shape and the size of the impermanent optical film or sheet that is required to comply with the care regimen disclosed herein.

For example, the impermanent auxiliary optical films or sheets may then be cut, or punched out, to substantially match the traced shape of their spectacle frame or lenses, in accordance with the current disclosure. The individually tailored impermanent optical films or sheets may then be dispensed in a form of a set or a kit that includes or comprises various permutation and combination of shapes, designs and locations of one or more optical elements configured within the impermanent auxiliary optical film or sheet, as described in FIGS. 21 and 22.

Figure 21:
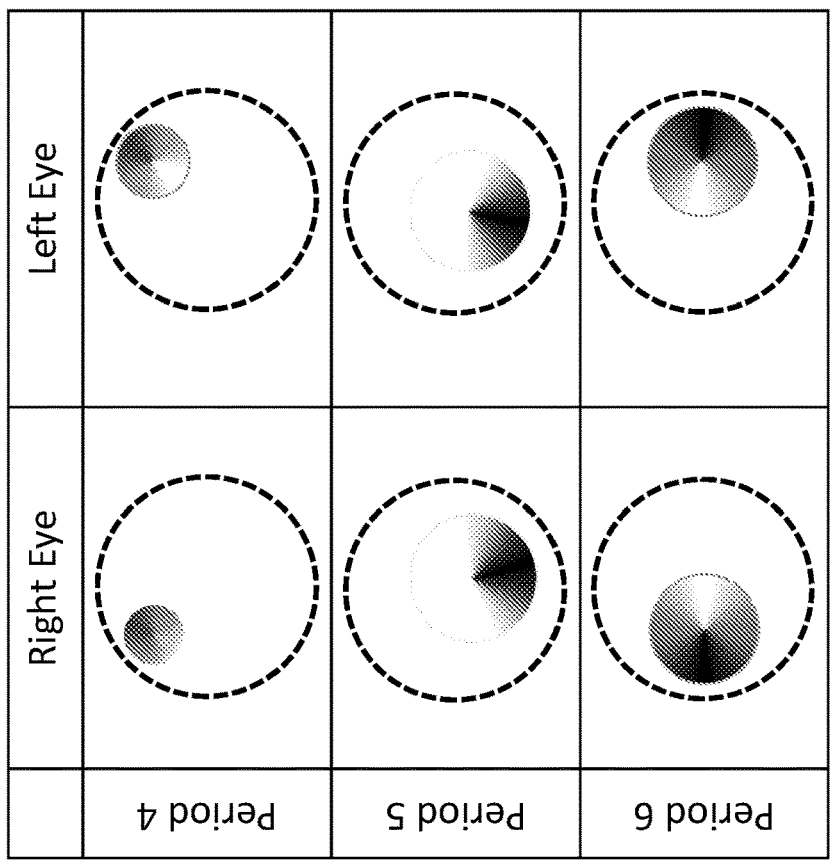
FIG. 21 illustrates an array of ready-made impermanent auxiliary optical sheets or films enclosed in the kit or set disclosed herein which are suitable for use over substantially the entire surface area of a standard pair of single vision spectacle lenses described in FIG. 20 over the prescribed periods 1 to 6 described herein.
Figure 21:
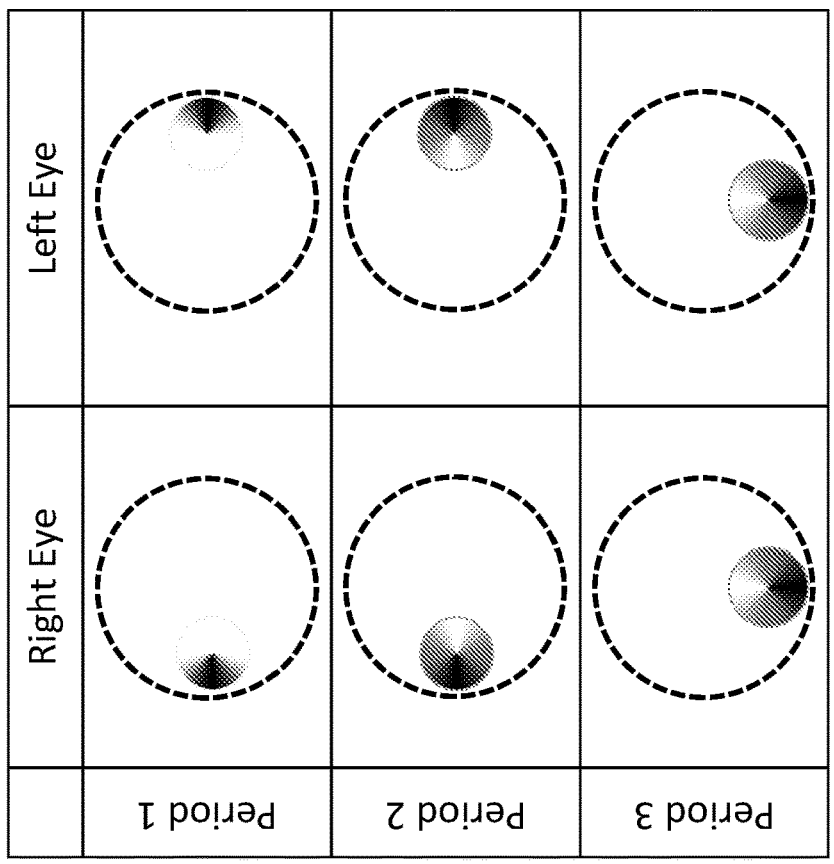

An exemplary method of using the spectacle apparatus kit with impermanent auxiliary optical films and/or sheets involves the following steps: (i) to measure the shape and size of the wearer's own spectacle lenses and/or frame to determine the shape and the size of the impermanent optical film; (ii) cut or punch-out the impermanent auxiliary optical film such that it substantially matches the shape of their spectacle lenses or frame; (ii) dispense in a form of a set or a kit that includes the multiple pairs of cut or punched-out individually tailored pairs of impermanent optical films comprising various permutations and combinations of sizes, shapes, designs and locations of one or more optical elements configured within the impermanent auxiliary optical film or sheet; and (iv) provide a set of instructions to comply with the specific care regimen. In some other examples, the impermanent auxiliary optical film or sheet may be configured with at least two or three optical elements; each having the meridionally and azimuthally varying power distribution of the present invention. In other examples, the shape of optical element may be oval, non-circular, or any other regular or irregular shape. In other examples, the diameter of the optical element may be between 0.75 mm to 4 mm, 0.75 mm to 2 mm, 1.25 mm to 3 mm, or 1.25 mm to 3 mm. In other examples, the surface area of the optical elements may be approximately between 0.5 square mm and 12 square mm, 1.5 square mm and 6 square mm, or 2.5 square mm and 8 square mm, FIG. 21 illustrates an array of ready-made impermanent auxiliary optical sheets or films enclosed in the kit or set disclosed herein which are suitable for use over the entire surface area of a standard pair of single vision spectacles described in FIG. 20 over the prescribed periods (1 to 6) described herein. In the example of FIG. 21, the right and left portions of the set or kit involving optical films or sheets are configured with one circular optical element characterised by meridionally and azimuthally varying power distribution disclosed herein. In the example the meridionally and azimuthally varying power distributions within the optical elements are as described in the four designs of FIGS. 11 to 14. The varying positions or locations of the optical element within the optical film or sheet and its application on the standard single vision spectacle lens used for the correction of myopia provides a temporally and spatially varying optical stop signal or stimulus to the eye.

In the example of FIG. 21, the dimensions of the individual circular optical elements within the set or kit of optical sheets vary between 3 mm and 6 mm in diameter. In these examples, the meridionally and azimuthally varying power distributions within each of the optical elements is shown with power maps, as described in detail in FIGS. 11 to 14.

In the example of FIG. 21, the circular optical elements configured within the optical film are configured differently for the different periods and the two eyes, i.e., the optical elements differ in design, size, location, delta power and axes (i.e., the flattest half-meridian). These different optical element configurations result in the desired spatially and temporally varying stop signal.

Figure 22:
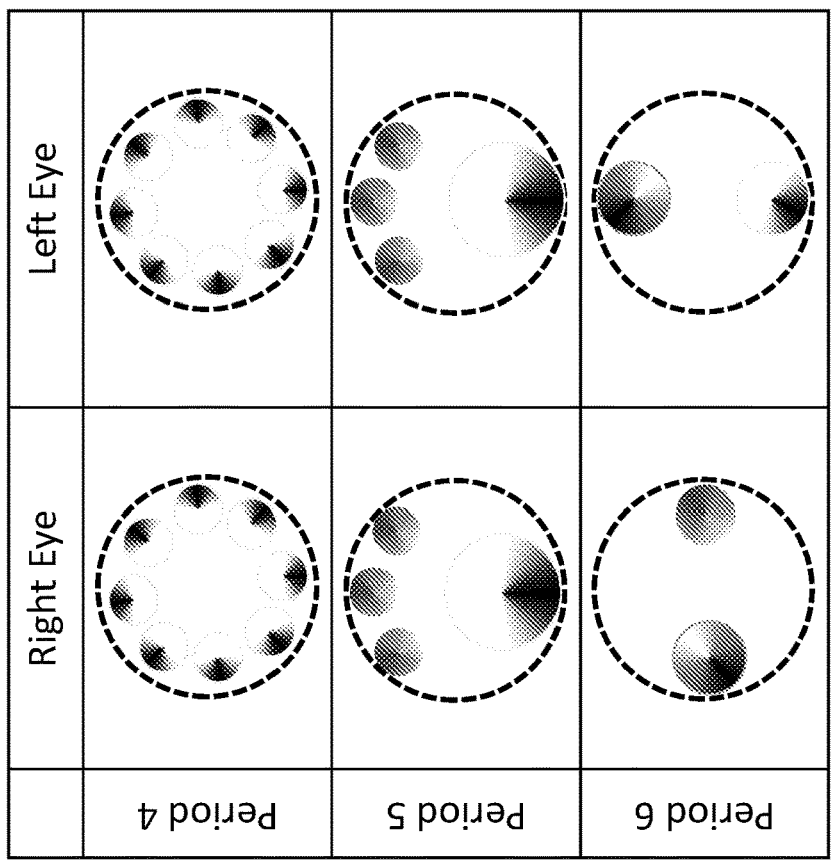
FIG. 22 illustrates another array of ready-made impermanent auxiliary optical sheets or films enclosed in the kit or set disclosed herein which are suitable for use over substantially the entire surface area of a standard pair of spectacle lenses described in FIG. 20 over the prescribed periods 1 to 6 described herein.
Figure 22:
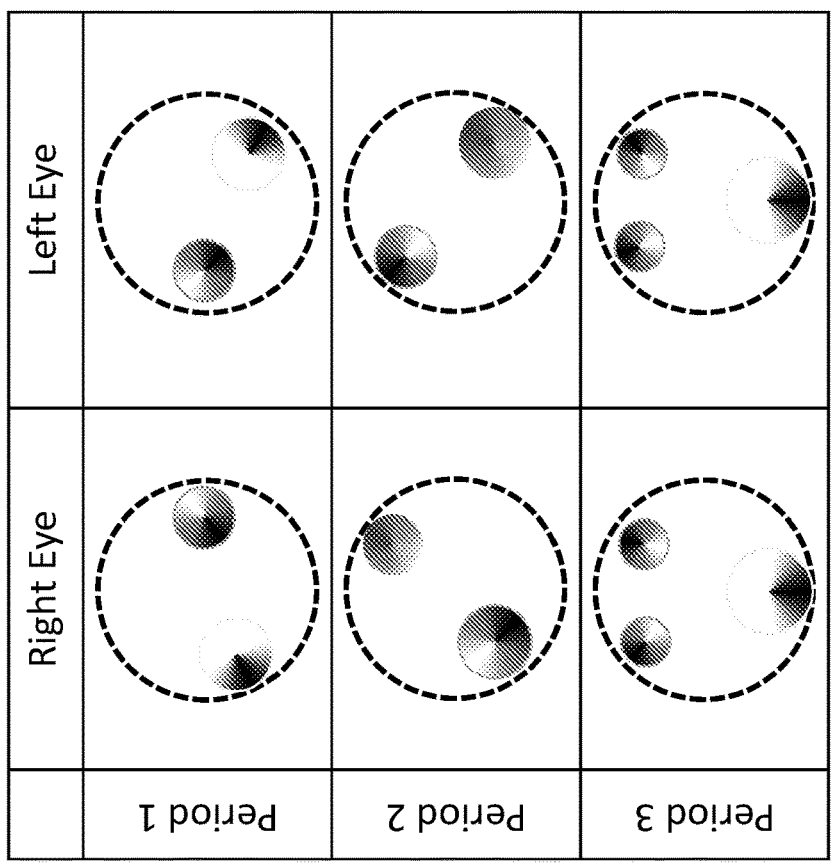

FIG. 22 illustrates another array of ready-made impermanent auxiliary optical sheets or films enclosed in the kit or set which are suitable for use over substantially the entire surface area of a standard pair of single vision spectacles described in FIG. 20. The optical films or sheets of FIG. 22 are configured to be used over six (6) different wearing periods described herein.

In the example of FIG. 22, the exemplary embodiments including a set or kit of impermanent auxiliary optical films or sheets designed to substantially cover the right and left lenses of standard pair of single vision spectacles used for correction of myopia in FIG. 20; wherein the optical film or sheet is configured with substantially plano power across the optical film or sheet and further configured with at least two circular optical elements within the optical film or sheet. The optical film or sheet may be peeled allowing it to be placed on the appropriate single vision spectacle lens, right or left.

In some examples, the six (6) wearing periods described in FIGS. 21 and 22 may be every day of the week, for example, Monday to Saturday, or Sunday to Friday. In some other example, the six (6) wearing periods maybe every alternate day of the week; while in some other example, the six (6) wearing periods may include a specific day of the month, for example, $1^{st}$, $5^{th}$, $10^{th}$, $15^{th}$, $20^{th}$ and $25^{th}$ of every month.

Figure 23:
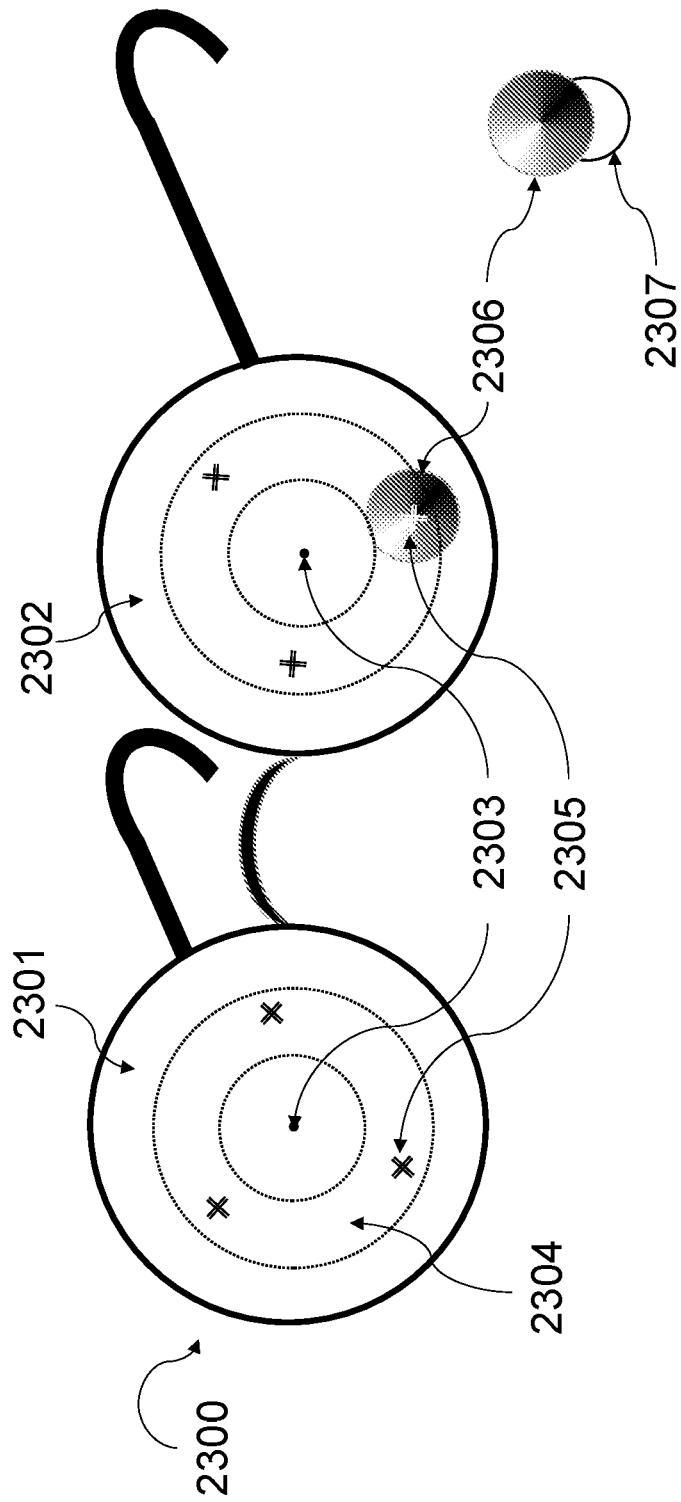
FIG. 23 illustrates another standard pair of single vision spectacle used for correction of myopia to which an auxiliary optical sheet or film from the kit or set disclosed herein is applied over a regional surface area of the standard single vision spectacle lens to convert the said standard pair of single vision spectacles to a pair of myopia management spectacles, wherein methods of the dispensing the auxiliary optical sheet or film are described herein.

FIG. 23 illustrates another pair standard single vision spectacles used for correction of myopia to which an impermanent auxiliary mini optical elements is applied over only a regional area of the spectacle lens to convert the said standard pair of single vision spectacles to a pair of myopia management spectacles, wherein methods of the dispensing the impermanent auxiliary mini optical elements are described herein. In this example, the left portion of FIG. 23 shows a pair of standard spectacle lenses 2300 with a right 2301 and left lens 2302 that may be used to correct the myopic refractive error with or without astigmatism. The optical centres of the right and left lenses are denoted by 2303.

A region of interest on the spectacle lens 2304 may be identified by marking an inner and outer border depicted in dotted lines. Further, some locations may be identified as areas where the optical elements are to be placed, denoted as crosses that may be engraved within the matrix of the single vision spectacle lens for ease of locating the markings, for example, 2305. The right portion of FIG. 23 shows an exemplary embodiment including a mini optical element to be placed on a selected region of the right lens marked by a cross 2305 and exemplified using solid borders; wherein the mini optical element is configured such that the optical element falls in the inferior region of the right single vision spectacle lens. The mini optical element may be peeled using the 2307 portion allowing it to be placed on the single vision spectacle.

Figure 24:
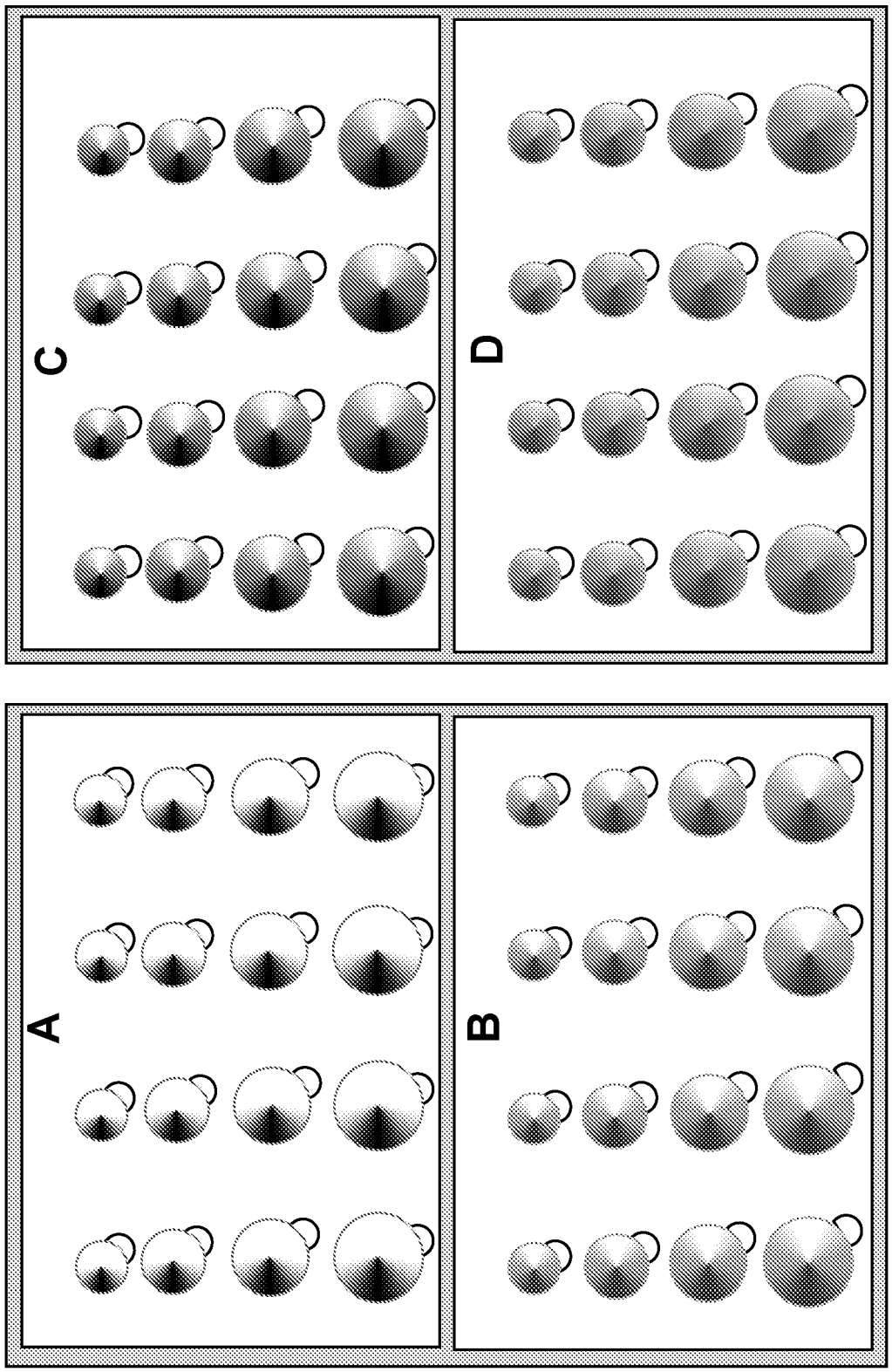
FIG. 24 illustrates an array of ready-made impermanent auxiliary optical sheets or films enclosed in multiple subsets within the kit or set disclosed herein which are suitable for use over the regional surface area of a standard pair of single vision spectacles described in FIG. 23 in a prescribed location over the prescribed periods as described herein.

FIG. 24 illustrates an array of optical sheets or films comprising ready-made impermanent auxiliary mini optical elements enclosed in multiple subsets within the kit or set configured for four (4) different periods. The mini optical elements are suitable for use only over a regional area on a standard pair of spectacles described in FIG. 23. For example, the Set A of FIG. 24 comprises of numerous circular mini optical elements, wherein each optical element is configured with a meridionally and azimuthally varying power distribution as described in FIG. 11 and the mini optical elements in Set B, C and D have meridionally and azimuthally varying power distribution as described in FIGS. 12, 13 and 14, respectively. The mini-optical elements in each set vary between 3 mm and 6 mm in diameter and the delta powers vary between 1 D and 2.5 D. In other examples, the surface area of the mini optical elements may be approximately between 0.5 square mm and 12 square mm, 1.5 square mm and 6 square mm, or 2.5 square mm and 8 square mm, In other examples, the diameter of the mini optical element may be between 0.75 mm to 4 mm, 0.75 mm to 2 mm, 1.25 mm to 3 mm, or 1.25 mm to 3 mm.

In this example of FIG. 23, a specific or prescribed location on the spectacle lens may be defined using laser engravings made onto the spectacle lens in form of a dot, line, or a cross-shaped pattern. Further, the method of prescribing the set or kit includes the wearer to stick or adhere the mini optical element to the specified region or regions of the spectacle lens over the specified period.

An exemplary method of use of the disclosed impermanent auxiliary mini optical elements to be used in conjunction with the wearer's own spectacle lenses are described herein. For example, a predetermined set of locations on the wearers own spectacle lenses may be traced and defined by an eye care practitioner, or an optical dispenser, or any other trained professional, to facilitate the wearer to change the location of the mini optical elements as per the care regimen, In some examples, the choice of the predetermined set of locations on the wearer's own spectacle lenses may be ascertained by considering various patient related factors, for example the magnitude of myopia, the onset of myopia, parental myopia, age, gender, and other risk factors generally associated with progression of myopia or high myopia.

In some examples, the magnitude of delta power, azimuthally and meridionally varying power distribution, design, axis, size, location of the impermanent auxiliary mini optical elements prescribed under a care regimen may be chosen depending on the risk factors of the wearer. For example, a high progressing myopes may be prescribed at least one mini optical element that has a delta power that is at least 1.5, 2, 2.5, or 3D. In another example, a high progressing myope may be prescribed at least one mini optical element that is configured with a specific design features that allows for a greater spatial and temporal variation of the optical signal, which may provide a stronger optical stimulus to provide greater efficacy over time.

For example, the impermanent auxiliary optical films or sheets may then be cut, or punched out, to substantially match the traced shape of their spectacle frame or lenses, in accordance with the current disclosure. The individually tailored impermanent optical films or sheets may then be dispensed in a form of a set or a kit that includes or comprises various permutation and combination of shapes, designs and locations of one or more optical elements configured within the impermanent auxiliary optical film or sheet, as described in FIGS. 21 and 22.

Figure 25:
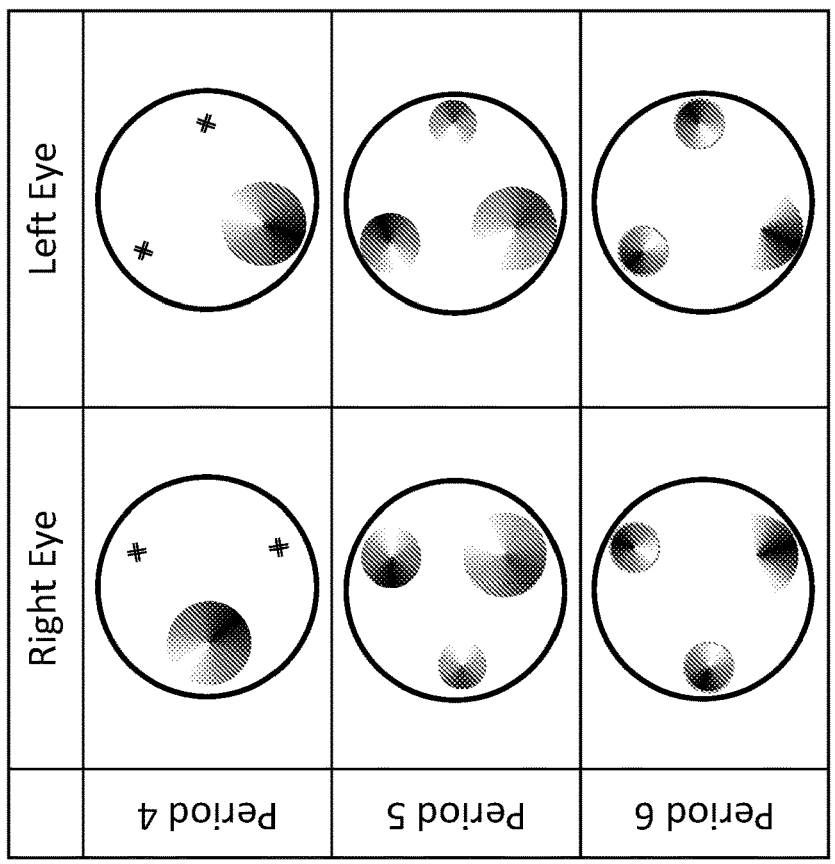
FIG. 25 illustrates an array of ready-made impermanent auxiliary optical sheets or films enclosed multiple subsets within the kit or set of FIG. 24, which are purposefully configured over the regional surface area of a standard pair of single vision spectacles described in FIG. 23 in a prescribed location over the prescribed periods 1 to 6 as described herein.
Figure 25:
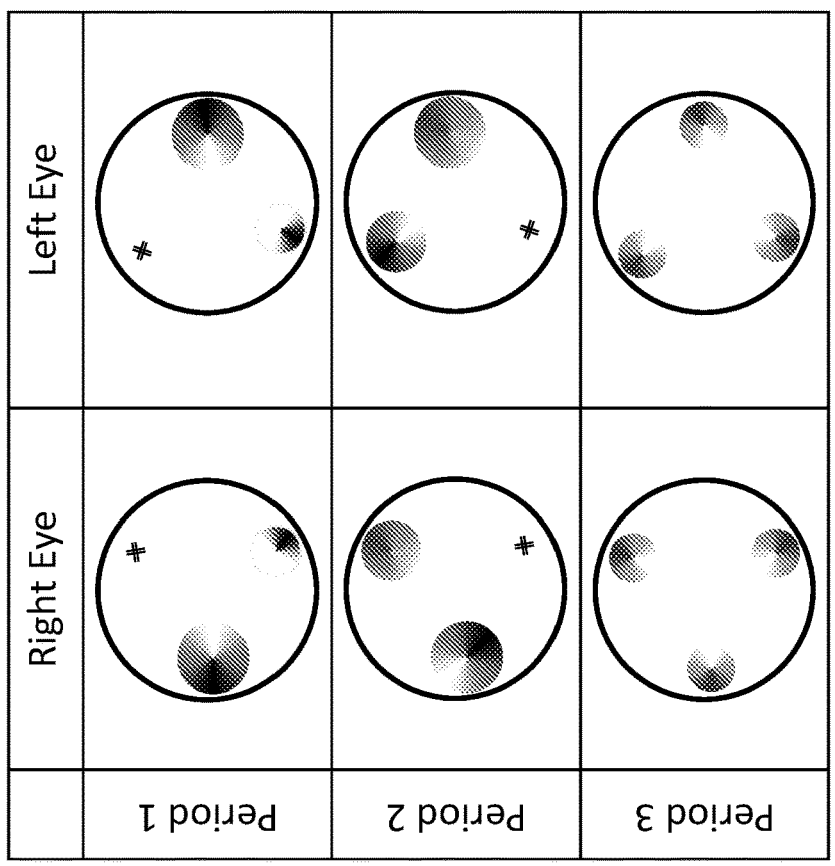

FIG. 25 illustrates the use of mini optical elements described in Sets A to D of FIG. 24, each comprising an array of ready-made impermanent auxiliary mini optical elements of similar designs. In this example, in the first period, the mini optical elements of Set A and C are configured on the selected regions of the left and right spectacle lenses used for the correction of myopia with or without astigmatism, in this example, the symmetry along the ordinate was maintained.

In the second period, the mini optical elements were drawn from Set B and C and are configured on the selected regions of the left and right spectacle lenses, with the symmetry along the ordinate was maintained. In the third period, the mini optical elements were all drawn from Set C of FIG. 24 and are configured on the selected regions of the left and right spectacle lenses, with the symmetry along the ordinate was maintained. In the fourth prescribed period, the mini optical elements were all drawn from Set C of FIG. 24 and are configured on the selected regions of the left and right spectacle lenses, symmetry along the ordinate was not maintained.

In the fifth period, three mini optical elements were drawn from Sets C, B and D of FIG. 24 and are configured on the selected regions of the left and right spectacle lenses, maintain the symmetry along the ordinate.

In the sixth period, three mini optical elements were all drawn from Sets A and C of FIG. 24 and are configured on the selected regions of the left and right spectacle lenses, maintain the symmetry along the ordinate.

Figure 26:
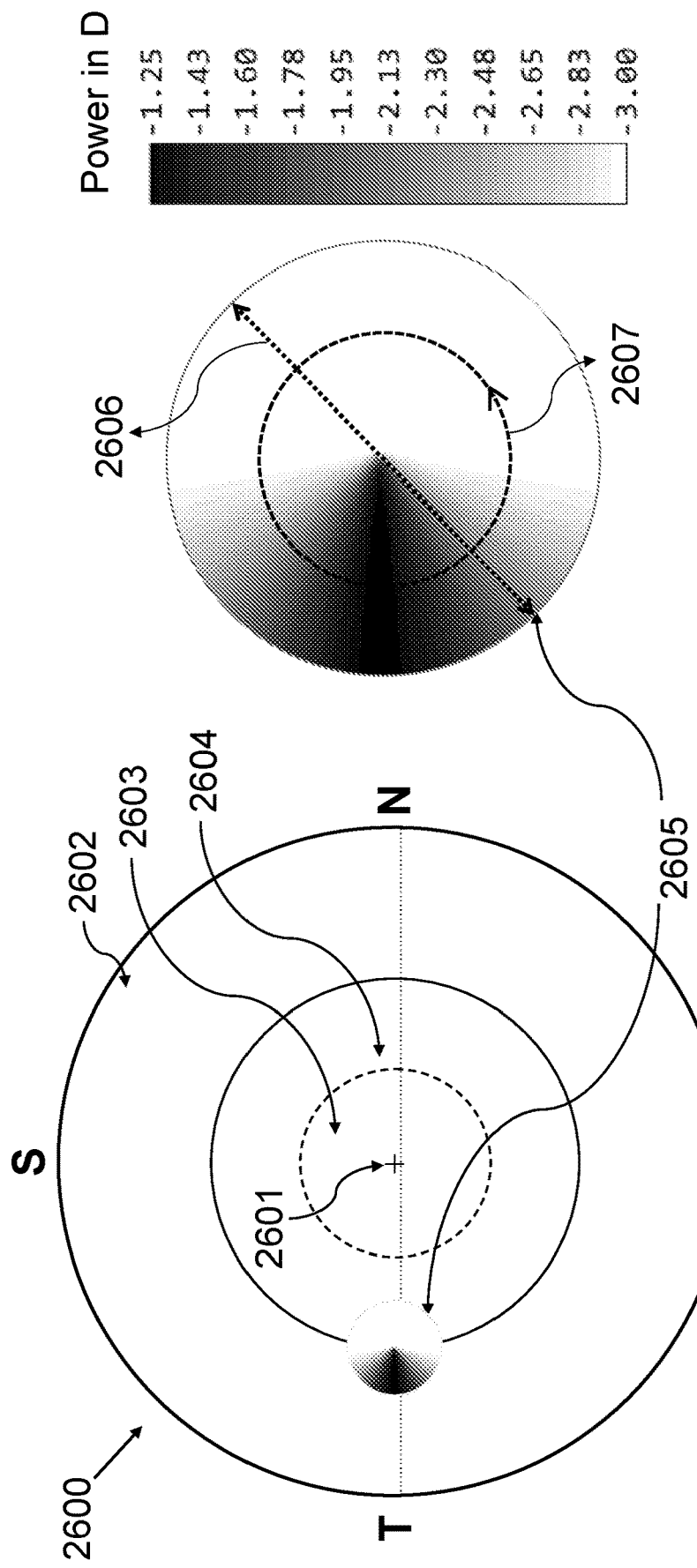
FIG. 26 illustrates a standard single vision spectacle blank configured with an auxiliary mini optical element (1.75 mm diameter) or film drawn from the kit or set wherein the power map of the optical element in conjunction with a −3 DS standard spectacle lens has a substantially radially invariant, meridionally and azimuthally variant, power distribution (power: −3 DS/+1.75 D, Hem i-Sphere Element).

FIG. 26 illustrates a standard single vision ready-made spectacle blank 2600, ordinarily used for correction of myopia with or without astigmatism, to fit a spectacle frame with a 25 mm lens diameter. The said spectacle lens 2600 configured with an impermanent auxiliary mini optical element 2605, comprising of a meridionally and azimuthally varying power distribution, the element is drawn from the kit or set A disclosed in FIG. 24.

In this example, the standard spectacle lens is configured with a region of interest defined about the optical centre 2601 with an inner diameter of approximately 8 mm represented by dotted lines 2603 and an outer diameter of approximately 15 mm represented by solid line 2602 forming a region of interest 2604 identified for positioning said the impermanent auxiliary mini optical element. The standard single vision ready-made spectacle blank of FIG. 26 has a base prescription of −3 DS used to correct −3 DS of myopia in an eye.

The said impermanent auxiliary mini optical element 2605 is located approximately 4.5 mm away from the geometric centre (2601) of the −3 DS spectacle lens 2600. The mini optical element 2605 is circular and approximately 1.75 mm in diameter and has a blending width of 0.1 mm. In certain other embodiments, there could be some advantage in making the mini optical elements non-circular or any other regular and irregular shape, which are considered to be within the scope of this disclosure. In any of these applications, there may be a step in thickness around the perimeter at least along some sections.

The said impermanent auxiliary mini optical element 2605 has a meridionally (2606) and azimuthally (2607) varying power profile with +1.75 D of delta power (Hemi-Sphere Element). The combined power map (i.e., the power of the −3 DS standard spectacle lens together with the power of the mini optical element) shows that the mini optical element's half-meridian with the power of −3 DS is along the temporal direction of the standard spectacle lens and the half-meridian with the power of −1.25 DS is along the nasal direction. The superior, temporal, inferior and nasal portions on the standard spectacle lens are denoted by characters S, T, I and N, respectively.

Figure 27:
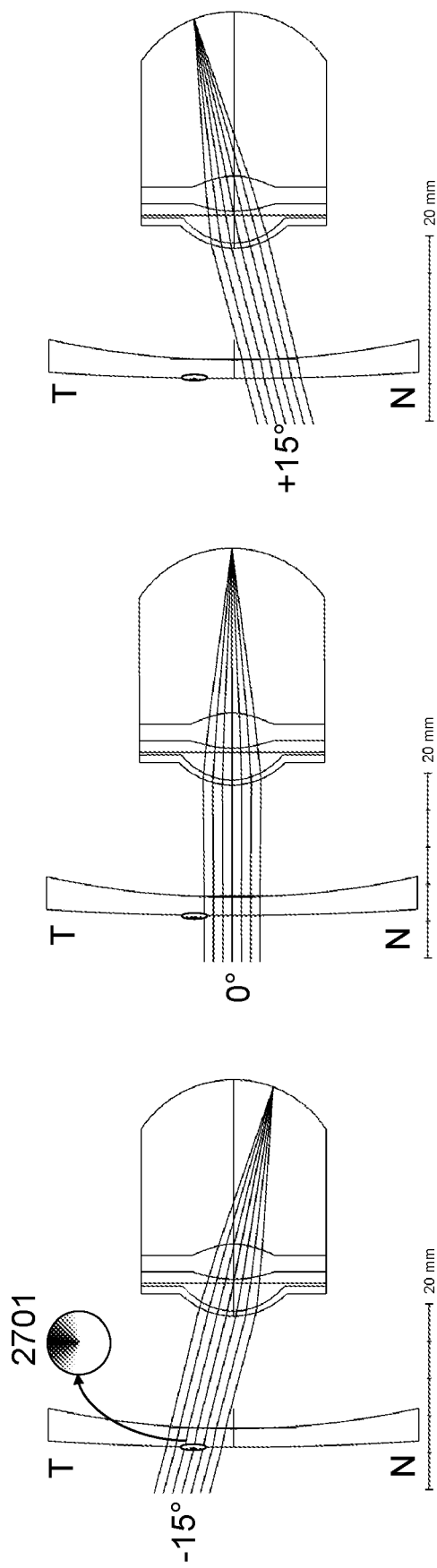
FIG. 27 illustrates a wide-field ray tracing schematic diagram of a right −3 D myopic eye corrected with the exemplary embodiment described in FIG. 26; the ray tracing schema encompassing three visual field angles for the spectacle wearer: temporal field angle (−15.0 degrees), central field angle (0.0 degrees) and nasal field angles (15.0 degrees).

FIG. 27 illustrates a wide-field ray tracing schematic diagram of a −3 D myopic eye corrected with the exemplary embodiment described in FIG. 26; the ray tracing schema encompassing three visual field angles when the spectacle lens is used in conjunction with the model eye of Table 1. The representing ray bundles of light going through (a) the temporal portion of the lens (−15,0); (b) central portion of the lens (0,0); and (c) the nasal portion of the lens (15,0).

As seen from FIG. 27, the only ray bundle through a temporal portion of the lens encounters the said impermanent auxiliary mini optical element 2701 providing the desired optical stop signal at the corresponding retinal location. The ray bundles going through the central and nasal portion of the spectacle lens do not impose any optical stop signal at the desired retinal location.

Figure 28:
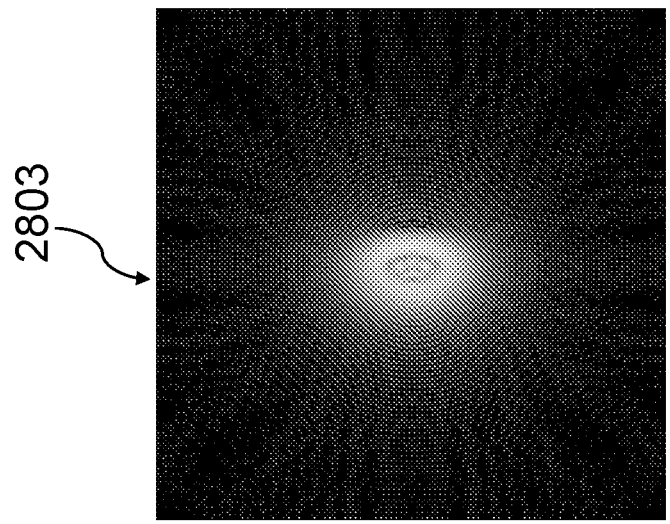
FIG. 28 illustrates point spread functions over a wide-field view when the incoming light is incident on a right −3 D myopic model eye corrected with the exemplary embodiment described in FIG. 26. The three-point spread functions represent three visual field angles when the light goes through, (a) the second region located temporally on the spectacle lens (−15.0 degrees), (b) central field (0.0 degrees), and (c) when incident light goes through the nasal field angle (15.0 degrees).
Figure 28:
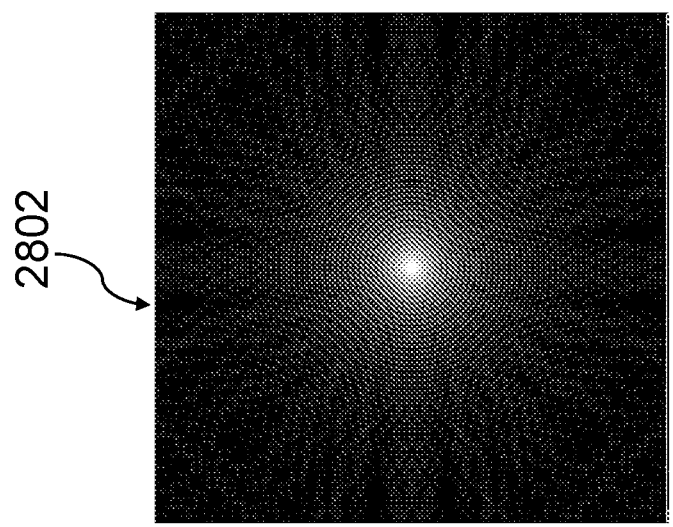
Figure 28:
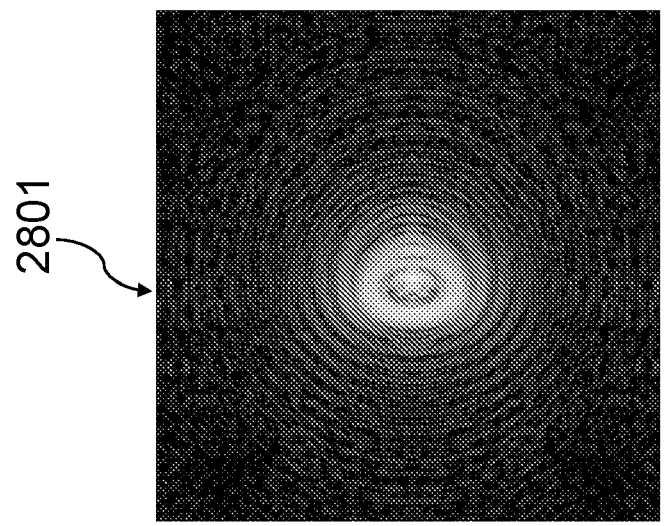

FIG. 28 illustrates point spread functions over a wide-field view when the incoming light is incident on a −3 D myopic model eye corrected with the exemplary embodiment described in FIG. 26.

As seen from FIG. 28, the ray bundle going through the impermanent auxiliary mini optical element 2605 produces a point spread function 2801 that is affected by the additional meridionally and azimuthally varying power distribution within the mini element producing the desirable directional cue or optical stop signal compared to 2803 which is formed when the ray bundle is going through the spectacle lens portion devoid of the mini optical element. The central ray bundle going through the base spectacle lens produces an ideal point spread function 2802.

Figure 29:
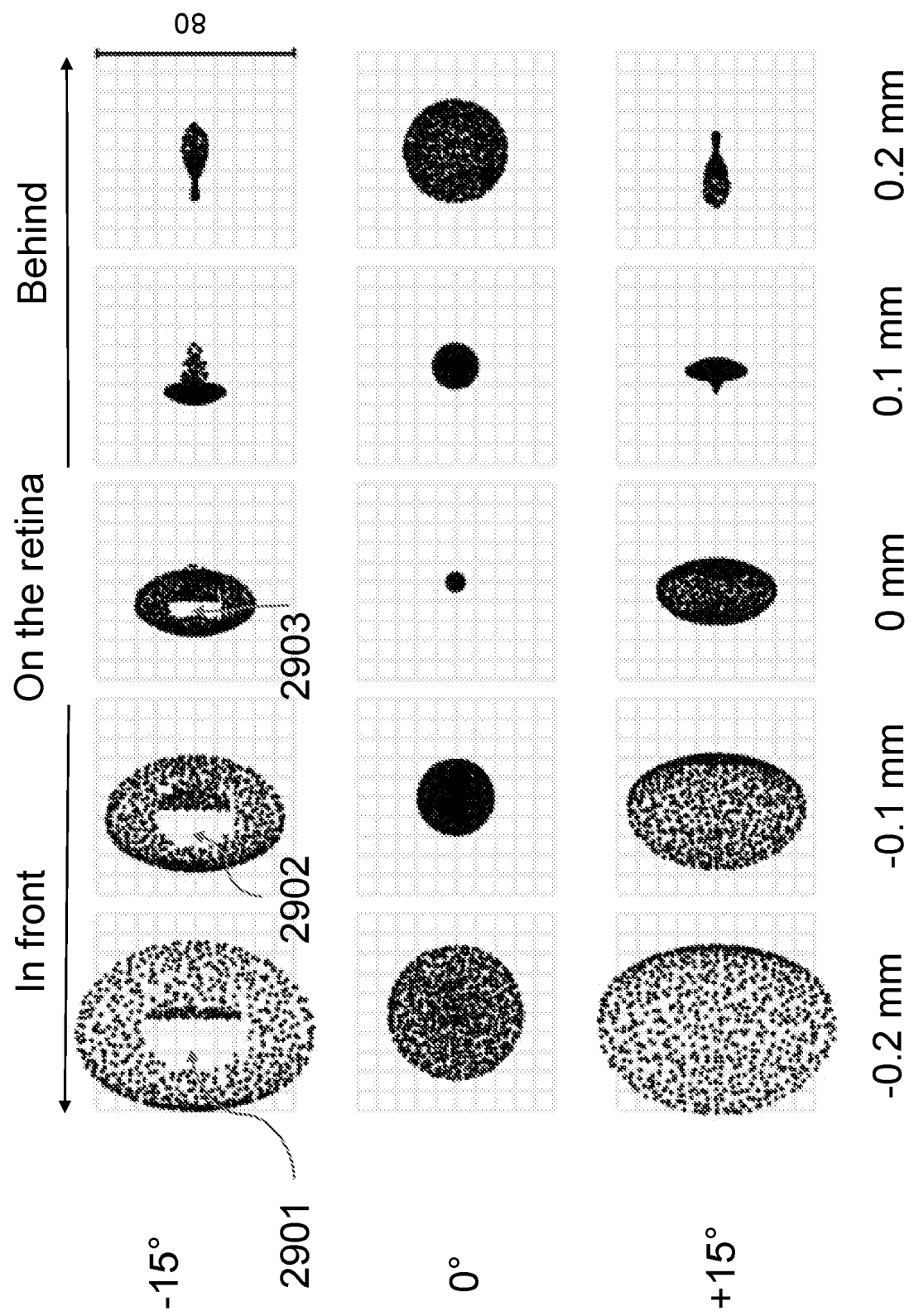
FIG. 29 illustrates a temporally and spatially varying signal, depicted as a wide-angle through-focus spot diagram when the incoming light is incident on a right −3 D myopic model eye corrected with an exemplary embodiment described in FIG. 26. The performance is represented at various field angles: $1^{st}$ row represents −15 degrees temporal field angle; $2^{nd}$ row represents central field angle 0 degrees; and 3rd row represents 15 degrees nasal field angle.

FIG. 29 illustrates a spatially varying signal, depicted as a wide-angle through-focus spot diagram. When the incoming light of a visible wavelength is incident on a −3 D myopic model eye corrected with one exemplary embodiment described in FIG. 26, the optical performance of the spectacle lens in conjunction with the model eye of Table 1 is represented over various field angles.

The rows represent the through focus spot diagram formed when a ray bundle goes through three distinct regions of the spectacles: (a) the first row represents through-focus spot diagram when the incoming ray bundle passes through the impermanent auxiliary mini optical element located temporally on the spectacle lens; (b) the second row represents data obtained when incoming ray bundle passes through the central portion of the spectacle lens free of auxiliary mini optical elements and (c) the $3^{rd}$ row showcases data obtained when the incoming ray bundle passes through the nasal portion of the spectacle lens free of auxiliary mini optical elements.

As seen from FIG. 29, the ray bundle going through the impermanent auxiliary mini optical element produces a conoid of partial blur comprising irregular tangential 2901 and sagittal 2901 blur patterns substantially in front of the regional retina. However, when the incoming light passes through either the central or the nasal portion of the spectacle lens, i.e. regions substantially free of the mini optical elements, no distinct conoid of Sturm is observed either in front or about the retina.

In this example, the length, position, and orientation of the conoid of partial blur contributes to the directional cues or optical stop signals to reduce the rate of myopia progression in a wearer. In some embodiments, the delta power of the mini optical element and the location on the single vision spectacle lens is optimised to retain the entire conoid of partial blur in front of the peripheral retina, while in other embodiments, the optimisation of said properties of the mini optical element may position the conoid of partial blur about the retina with tangential and sagittal planes straddling the retina.

The prescribed method of changing the position of the mini optical elements on the single vision spectacle lenses provides temporal and spatial variation to the directional cues or stop signals; such that the efficacy of myopia management may be maintained constant over time.

Figure 30:
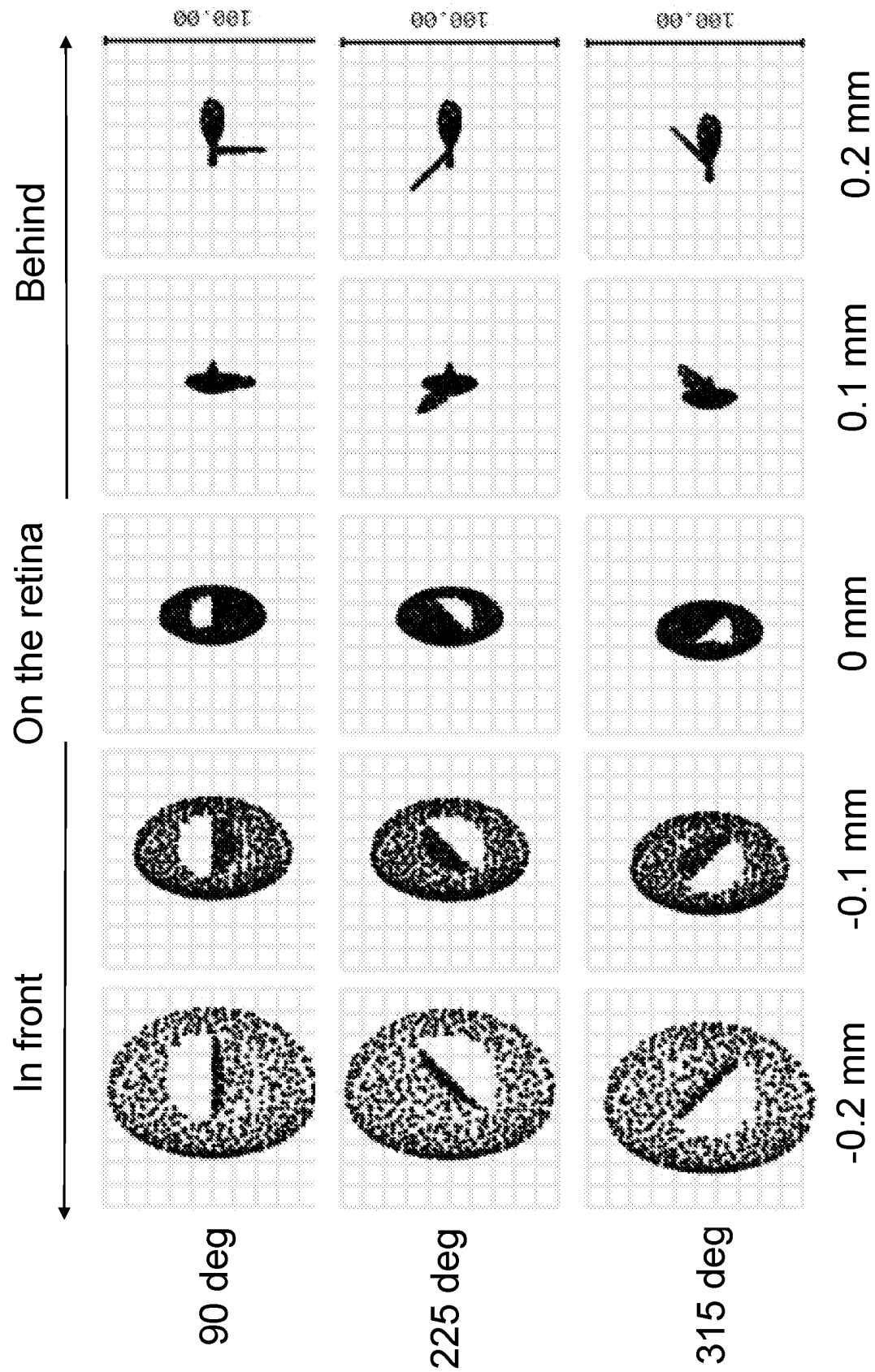
FIG. 30 illustrates a spatially and temporally varying signal, depicted as a wide-angle through-focus spot diagram when the incoming light is incident on a right −3 D myopic model eye corrected with an exemplary embodiment described in FIG. 26. The through-focus spot diagram of the exemplary embodiment in conjunction with the standard single vision spectacle lens is presented for 3 different configurations; wherein the location of the impermanent auxiliary mini optical element remained constant, but the orientation of the optical element was configured in the following positions: the principal meridian with lower power at 90 degrees, 225 degrees, 315 degrees visual field angles.

In the example of FIG. 30, the modelled effects of following a prescribed method of using an impermanent auxiliary mini optical element drawn from one of the sets or kits A to D described in FIG. 24, in conjunction with standard single vision base spectacle lenses described in FIG. 23 are discussed. For example, the through-focus spot diagram and point spread function on the retina is analysed for 3 different configurations. The three configurations depict the situation wherein the method of prescribing the impermanent auxiliary mini optical element with a meridionally and azimuthally varying power distribution described in FIG. 26 were used on the spectacle lenses at a prescribed spatial location, approximately 4.5 mm from the optical centre, but in the following prescribed manner; wherein the prescribed method includes the use of the mini optical element in 3 different axis/orientations of the mini optical elements flattest principal power meridian: (a) 90 degrees; (b) 225 degrees; and (c) 315 degrees. FIG. 24 illustrates a spatially and temporally varying signal, depicted when the mini optical elements are used in the prescribed manner.

Figure 31:
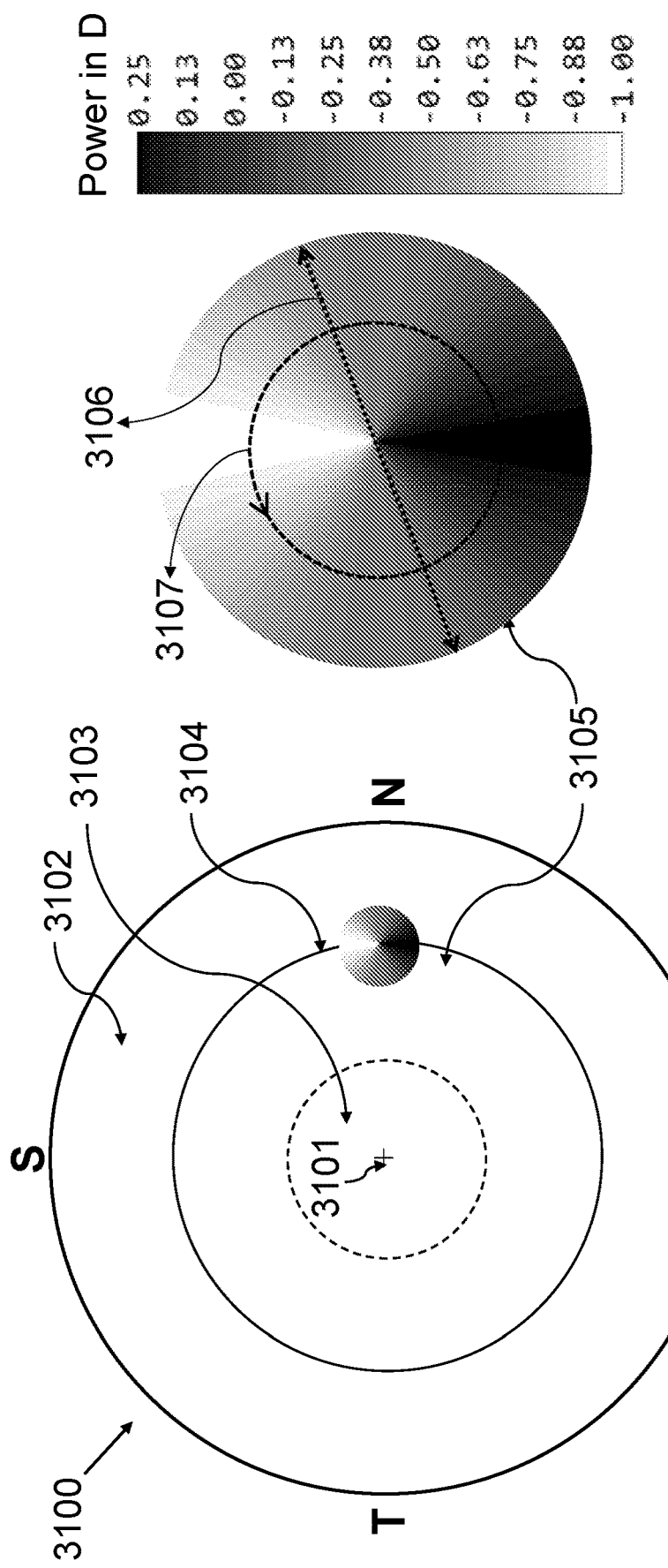
FIG. 31 illustrates a standard single vision spectacle blank cut configured with an auxiliary optical mini element (1.5 mm diameter) or film drawn from the myopia management kit or set disclosed herein, wherein the power map of the optical element in conjunction with a −3 DS standard spectacle lens has a substantially radially invariant, meridionally and azimuthally variant, power distribution (power: −1 DS/+1.25 D, Cosine-Variant I Element).

FIG. 31 illustrates a standard single vision ready-made spectacle blank 3100, ordinarily used for correction of myopia with or without astigmatism, to fit a spectacle frame with a 30 mm lens diameter. The said spectacle lens 3100 configured with an impermanent auxiliary mini optical element 3105, comprising of a meridionally and azimuthally varying power distribution, the element is drawn from the kit or set B disclosed in FIG. 24. In this example, the standard spectacle lens is configured with a region of interest defined about the optical centre 3101 with an inner diameter of approximately 7 mm represented by dotted lines 3103 and an outer diameter of approximately 25 mm represented by solid line 3102 forming a region of interest 3104 identified for positioning said the impermanent auxiliary mini optical element.

The standard single vision ready-made spectacle blank of FIG. 31 has a base prescription of −1 DS used to correct −1 DS of myopia in an eye. The said impermanent auxiliary mini optical element 3105 is located approximately 6 mm away from the geometric centre (3101) of the −3 DS spectacle lens 3100. The mini optical element 3105 is approximately 1.5 mm in diameter and has a blending width of 0.05 mm. The said impermanent auxiliary mini optical element 3105 has a meridionally (3106) and azimuthally (3107) varying power profile with +1.25 D of delta power (Cosine-Variant I Element). The combined power map (i.e., the power of the −1 DS standard spectacle lens together with the delta power of the mini optical element) shows that the mini optical element's half-meridian with the power of −1 DS is along the superior direction of the standard spectacle lens and the half-meridian with the power of +0.25 DS is along the nasal direction. The superior, temporal, inferior and nasal portions on the standard spectacle lens are denoted by characters S, T, I and N, respectively.

Figure 32:
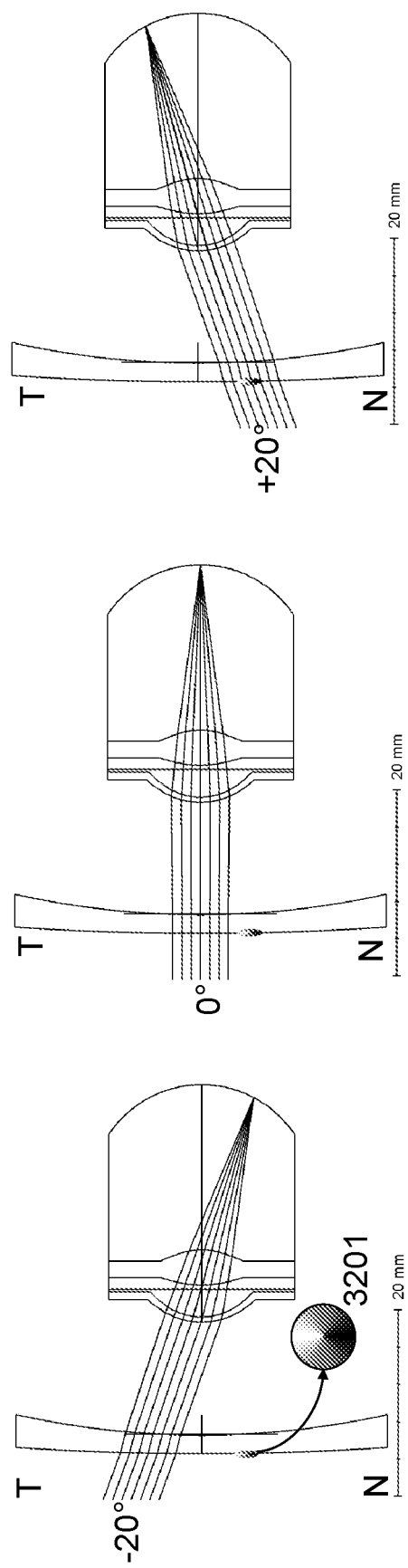
FIG. 32 illustrates a wide-field ray tracing schematic diagram of a right −3 D myopic eye corrected with the exemplary embodiment described in FIG. 31; the ray tracing schema encompassing three visual field angles for the spectacle wearer: temporal field angle (−20.0 degrees), central field angle (0.0 degrees) and nasal field angle (20.0 degrees).

FIG. 32 illustrates a wide-field ray tracing schematic diagram of a −1 D myopic eye corrected with the exemplary embodiment described in FIG. 31; the ray tracing schema encompassing three visual field angles when the spectacle lens is used in conjunction with the model eye of Table 1. The representing ray bundles of light going through (a) the temporal portion of the spectacle lens (−20,0); (b) central portion of the lens (0,0); and (c) the nasal portion of the spectacle lens (20,0).

As seen from FIG. 32, the only ray bundle through a nasal portion of the spectacle lens encounters the said impermanent auxiliary mini optical element 3201 providing the desired optical stop signal at the corresponding retinal location. The ray bundles going through the central and temporal portion of the spectacle lens do not impose any optical stop signal at the desired retinal location.

Figure 33:
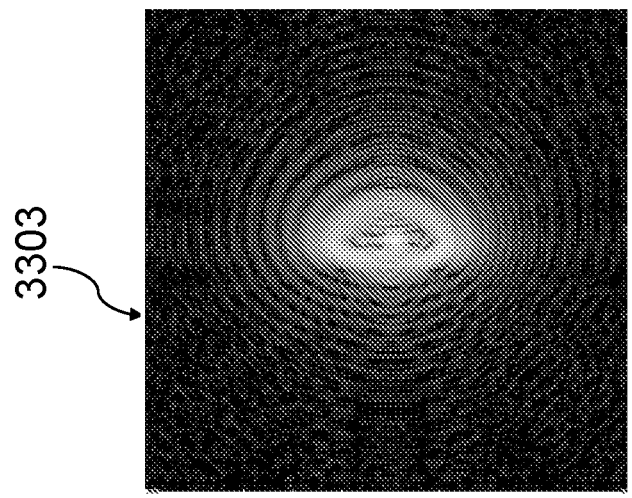
FIG. 33 illustrates point spread functions over a wide-field view when the incoming light is incident on a right −3 D myopic model eye corrected with the exemplary embodiment described in FIG. 31. The three-point spread functions represent three visual field angles, when the light goes through, (a) the second region located temporally on the spectacle lens (−20.0 degrees); (b) central field (0.0 degrees); and (c) when incident light goes through the nasal field angle (20.0 degrees).
Figure 33:
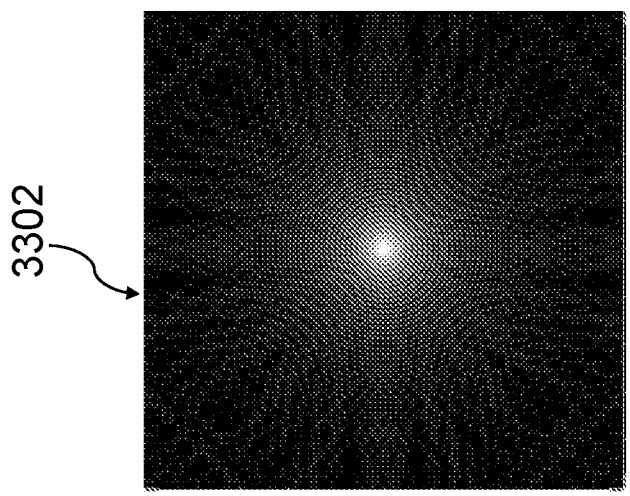
Figure 33:
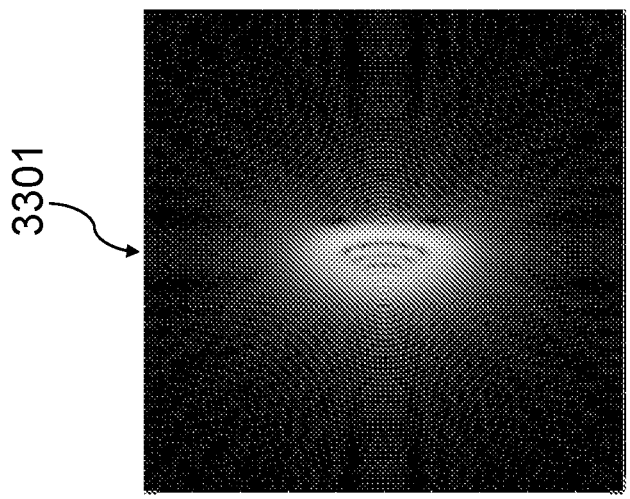

FIG. 33 illustrates point spread functions over a wide-field view when the incoming light is incident on a −3 D myopic model eye corrected with the exemplary embodiment described in FIG. 25.

As seen from FIG. 33, the ray bundle going through the impermanent auxiliary mini optical element 3105 produces a point spread function 3303 that is affected by additional meridionally and azimuthally varying power distribution within the mini element producing the desirable optical stop signal compared to 3301 which is formed when the ray bundle is going through the spectacle lens portion devoid of the mini optical element. The central ray bundle going through the base spectacle lens produces an ideal point spread function 3302.

Figure 34:
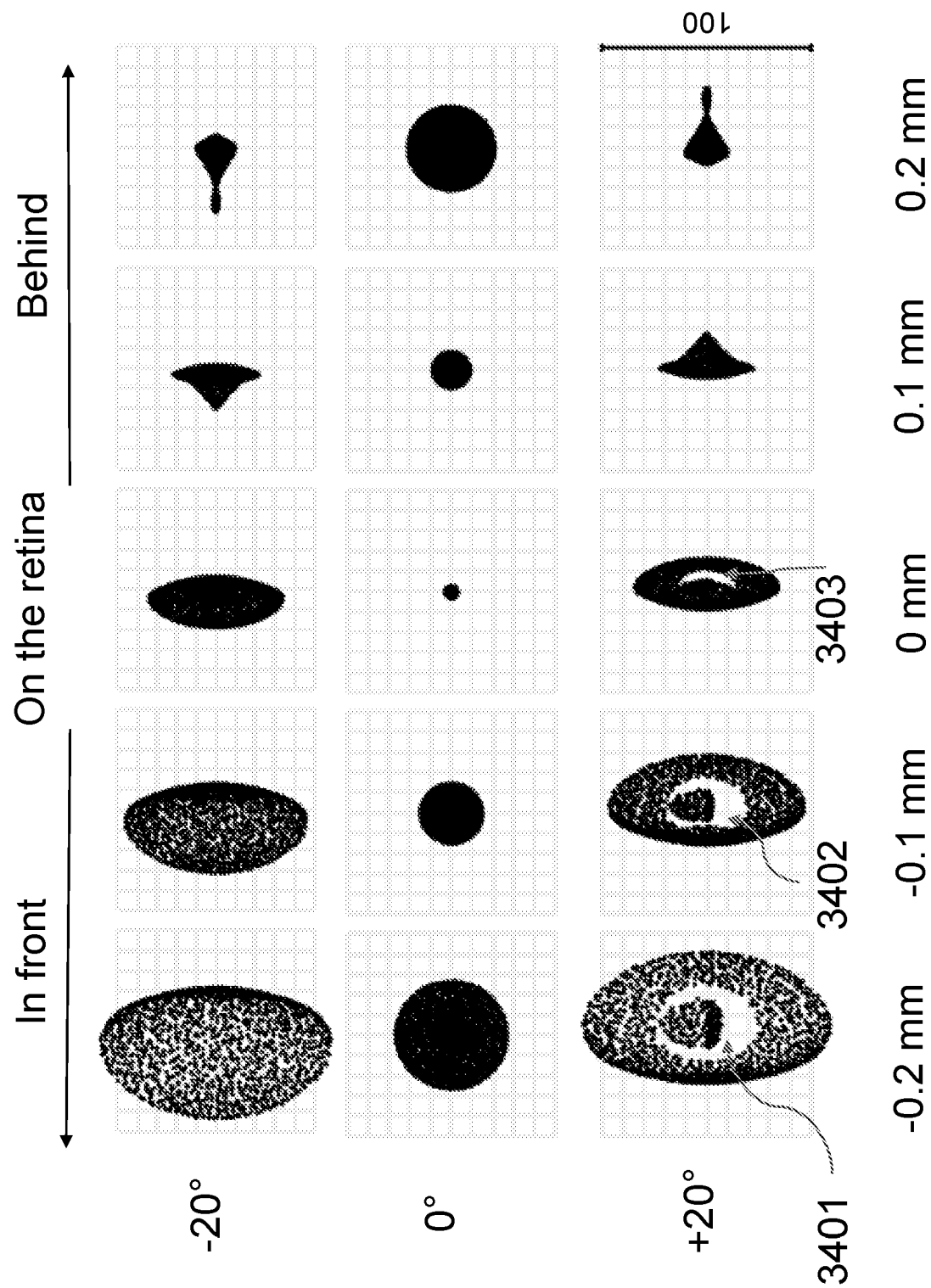
FIG. 34 illustrates a temporally and spatially varying signal, depicted as a wide-angle through-focus spot diagram when the incoming light is incident on a right −3 D myopic model eye corrected with an exemplary embodiment described in FIG. 31. The performance is represented at various field angles: $1^{st}$ row represents −20 degrees temporal field angle; $2^{nd}$ row represents central field angle 0 degrees, and 3rd row represents 20-degrees nasal field angle.

FIG. 34 illustrates a spatially varying signal, depicted as a wide-angle through-focus spot diagram. When the incoming light of a visible wavelength is incident on a −1 D myopic model eye corrected with one exemplary embodiment described in FIG. 31, the optical performance of the spectacle lens in conjunction with the model eye is represented over various field angles.

In this example, the rows represent the through focus spot diagram formed when a ray bundle goes through three distinct regions of the spectacles: (a) the $1^{st}$ row showcases data obtained when the incoming ray bundle passes through the temporal portion of the spectacle lens free of auxiliary optical elements; (b) the second row represents data obtained when incoming ray bundle passes through the central portion of the spectacle lens free of auxiliary mini optical elements and (c) the third row represents through-focus spot diagram when the incoming ray bundle passes through the impermanent auxiliary mini optical element located nasally on the spectacle lens.

As seen from FIG. 34, the ray bundle going through the impermanent auxiliary mini optical element produces a conoid of partial blur comprising irregular sagittal 3401 and tangential 3402 blur patterns substantially in front of the regional peripheral retina. However, when the incoming light passes through either the central or the temporal portion of the spectacle lens, i.e. regions substantially free of the mini optical elements, no distinct conoid of partial blur is observed either in front or about the retina.

In this example, the length, position, and orientation of the conoid of partial blur formed on the peripheral retina hypothesises to contribute to the directional cues or optical stop signals to reduce the rate of myopia progression. In some embodiments, the meridionally and azimuthally varying power of the said mini optical element and the location on the single vision spectacle lens is optimised to retain the entire conoid of partial blur in front of the peripheral retina, while in other embodiments, the optimisation of said properties of the mini optical element may position the conoid of partial blur about the retina with sagittal planes on the retina. The prescribed method of changing the position of the mini optical elements on the single vision spectacle lenses provides temporal and spatial variation to the directional cues or stop signals; such that the efficacy of myopia management may be maintained constant over time.

Figure 35:
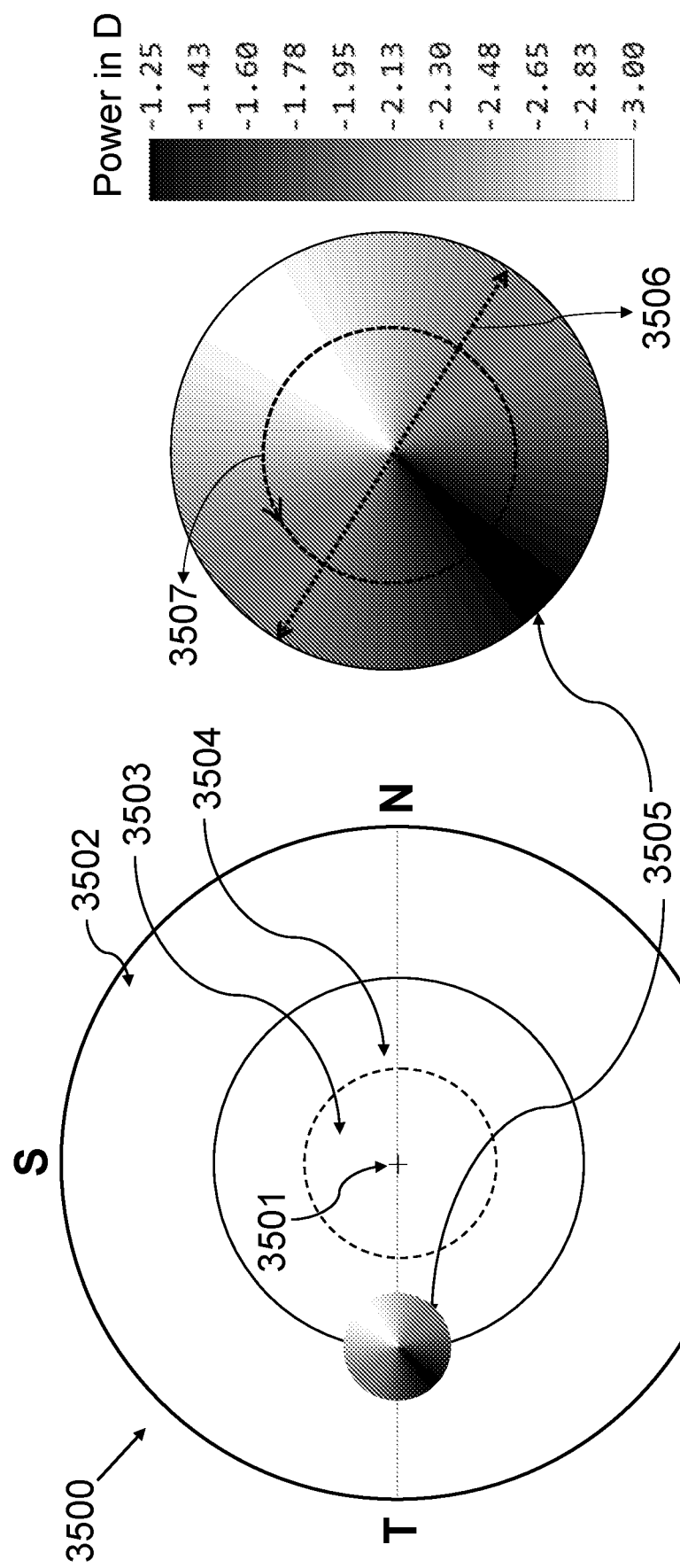
FIG. 35 illustrates a standard single vision spectacle blank configured with an auxiliary mini optical element (2 mm diameter) or film drawn from the kit or set disclosed herein, wherein the power map of the optical element in conjunction with a −3 DS standard spectacle lens has a substantially radially invariant, meridionally and azimuthally variant, power distribution (power: −3 DS/+1.75 D, Cosine-Variant II Element).

FIG. 35 illustrates a standard single vision ready-made spectacle blank 3500, ordinarily used for correction of myopia with or without astigmatism, to fit a spectacle frame with a 30 mm lens diameter. The said spectacle lens 3500 configured with an impermanent auxiliary mini optical element 3505, comprising of a meridionally and azimuthally varying power distribution, the element is drawn from the kit or set C disclosed in FIG. 24. In this example, the standard spectacle lens is configured with a region of interest defined about the optical centre 3501 with an inner diameter of approximately 7 mm represented by dotted lines 3503 and an outer diameter of approximately 20 mm represented by solid line 3502 forming a region of interest 3504 identified for positioning said the impermanent auxiliary mini optical element.

The standard single vision ready-made spectacle blank of FIG. 35 has a base prescription of −3 DS used to correct −3 DS of myopia in an eye. The said impermanent auxiliary mini optical element 3505 is located approximately 4.5 mm away from the geometric centre (3501) of the −3 DS spectacle lens 3500. The mini optical element 3505 is approximately 2 mm in diameter and has a blending width of 0.075 mm. The said impermanent auxiliary mini optical element 3505 has a meridionally (3506) and azimuthally (3507) varying power profile with +1.75 D of delta power (Cosine-Variant II Element). The combined power map (i.e., the power of the −3 DS standard spectacle lens together with the delta power of the mini optical element) shows that the mini optical element's half-meridian with the power of −3 DS is along the nasal-superior direction of the standard spectacle lens and the half-meridian with the power of −1.25 DS is along the temporal-inferior direction. The superior, temporal, inferior and nasal portions on the standard spectacle lens are denoted by characters S, T, I and N, respectively.

Figure 36:
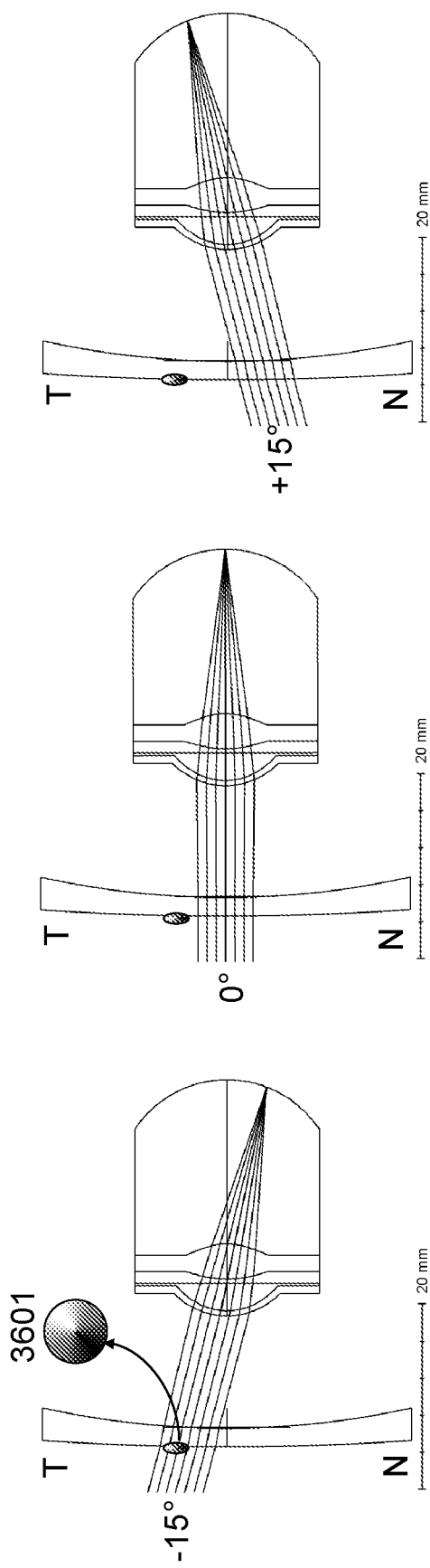
FIG. 36 illustrates a wide-field ray tracing schematic diagram of a right −3 D myopic eye corrected with the exemplary embodiment described in FIG. 35; the ray tracing schema encompassing three visual field angles for the spectacle wearer: temporal field angle (−15.0 degrees), central field angle (0.0 degree) and nasal field angle (15.0 degrees).

FIG. 36 illustrates a wide-field ray tracing schematic diagram of a −3 D myopic eye corrected with the exemplary embodiment described in FIG. 35; the ray tracing schema encompassing three visual field angles for the spectacle wearer: temporal field angle (−15,0), central field angle (0,0) and nasal field angles (15,0).

FIG. 36 illustrates a wide-field ray tracing schematic diagram of a −3 D myopic eye corrected with the exemplary embodiment described in FIG. 35; the ray tracing schema encompassing three visual field angles when the spectacle lens is used in conjunction with the model eye of Table 1. The representing ray bundles of light going through (a) the temporal portion of the spectacle lens (−15,0); (b) central portion of the lens (0,0); and (c) the nasal portion of the spectacle lens (15,0). As seen from FIG. 36, the only ray bundle through a temporal portion of the spectacle lens encounters the said impermanent auxiliary mini optical element 3505 providing the desired optical stop signal at the corresponding retinal location. The ray bundles going through the central and nasal portion of the spectacle lens do not impose any optical stop signal at the desired retinal location.

Figure 37:
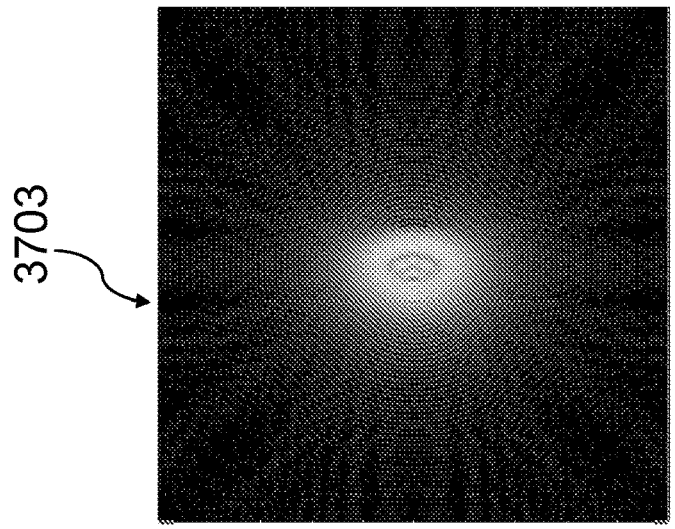
FIG. 37 illustrates point spread functions over a wide-field view when the incoming light is incident on a right −3 D myopic model eye corrected with the exemplary embodiment described in FIG. 35. The three-point spread functions represent three visual field angles when the light goes through, (a) the second region located temporally on the spectacle lens (−15.0 degrees), (b) central field (0.0 degrees), and (c) when incident light goes through the nasal field angles (15.0 degrees).
Figure 37:
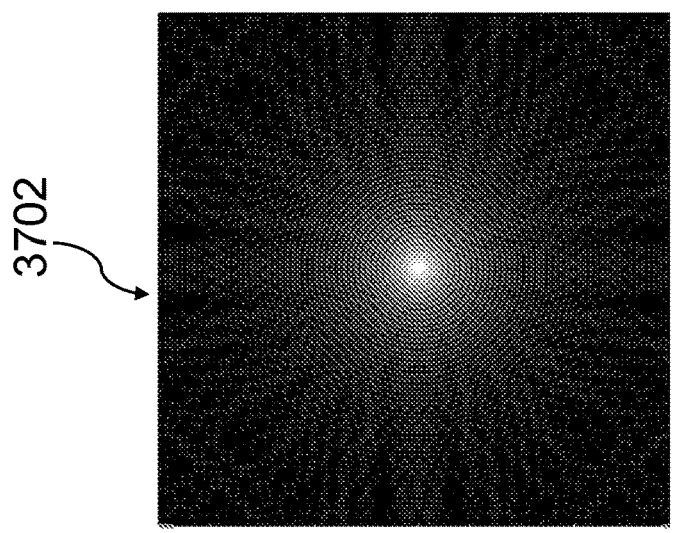
Figure 37:
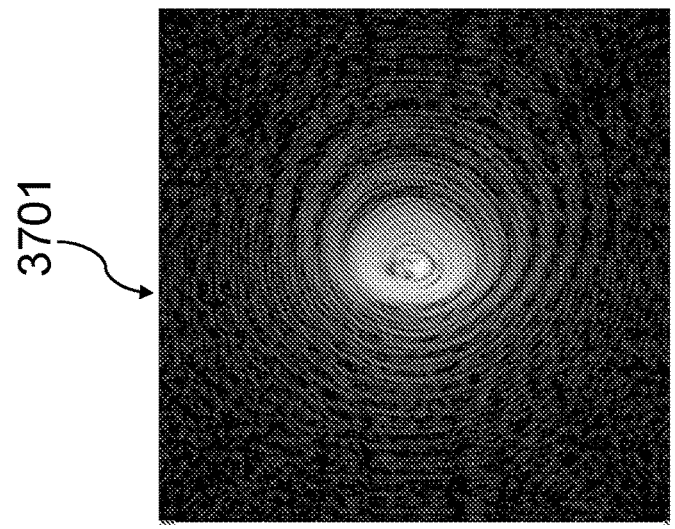

FIG. 37 illustrates point spread functions over a wide-field view when the incoming light is incident on a −3 D myopic model eye corrected with the exemplary embodiment described in FIG. 35. As seen from FIG. 35, the ray bundle going through the impermanent auxiliary mini optical element 3505 produces a point spread function 3701 that is affected by additional meridionally and azimuthally varying power distribution within the mini optical element producing the desirable optical stop signal compared to 3703 which is formed when the ray bundle is going through the spectacle lens portion devoid of the mini optical element. The central ray bundle going through the base spectacle lens produces an ideal point spread function 3702.

Figure 38:
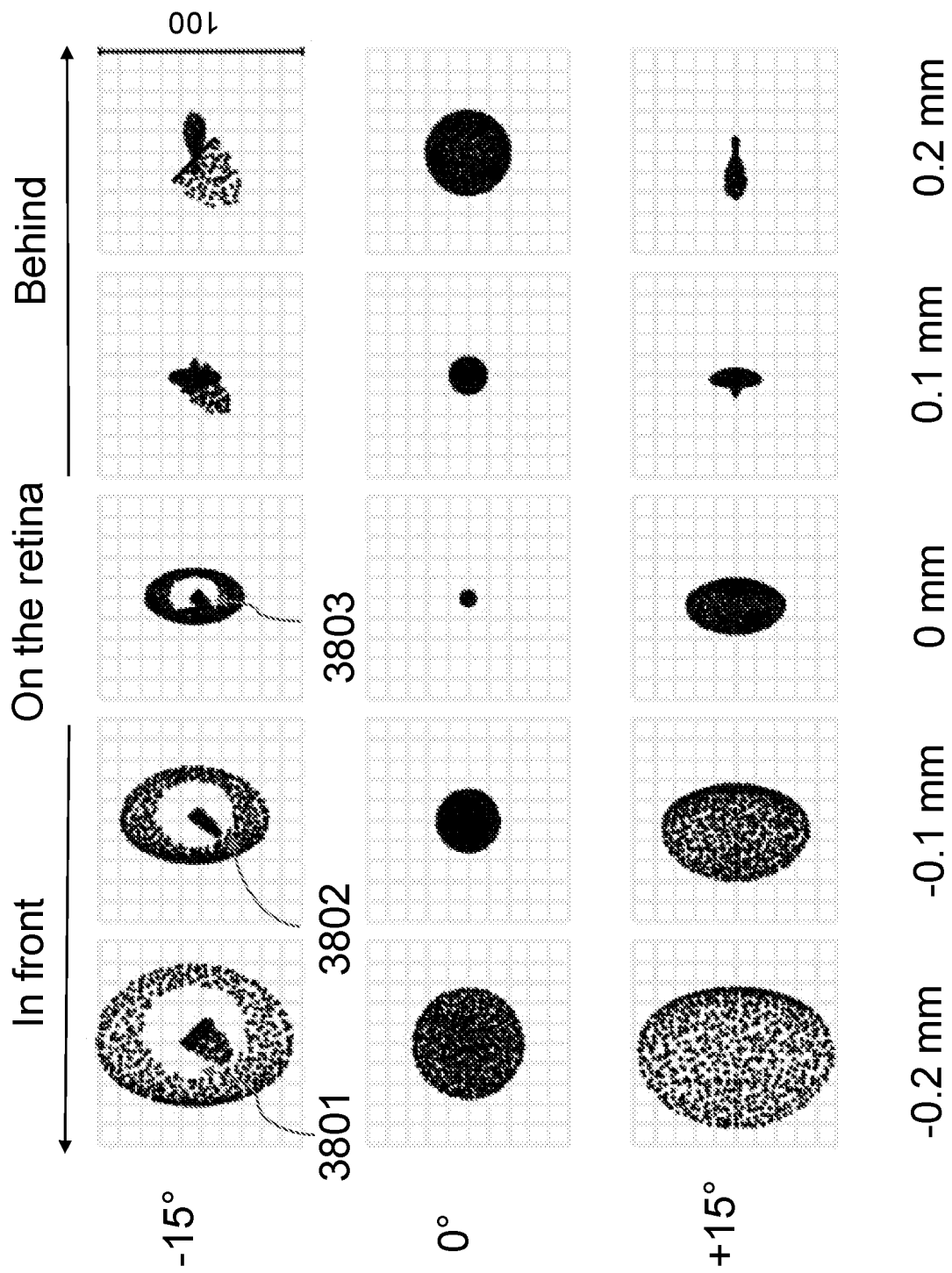
FIG. 38 illustrates a temporally and spatially varying signal, depicted as a wide-angle through-focus spot diagram when the incoming light is incident on a right −3 D myopic model eye corrected with the exemplary embodiment described in FIG. 35. The performance is represented at various field angles: $1^{st}$ row represents −15 degrees temporal field angle; $2^{nd}$ row represents central field angle 0 degrees; and 3rd row represents 15 degrees nasal field angle.

FIG. 38 illustrates a spatially varying signal, depicted as a wide-angle through-focus spot diagram. When the incoming light of a visible wavelength is incident on a −3 D myopic model eye corrected with one exemplary embodiment described in FIG. 35, the optical performance of the spectacle lens in conjunction with the model eye of Table 1 is represented over various field angles.

In this example, the rows represent the through focus spot diagram formed when a ray bundle goes through three distinct regions of the spectacles: (a) the $1^{st}$ row showcases data obtained when the incoming ray bundle passes through the temporal portion of the spectacle lens free of auxiliary optical elements; (b) the second row represents data obtained when incoming ray bundle passes through the central portion of the spectacle lens free of auxiliary mini optical elements and (c) the third row represents through-focus spot diagram when the incoming ray bundle passes through the impermanent auxiliary mini optical element located temporally on the spectacle lens.

As seen from FIG. 38, the ray bundle going through the impermanent auxiliary mini optical element produces a conoid of partial blur comprising irregular sagittal 3801 and tangential 3802 blur patterns substantially in front of the regional peripheral retina. However, when the incoming light passes through either the central or the nasal portion of the spectacle lens, i.e. regions substantially free of the mini optical elements, no distinct conoid of partial blur is observed either in front or about the retina.

In this example, the length, position, and orientation of the conoid of partial blur formed on the peripheral retina is hypothesises to contribute to the directional cues or optical stop signals to reduce the rate of myopia progression. The meridionally and azimuthally varying power distribution of the said mini optical element and the location on the single vision spectacle lens is optimised to retain the entire conoid of partial blur in front of the peripheral retina, while in other embodiments, the optimisation of the mini optical element may position the conoid of partial blur with the tangential planes about or behind the retina. The prescribed method of changing the position of the mini optical elements on the single vision spectacle lenses provides temporal and spatial variation to the directional cues or stop signals; such that the efficacy of myopia management may be maintained constant over time.

Figure 39:
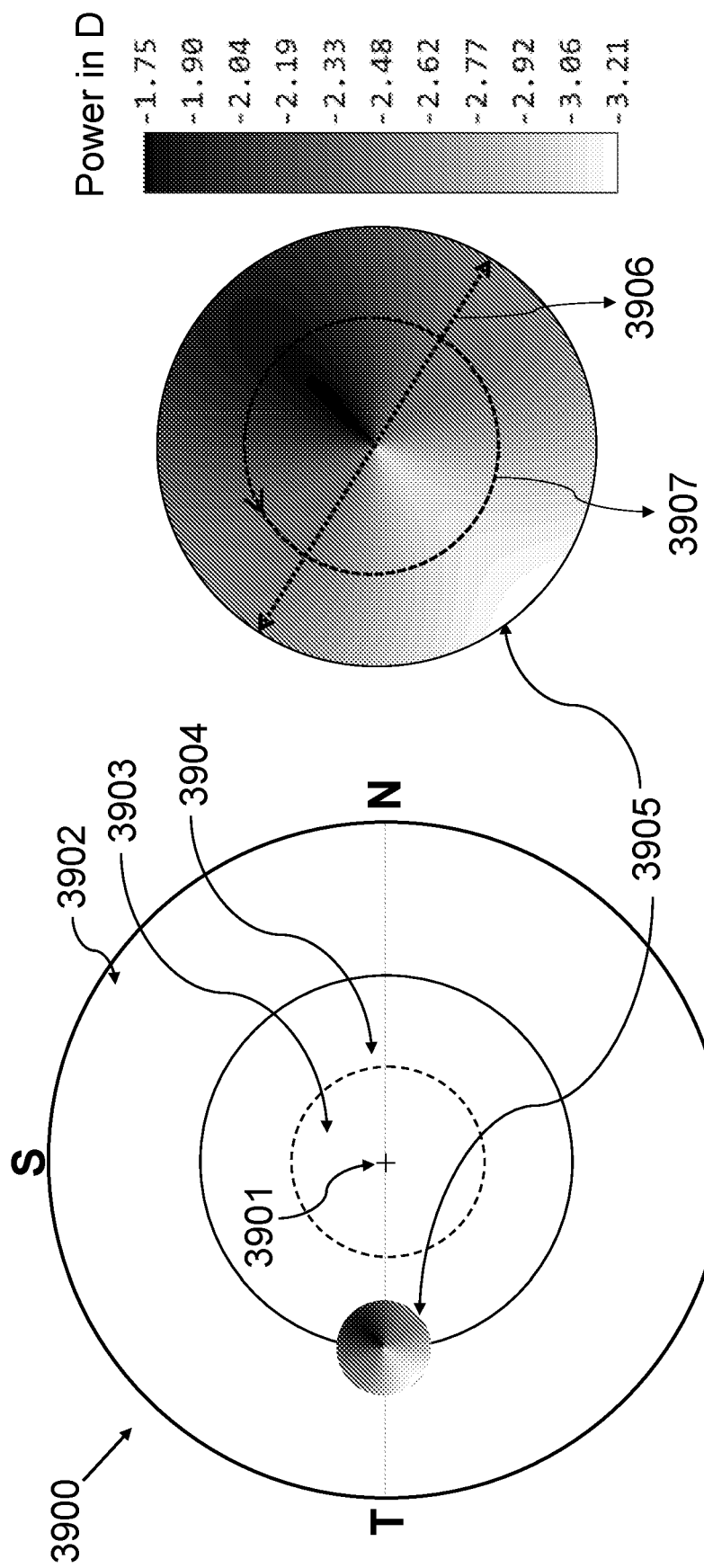
FIG. 39 illustrates a standard single vision spectacle blank configured with an auxiliary mini optical element (1.75 mm diameter) or film drawn from the kit or set disclosed herein, wherein the power map of the optical element in conjunction with a −3 DS standard spectacle lens has a substantially radially, meridionally and azimuthally variant, power distribution (power: −3 DS/+1.25 D, Cosine-Variant III Element).

FIG. 39 illustrates a standard single vision ready-made spectacle blank 3900, ordinarily used for correction of myopia with or without astigmatism, to fit a spectacle frame with a 30 mm lens diameter. The said spectacle lens 3900 configured with an impermanent auxiliary mini optical element 3905, comprising of a meridionally and azimuthally varying power distribution, the element is drawn from the kit or set D disclosed in FIG. 24.

In this example, the standard spectacle lens is configured with a region of interest defined about the optical centre 3901 with an inner diameter of approximately 7 mm represented by dotted lines 3903 and an outer diameter of approximately 20 mm represented by solid line 3902 forming a region of interest 3904 identified for positioning said the impermanent auxiliary mini optical element.

The standard single vision ready-made spectacle blank of FIG. 39 has a base prescription of −3 DS used to correct −3

DS of myopia in an eye. The said impermanent auxiliary mini optical element 3905 is located approximately 4.5 mm away from the geometric centre (3901) of the −3 DS spectacle lens 3900. The mini optical element 3905 is approximately 1.75 mm in diameter and has a blending width of 0.075 mm. The said impermanent auxiliary mini optical element 3905 has a radially, meridionally (3906) and azimuthally (3907) varying power profile with 1.25 D of delta power (Cosine-Variant III Element). The combined power map (i.e., the power of the −3 DS standard spectacle lens together with the delta power of the mini optical element) shows that the mini optical element's half-meridian with the power of approximately −3 DS is along the temporal-inferior direction of the standard spectacle lens and the half-meridian with the power of approximately −1.75 DS is along the nasal-superior direction. Further, the mini optical element has about −0.2 D negative spherical aberration. The superior, temporal, inferior and nasal portions on the standard spectacle lens are denoted by characters S, T, I and N, respectively.

FIG. 36 illustrates a wide-field ray tracing schematic diagram of a −3 D myopic eye corrected with the exemplary embodiment described in FIG. 35; the ray tracing schema encompassing three visual field angles for the spectacle wearer: temporal field angle (−15,0), central field angle (0,0) and nasal field angles (15,0).

Figure 40:
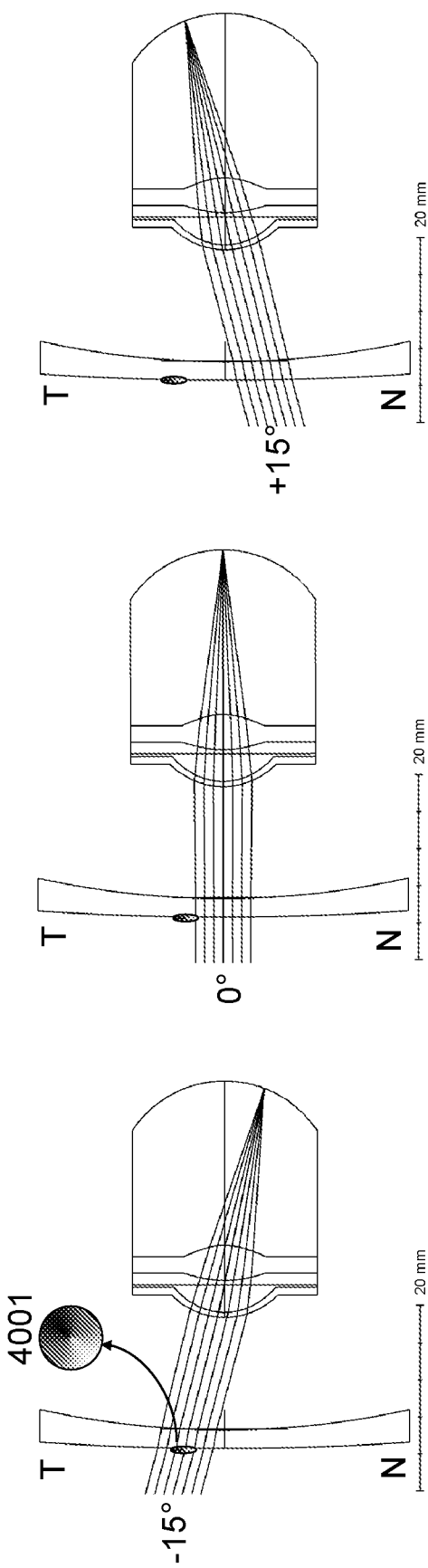
FIG. 40 illustrates a wide-field ray tracing schematic diagram of a right −3 D myopic eye corrected with the exemplary embodiment described in FIG. 39; the ray tracing schema encompassing three visual field angles for the spectacle wearer: temporal field angle (−15.0 degrees), central field angle (0.0 degree) and nasal field angle (15.0 degrees).

FIG. 40 illustrates a wide-field ray tracing schematic diagram of a −3 D myopic eye corrected with the exemplary embodiment described in FIG. 39; the ray tracing schema encompassing three visual field angles when the spectacle lens is used in conjunction with the model eye of Table 1. The representing ray bundles of light going through (a) the temporal portion of the spectacle lens (−15,0); (b) central portion of the lens (0,0); and (c) the nasal portion of the spectacle lens (15,0). As seen from FIG. 40, the only ray bundle through a temporal portion of the spectacle lens encounters the said impermanent auxiliary mini optical element 3905 providing the desired optical stop signal at the corresponding retinal location. The ray bundles going through the central and nasal portion of the spectacle lens do not impose any optical stop signal at the desired retinal location.

Figure 41:
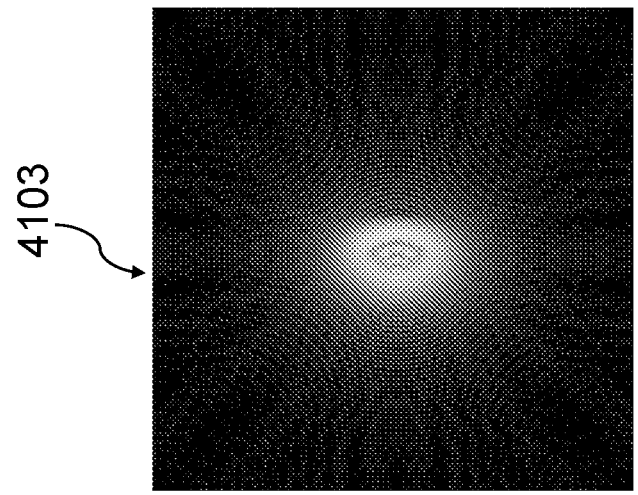
FIG. 41 illustrates point spread functions over a wide-field view when the incoming light is incident on a right −3 D myopic model eye corrected with the exemplary embodiment described in FIG. 39. The three-point spread functions represent three visual field angles when the light goes through, (a) the second region located temporally on the spectacle lens (−15.0 degrees), (b) central field (0.0 degrees), and (c) when incident light goes through the nasal field angles (15.0 degrees).
Figure 41:
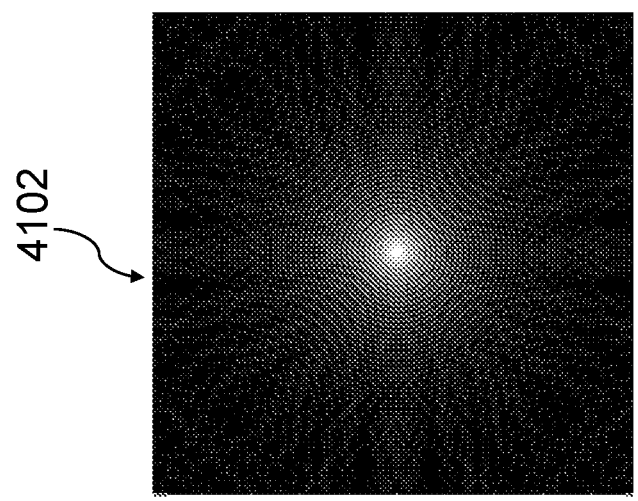
Figure 41:
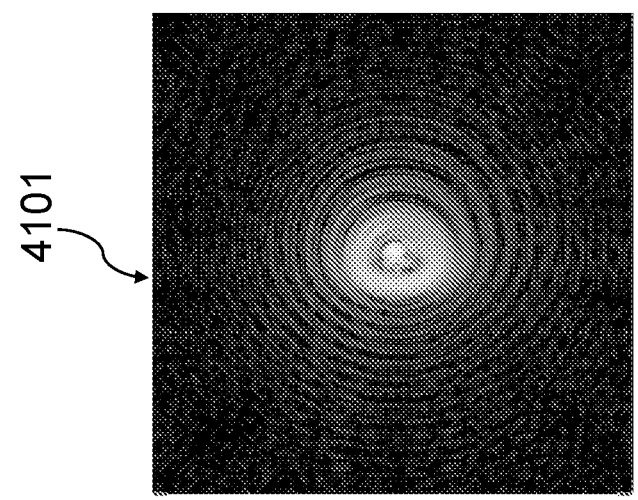

FIG. 41 illustrates point spread functions over a wide-field view when the incoming light is incident on a −3 D myopic model eye corrected with the exemplary embodiment described in FIG. 39. As seen from FIG. 39, the ray bundle going through the impermanent auxiliary mini optical element 3905 produces a point spread function 4101 that is affected by additional meridionally and azimuthally varying power distribution within the mini optical element producing the desirable optical stop signal compared to 4103 which is formed when the ray bundle is going through the spectacle lens portion devoid of the mini optical element. The central ray bundle going through the base spectacle lens produces an ideal point spread function 4102.

Figure 42:
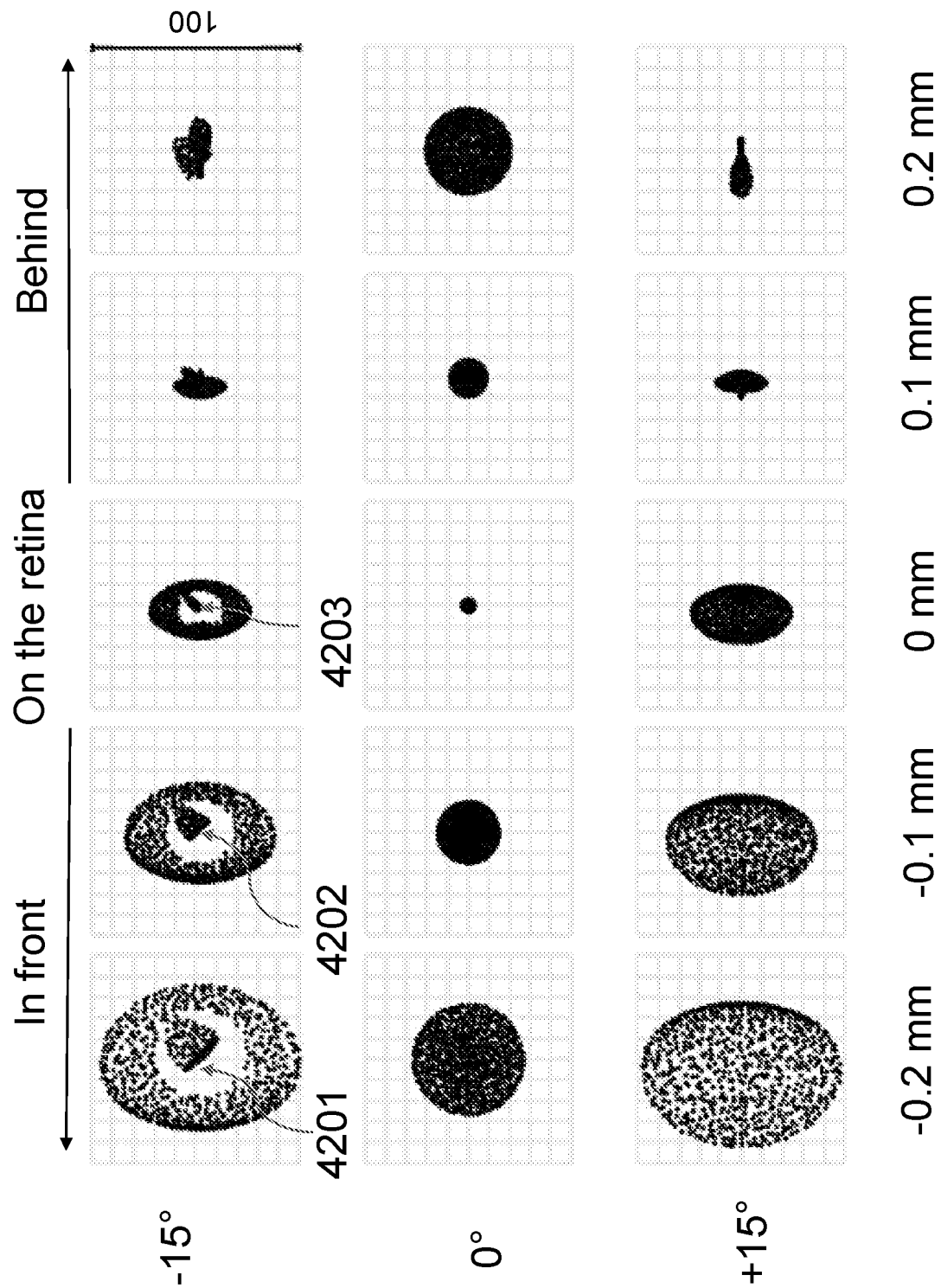
FIG. 42 illustrates a temporally and spatially varying signal, depicted as a wide-angle through-focus spot diagram when the incoming light is incident on a right −3 D myopic model eye corrected with the exemplary embodiment described in FIG. 39. The performance is represented at various field angles: $1^{st}$ row represents −15 degrees temporal field angle; $2^{nd}$ row represents central field angle 0 degrees; and 3rd row represents 15 degrees nasal field angle.

FIG. 42 illustrates a spatially varying signal, depicted as a wide-angle through-focus spot diagram. When the incoming light of a visible wavelength is incident on a −3 D myopic model eye corrected with one exemplary embodiment described in FIG. 39, the optical performance of the spectacle lens in conjunction with the model eye of Table 1 is represented over various field angles.

In this example, the rows represent the through focus spot diagram formed when a ray bundle goes through three distinct regions of the spectacles: (a) the 1$^{st}$ row showcases data obtained when the incoming ray bundle passes through the temporal portion of the spectacle lens free of auxiliary optical elements; (b) the second row represents data obtained when incoming ray bundle passes through the central portion of the spectacle lens free of auxiliary mini optical elements and (c) the third row represents through-focus spot diagram when the incoming ray bundle passes through the impermanent auxiliary mini optical element located temporally on the spectacle lens.

As seen from FIG. 42, the ray bundle going through the impermanent auxiliary mini optical element produces a conoid of partial blur comprising irregular sagittal 4201 and tangential 4202 blur patterns substantially in front of the regional peripheral retina. However, when the incoming light passes through either the central or the nasal portion of the spectacle lens, i.e. regions substantially free of the mini optical elements, no distinct conoid of partial blur is observed either in front or about the retina. In this example, the length, position, and orientation of the conoid of partial blur formed on the peripheral retina is hypothesises to contribute to the directional cues or optical stop signals to reduce the rate of myopia progression. The meridionally and azimuthally varying power distribution of the said mini optical element and the location on the single vision spectacle lens is optimised to retain the entire conoid of partial blur in front of the peripheral retina, while in other embodiments, the optimisation of the mini optical element may position the conoid of partial blur with the tangential planes about or behind the retina. The prescribed method of changing the position of the mini optical elements on the single vision spectacle lenses provides temporal and spatial variation to the directional cues or stop signals; such that the efficacy of myopia management may be maintained constant over time.

In certain other embodiments, the standard single vision spectacles include substantially spherical single vision spectacle lenses for correction of myopia without astigmatism, or substantially astigmatic/toric single vision spectacle for correction of myopia with astigmatism.

In certain other embodiments, the part with the meridionally and azimuthally varying power distribution of the spectacle lens of a kit or set may be configured to consider the inherent astigmatism of the eye wearing the lens to achieve a satisfactory balance between the desired visual performance and the desired conoid of partial blur to offer a stimulus to reduce or slow the rate of progression.

In some embodiments, the part with the meridionally and azimuthally varying power distribution of the pair of spectacle lenses of a spectacle lens kit or set may be located, formed, or placed on the anterior surface, posterior surface, or combinations thereof. In some other embodiments, the part with the meridionally and azimuthally varying power distribution of the pair of spectacle lenses of a spectacle lens of a kit or set is devoted to producing specific features of the stop signal, for example, conoid of partial blur with either the sagittal or tangential blur pattern substantially in front of the retina.

In certain other embodiments, a change or substantial change to the optical signal received by the on- and/or off-axis region on the retina, configured by a conoid of partial blur or an interval of partial blur at the retinal plane, wherein the optical stop signal means a portion of the conoid or interval of partial blur falls in front of the retina (i.e. producing a myopic defocus), while the remainder of the conoid or interval of partial blur produces an in-focus or hyperopic signal. The proportion of the conoid or interval of partial blur that provides a myopic defocus, may be approximately 10%, 20%, 30% 40%, 50%, 60%, 70%, 80%, 90% A or 100%.

In certain other embodiments, the part with the meridionally and azimuthally varying power distribution of the spectacle lens of a kit or set is located, formed, or placed on one of the two surfaces of the spectacle lens and the other surface may have other features for further reducing eye growth.

For example, the use of additional features like defocus, coma, or spherical aberration. In certain embodiments, the shape of the front and back surface of the spectacle lens of a kit or set may be described by one or more of the following: a sphere, an asphere, an extended odd polynomial, an extended even polynomial, a conic section, a biconic section, a toric surface or a Zernike polynomial.

In some other embodiments, the meridionally and azimuthally varying power distribution across the optic zone of the lens may be described by appropriate Zernike polynomials, Bessel functions, Jacobi polynomials, Taylor polynomials, Fourier expansion, or combinations thereof.

In one embodiment of the present disclosure, the stop signal may be configured solely using meridionally and azimuthally varying power distribution, wherein at least one of the meridionally and azimuthally variant power distribution is devoid of mirror symmetry. However, in other embodiments, higher-order aberrations like spherical aberration, coma, trefoil, may be combined with the configured meridionally and azimuthally varying power distribution to account for inherent on- and/or off-axis higher-order aberrations.

Another embodiment of the present disclosure is directed to a spectacle lens of a kit or set for at least one of slowing, retarding, or preventing myopia progression, the contact lens comprising a front surface, a back surface, an optic zone, an optical centre about the optic zone, the optical zone configured with a power map characterised by one or more meridionally and azimuthally variant power distributions, wherein at least one of the meridionally and azimuthally variant power distribution is configured to be devoid of mirror symmetry, wherein the power map provides a myopic eye, at least in part, adequate foveal correction, and is further configured to provide to the myopic eye, at least in part, at least a regional conoid or interval of partial blur, serving as an optical stop signal or a directional cue on the central and/or peripheral retina.

In some embodiments the power distribution within the optic zone of a spectacle lens of a kit or set may be configured both meridionally and azimuthally variant but radially invariant, wherein the power distribution along the radial direction remains substantially the same. In some other embodiments the power distribution within the optic zone of a spectacle lens of a kit or set may be configured both meridionally and azimuthally variant and also radially variant, wherein the power distribution along the radial direction is substantially non-uniform.

In other embodiments, the meridional variation is such that the power distribution within the optic zone of a spectacle lens of a kit or set is substantially devoid of mirror symmetry about the optical axis. In other embodiments, the azimuthal variation is such that the power distribution within the optic zone of a spectacle lens of a kit or set is substantially devoid of mirror symmetry about the optical axis. In some variants of the embodiments of the disclosure, only one of the pluralities of the meridionally variant power distributions is configured symmetric and none of the azimuthally varying distributions are configured symmetric.

In some other embodiments, the power distribution within the optic zone of a spectacle lens of a kit or set may be configured both meridionally and azimuthally variant and also radially variant, wherein the power distribution along the radial direction may be such that it decreases from the centre of the optic zone to the margin of the optical zone and the power distribution along the azimuthal direction may be such that it decreases or increases from 0 to $2\pi$ radians. In some embodiments, the decrease in power distribution along the radial direction may be described using linear, curvilinear, or quadratic functions. In certain other embodiments, the decrease in power distribution along the radial direction may be different for different azimuthal positions on the optic zone.

In other embodiments, the decrease in power distribution within the optic zone of a spectacle lens of a kit or set along the azimuthal direction may follow a cosine distribution with reduced frequency, for example, one-sixth (⅙), one-fifth (⅕), one-fourth (¼), one-third (⅓), or half (½) of the normal frequency, which is generally defined with two cosine cycles over 360° or $2\pi$ radians. In other embodiments, the decrease or increase in power distribution along the azimuthal direction may be different for different radial positions on the optic zone.

In accordance with one of the embodiments, the present disclosure is directed to a spectacle lens of a kit or set for a myopic eye. The spectacle lens of a kit or set comprising a front surface, a back surface, an optic zone with an optical axis, a plurality of meridionally and azimuthally variant power distributions about the optical axis, wherein at least one of the meridionally and azimuthally variant power distributions is configured to provide, at least in part, an adequate correction for the myopic eye, and when used in accordance with a prescribed care regimen is further configured to provide, at least in part, a temporally and spatially varying stop signal; such that the treatment efficacy to reduce the rate of myopia progression remains substantially consistent over time.

Certain embodiments are directed to a spectacle lens of a kit or set for at least one of slowing, retarding, or preventing myopia progression, the spectacle lens of a kit or set comprising a power map within the optic zone characterised by a pluralities of meridionally and azimuthally varying power distributions, wherein the pluralities of meridionally and azimuthally varying power distributions result in a delta power within the optic zone, described as the difference between the maximum and minimum of the optical power variations occurring within the optic zone.

Certain embodiments of the present disclosure are directed to a spectacle lens of a kit or set; wherein the delta power within the power map of the optic zone is at least +1.25 D, at least +1.5 D, at least +1.75 D, at least +2 D, at least +2.25 D, at least +2.5 D, or at least +2.75 D.

In some embodiments of the present disclosure, the delta power within the power map of the optic zone is between 0.5 D and 3.5 D, 0.75 D and 3 D, 1 D and 2.5 D, 1.25 D and 2.25 D, 1.25 D and 1.75 D or 1.25 D and 2.75 D.

In certain examples, the wearing schedule of the care regiment may include instructions to change the auxiliary pair of spectacle fronts at least every 4 hours, 8 hours, 12 hours, 24 hours, 48 hours, 60 hours, or 72 hours.

As a person skilled in the art may appreciate, the present invention may be used in combination with any of the devices/methods that have the potential to influence the progression of myopia. These may include but are not limited to, contact lenses of various designs, colour filters, pharmaceutical agents, behavioural changes, and environmental conditions.

Few other exemplary embodiments of spectacle lenses are described in the following example set A.

Set of "A" Examples of a Spectacle Kit

A spectacle apparatus kit for a myopic individual, and its methods of use, the kit including at least two or more pairs of spectacles; wherein each pair of the spectacles comprises a lens for the left eye and a lens for the right eye of the myopic individual, wherein each lens is configured with the base prescription to correct underlying myopia of the left eye and right eye respectively; wherein each lens has a substantial region that is further configured with one or more meridionally and azimuthally variant power distributions, resulting in a delta power; wherein at least one of the meridionally and azimuthally variant power distribution is devoid of mirror symmetry; wherein each spectacle lens provides, at least in part, a foveal correction for the myopic eye and, at least in part, provides a conoid of partial blur at the retina of the myopic eye, serving as a directional cue or an optical stop signal; wherein the methods of use of the kit includes a set of instructions for the myopic individual comprising a specific wearing care regimen detailing the use of the pairs of spectacles.

A spectacle apparatus kit of one or more of the claim A examples, wherein each spectacle lens' surface area of the substantial region with the meridionally and azimuthally variant power distribution that is at least 400 square mm, 800 square mm, 1200 square mm, 1600 square mm, 2000 square mm, 2400 square mm, or 2800 square mm.

A spectacle apparatus kit of one or more of the claim A examples, wherein the magnitude of delta power of each spectacle lens is at least 0.5 D, 0.75 D, +1 D, 1.25 D, 1.5 D or 1.75 D.

A spectacle apparatus kit of one or more of the claim A examples, wherein the meridionally and azimuthally variant power distribution is configured on the anterior surface, posterior surface, or both surfaces of the spectacle lens.

A spectacle apparatus kit of one or more of the claim A examples, wherein the at least two or more pairs of spectacles include at least three, four, five, six or seven spectacles.

A spectacle apparatus kit of one or more of the claim A examples, wherein the magnitude of the delta power is configured substantially different between the pairs of spectacles within the kit and is at least different by 0.5 D.

A spectacle apparatus kit of one or more of the claim A examples, wherein the axis of the flattest half-meridian within the meridionally and azimuthally variant power distribution is configured substantially different between the pairs of spectacles within the kit and is at least separated by 20 degrees.

A spectacle apparatus kit of one or more of the claim A examples, wherein the magnitude, and/or the axis of the flattest half-meridian, of the meridionally and azimuthally variant power distribution, is configured substantially different between the right and left lenses of the pairs of spectacles within the kit.

A spectacle apparatus kit of one or more of the claim A examples, wherein the meridionally and azimuthally variant power distribution, is configured substantially different between the right and left lenses of the pairs of spectacles within the kit.

A spectacle apparatus kit of one or more of the claim A examples, wherein the at least two pairs of spectacle lenses are configured to provide an appropriate stop signal to the myopic individual.

A spectacle apparatus kit of one or more of the claim A examples, wherein the myopic individual may have myopia with or without astigmatism.

A spectacle apparatus kit of one or more of the claim A examples, wherein the at least one region of the retina of the myopic eye includes a sub-foveal, para-foveal, foveal, sub-macular, macular or paramacular region on the retina.

A spectacle apparatus kit of one or more of the claim A examples, wherein the at least one region of the retina of the myopic eye includes at least 5 degrees of the visual field, 15 degrees of the visual field, or 30 degrees of the visual field.

A method of use of the spectacle apparatus kit of one or more of the claim A examples, wherein the at least two pairs of spectacles are configured to provide a temporally and spatially varying induced conoid of partial blur.

A method of use of the spectacle apparatus kit of one or more of the claim A examples, wherein the temporally and spatially varying induced conoid of partial blur provides a stop signal to the myopic eyes of the individual.

A method of use of the spectacle apparatus kit of one or more of the claim A examples, wherein the axis of the flattest half-meridian of the meridionally and azimuthally varying power distribution in the at least two pairs of spectacles is substantially different from each other and is at least separated by 20 degrees.

A method of use of the spectacle apparatus kit of one or more of the claim A examples, wherein the specific wearing care regime comprises of a prescribed set of pairs of spectacles and an appropriate wearing schedule.

A method of use of the spectacle apparatus kit of one or more of the claim A examples, wherein the prescribed set of pairs of spectacles comprises at least 2, 3, 4, 5, 6, or 7 pairs of spectacles.

A method of use of the spectacle apparatus kit of one or more of the claim A examples, wherein the appropriate wearing schedule to wear the at least two pairs of spectacles are separated at least by 2 hours, 4 hours, 6 hours, 8 hours, 12 hours, 1 day, 2 days, 3 days, 4 days, 5 days, 6 days, 1 week, 2 weeks, 3 weeks, or one month.

A method of use of the spectacle apparatus kit of one or more of the claim A examples, wherein the appropriate wearing schedule to wear the at least two pairs of spectacles is identified by evaluating the rate of progression and/or risk factors associated with the myopic individual.

A method of use of the spectacle apparatus kit of one or more of the claim A examples, wherein the magnitude of the delta power is configured by evaluating the rate of progression and/or risk factors associated with the myopic individual.

Set of "B" Examples of a Spectacle Front

A spectacle apparatus kit for a myopic individual, and its methods of use, the kit including at least two or more pairs of spectacle fronts, wherein each pair of the spectacle front comprises a lens for the left eye and a lens for the right eye of the myopic individual, wherein each lens is configured with a substantial region with one or more meridionally and azimuthally variant power distributions, resulting in a delta power; wherein at least one of the meridionally and azimuthally variant power distribution is devoid of mirror symmetry; wherein the spectacle front when used in juxtaposition to a pair of standard single vision spectacles, provides each eye, at least in part a foveal correction for the myopic eye and, at least in part, provides a conoid of partial blur at the retina of the myopic eye, serving as a directional cue or an optical stop signal; wherein the methods of use of the kit includes a set of instructions for the myopic individual comprising a specific wearing care regimen detailing the use of the pairs of spectacles.

A spectacle apparatus kit of one or more of the claim B examples, wherein each lens within the spectacle fronts has a surface area of the substantial region with the meridionally and azimuthally variant power distribution that is at least 400 square mm, 800 square mm, 1200 square mm, 1600 square mm, 2000 square mm, 2400 square mm, or 2800 square mm.

A spectacle apparatus kit of one or more of the claim B examples, wherein the magnitude of delta power of each spectacle lens of each spectacle front is at least 0.5 D, 0.75 D, +1 D, 1.25 D, 1.5 D or 1.75 D.

A spectacle apparatus kit of one or more of the claim B examples, wherein the meridionally and azimuthally variant power distribution is configured on the anterior surface, posterior surface, or both surfaces of the spectacle lenses of the spectacle fronts.

A spectacle apparatus kit of one or more of the claim B examples, wherein the at least two or more pairs of spectacle fronts include at least three, four, five, six or seven spectacle fronts.

A spectacle apparatus kit of one or more of the claim B examples, wherein the magnitude of the delta power is configured substantially different between the pairs of spectacle fronts within the kit and is at least different by 0.5 D.

A spectacle apparatus kit of one or more of the claim B examples, wherein the axis of the flattest half-meridian within the meridionally and azimuthally variant power distribution is configured substantially different between the pairs of spectacle fronts within the kit and is at least separated by 20 degrees.

A spectacle apparatus kit of one or more of the claim B examples, wherein the magnitude, and/or the axis of the flattest half-meridian, of the meridionally and azimuthally variant power distribution, is configured substantially different between the right and left lenses of the pairs of spectacle fronts within the kit.

A spectacle apparatus kit of one or more of the claim B examples, wherein the meridionally and azimuthally variant power distribution, is configured substantially different between the right and left lenses of the pairs of spectacle fronts within the kit.

A spectacle apparatus kit of one or more of the claim B examples, wherein the at least two pairs of spectacle fronts are configured to provide an appropriate stop signal to the myopic individual.

A spectacle apparatus kit of one or more of the claim B examples, wherein the myopic individual may have myopia with or without astigmatism.

A spectacle apparatus kit of one or more of the claim B examples, wherein the at least one region of the retina of the myopic eye includes a sub-foveal, para-foveal, foveal, sub-macular, macular or paramacular region on the retina.

A spectacle apparatus kit of one or more of the claim B examples, wherein the at least one region of the retina of the myopic eye includes at least 5 degrees of the visual field, 15 degrees of the visual field, or 30 degrees of the visual field.

A method of use of the spectacle apparatus kit of one or more of the claim B examples, wherein the at least two pairs of spectacle fronts are configured to provide a temporally and spatially varying induced conoid of partial blur.

A method of use of the spectacle apparatus kit of one or more of the claim B examples, wherein the temporally and spatially varying induced conoid of partial blur provides a stop signal to the myopic eyes of the individual.

A method of use of the spectacle apparatus kit of one or more of the claim B examples, wherein the axis of the flattest half-meridian of the meridionally and azimuthally varying power distribution in the at least two pairs of spectacle fronts is substantially different from each other and is at least separated by 20 degrees.

A method of use of the spectacle apparatus kit of one or more of the claim B examples, wherein the specific wearing care regime comprises of a prescribed set of pairs of spectacle fronts and an appropriate wearing schedule.

A method of use of the spectacle apparatus kit of one or more of the claim B examples, wherein the prescribed set of pairs of spectacle fronts comprises at least 2, 3, 4, 5, 6, or 7 pairs of spectacle fronts.

A method of use of the spectacle apparatus kit of one or more of the claim B examples, wherein the appropriate wearing schedule to wear the at least two pairs of spectacle fronts are separated at least by 2 hours, 4 hours, 6 hours, 8 hours, 12 hours, 1 day, 2 days, 3 days, 4 days, 5 days, 6 days, 1 week, 2 weeks, 3 weeks, or one month.

A method of use of the spectacle apparatus kit of one or more of the claim B examples, wherein the appropriate wearing schedule to wear the at least two pairs of spectacle fronts is identified by evaluating the rate of progression and/or risk factors associated with the myopic individual.

A method of use of the spectacle apparatus kit of one or more of the claim B examples, wherein the magnitude of the delta power is configured by evaluating the rate of progression and/or risk factors associated with the myopic individual.

Set of "C" Examples of Impermanent Auxiliary Optical Films

A spectacle apparatus kit for a myopic individual, and its methods of use, the kit including at least two or more pairs of impermanent auxiliary optical films, wherein each optical film is configured to cover a substantial region of a lens for the left eye and a substantial region of a lens for the right eye of the myopic individual, wherein each optical film is configured with one or more optical elements; wherein each optical element is configured with one or more meridionally and azimuthally variant power distributions, resulting in a delta power; wherein at least one of the meridionally and azimuthally variant power distribution is devoid of mirror symmetry; wherein the optical film used in juxtaposition with a pair of standard single vision spectacles, provides each eye, at least in part a foveal correction for the myopic eye and, at least in part, provides one or more regional conoids of partial blur at the retina of the myopic eye, serving as a directional cue or an optical stop signal; wherein the methods of use of the kit includes a set of instructions for the myopic individual comprising a specific wearing care regimen detailing the use of the impermanent auxiliary optical films.

A spectacle apparatus kit of one or more of the claim C examples, wherein each impermanent auxiliary optical film has a surface area that is at least 400 square mm, 800 square mm, 1200 square mm, 1600 square mm, 2000 square mm, 2400 square mm, or 2800 square mm.

A spectacle apparatus kit of one or more of the claim C examples, wherein each optical element has a surface area that is at least 5 mm$^2$, 10 mm$^2$, 15 mm$^2$, 20 mm$^2$, or 25 mm$^2$.

A spectacle apparatus kit of one or more of the claim C examples, wherein the magnitude of delta power of each optical element is at least 0.5 D, 0.75 D, +1 D, 1.25 D, 1.5 D or 1.75 D.

A spectacle apparatus kit of one or of the claim C examples, wherein the impermanent auxiliary optical film is configured on the anterior surface, posterior surface, or both surfaces of the spectacles.

A spectacle apparatus kit of one or more of the claim C examples, wherein the at least two or more pairs of impermanent auxiliary optical films include at least three, four, five, six or seven pairs of impermanent auxiliary optical films.

A spectacle apparatus kit of one or more of the claim C examples, wherein the magnitude of the delta power is configured substantially different between the pairs of impermanent auxiliary optical films within the kit and is at least different by 0.5 D.

A spectacle apparatus kit of one or more of the claim C examples, wherein the at least one or more optical elements within each impermanent auxiliary optical film include at least two, three, four, five, six optical elements.

A spectacle apparatus kit of one or more of the claim C examples, wherein the at least one or more optical elements within each impermanent auxiliary optical film include at least two, three, four, five, six optical elements; wherein each optical element has a surface area that is at least 5 mm$^2$, 10 mm$^2$, 15 mm$^2$, 20 mm$^2$, or 25 mm$^2$.

A spectacle apparatus kit of one or more of the claim C examples, wherein the axis of the flattest half-meridian within the meridionally and azimuthally variant power distribution is configured substantially different between the pairs of impermanent auxiliary optical films within the kit and is at least separated by 20 degrees.

A spectacle apparatus kit of one or more of the claim C examples, wherein the magnitude, and/or the axis of the flattest half-meridian, of the meridionally and azimuthally variant power distribution, is configured substantially different between the right and left lenses of the pairs of impermanent auxiliary optical films within the kit.

A spectacle apparatus kit of one or more of the claim C examples, wherein the meridionally and azimuthally variant power distribution, is configured substantially different between the right and left lenses of the pairs of impermanent auxiliary optical films within the kit.

A spectacle apparatus kit of one or more of the claim C examples, wherein the at least two pairs of impermanent auxiliary optical films are configured to provide an appropriate stop signal to the myopic individual.

A spectacle apparatus kit of one or more of the claim C examples, wherein the myopic individual may have myopia with or without astigmatism.

A spectacle apparatus kit of one or more of the claim C examples, wherein the at least one region of the retina of the myopic eye includes a sub-foveal, para-foveal, foveal, sub-macular, macular or paramacular region on the retina.

A spectacle apparatus kit of one or more of the claim C examples, wherein the at least one region of the retina of the myopic eye includes at least 5 degrees of the visual field, 15 degrees of the visual field, or 30 degrees of the visual field.

A method of use of the spectacle apparatus kit of one or more of the claim C examples, wherein the at least two pairs of impermanent auxiliary optical films are configured to provide one or more temporally and spatially varying conoid of partial blur.

A method of use of the spectacle apparatus kit of one or more of the claim C examples, wherein the one or more temporally and spatially varying conoid of partial blur provides a stop signal to the myopic eyes of the individual.

A method of use of the spectacle apparatus kit of one or more of the claim C examples, wherein the axis of the flattest half-meridian of the meridionally and azimuthally varying power distribution in the at least two pairs of impermanent auxiliary optical films is substantially different from each other and is at least separated by 20 degrees.

A method of use of the spectacle apparatus kit of one or more of the claim C examples, wherein the specific wearing care regimen comprises of a prescribed set of pairs of impermanent auxiliary optical films and an appropriate wearing schedule.

A method of use of the spectacle apparatus kit of one or more of the claim C examples, wherein the prescribed set of pairs of impermanent auxiliary optical films comprises at least 2, 3, 4, 5, 6, or 7 pairs of impermanent auxiliary optical films.

A method of use of the spectacle apparatus kit of one or more of the claim C examples, wherein the appropriate wearing schedule to wear the at least two pairs of impermanent auxiliary optical films are separated at least by 2 hours, 4 hours, 6 hours, 8 hours, 12 hours, 1 day, 2 days, 3 days, 4 days, 5 days, 6 days, 1 week, 2 weeks, 3 weeks, or one month.

A method of use of the spectacle apparatus kit of one or more of the claim C examples, wherein the appropriate wearing schedule to wear the at least two pairs of impermanent auxiliary optical films is identified by evaluating the rate of progression and/or risk factors associated with the myopic individual.

A method of use of the spectacle apparatus kit of one or more of the claim C examples, wherein the magnitude of the delta power is configured by evaluating the rate of progression and/or risk factors associated with the myopic individual.

A spectacle apparatus kit of one or more of the claim C examples, wherein the optical film may be configured on the spectacle lens using a desired thickness profile variation across the optical film.

A spectacle apparatus kit of one or more of the claim C examples, wherein the optical film may be glued onto the spectacle lens, is made to adhere with finger pressure to the spectacle lens, may be used as a sticker on one of the surfaces of the spectacle lens, may be used as a peel-able adhesive on one of the surfaces of the spectacle lens or a combination thereof.

A spectacle apparatus kit of one or more of the claim C examples, wherein the optical film when used in conjunction with the standard single vision spectacle lenses to provide one or more regional conoids of partial blur in at least one specific region of the retina.

A spectacle apparatus kit of one or more of the claim C examples, wherein the specific region on the retina may be a central, a nasal, a temporal, a superior, or an inferior portion of the retina.

A spectacle apparatus kit of one or more of the claim C examples, wherein the specific region on the retina may be within 10 degrees of the visual field, 15 degrees of the visual field, 20 degrees of the visual field, 25 degrees of the visual field.

A spectacle apparatus kit of one or more of the claim C examples, wherein the magnitude of the delta power is configured substantially different between the optical elements of the pairs of the optical films within the kit.

A spectacle apparatus kit of one or more of the claim C examples, wherein the magnitude, and/or the axis of the flattest half meridian, of the azimuthal and meridionally variant power distribution, is configured substantially different between the optical elements of the right and left optical films within the kit.

A spectacle apparatus kit of one or more of the claim C examples, wherein the at least two optical films are configured to provide an appropriate stop signal to the myopic individual.

A spectacle apparatus kit of one or more of the claim C examples, wherein the myopic individual may have myopia with or without astigmatism.

A method of use of the spectacle apparatus kit of one or more of the claim C examples, wherein the at least two optical films are configured to provide one or more temporally and spatially varying regional conoids of partial blur.

A method of use of the spectacle apparatus kit of one or more of the claim C examples, wherein the one or more temporally and spatially varying regional conoids of partial blur provide a stop signal to the myopic eyes of the individual.

A method of use of the spectacle apparatus kit of one or more of the claim C examples, wherein the at least two or more optical films are prescribed using an appropriate wearing schedule.

A method of use of the spectacle apparatus kit of one or more of the claim C examples, involving the following steps: (i) measure the shape and size of the wearer's own spectacle lenses and/or frame to determine the shape and the size of the impermanent auxiliary optical film; (ii) cut or punch-out the impermanent auxiliary optical film such that it substantially matches the shape of their spectacle lenses or frame; (ii) dispense in a form of a set or a kit that includes the multiple pairs of cut or punched-out individually tailored pairs of impermanent optical films comprising various permutations and combinations of sizes, shapes, designs and locations of one or more optical elements configured within the impermanent auxiliary optical film or sheet; and (iv) provide a set of instructions to comply with the specific care regimen.

Set of "D" Examples of Impermanent Auxiliary Mini Optical Elements

A spectacle apparatus kit for a myopic eye, and its methods of use, the kit including at least two impermanent auxiliary mini optical elements, wherein at least one mini optical element is configured to cover at least a region on a spectacle lens for the myopic eye, wherein each mini optical element is configured with one or more meridionally and azimuthally variant power distributions, resulting in a delta power; wherein at least one of the meridionally and azimuthally variant power distribution is devoid of mirror symmetry, wherein the at least one mini optical element used in juxtaposition to the spectacle lens, provides the myopic eye at least in part, a foveal correction, and provides at least in part, one or more regional conoids of partial blur at the retina; wherein the methods of use of the kit includes a specific wearing care regimen.

A spectacle apparatus kit of one or more of the claim D examples, wherein each mini optical element has a surface area that is at least 5 square mm, 10 square mm, 15 square mm, 20 square mm, or 25 square mm.

A spectacle apparatus kit of one or more of the claim D examples, wherein each mini optical element has a shape that is circular, non-circular, oval, or any other regular or irregular shape.

A spectacle apparatus kit of one or more of the claim D examples, wherein the magnitude of delta power of each mini optical element is at least 0.5 D, 0.75 D, 1 D, 1.25 D, 1.5 D or 1.75 D.

A spectacle apparatus kit of one or more of the claim D examples, wherein the at least two or more mini optical elements are of different types, wherein the different types mean having different meridionally and azimuthally variant power distributions.

A method of use of the spectacle apparatus kit of one or more of the claim D examples, wherein the mini optical elements are configured on the anterior surface, posterior surface, or both surfaces of the spectacles.

EXAMPLE D1: A method of use of the spectacle apparatus kit of one or more of the claim D examples, wherein the specific wearing care regimen includes a set of instructions, for an application of the mini optical elements on the spectacle lens, including at least the following steps; (i) a selection of at least the following parameters of the mini optical elements: the type, the surface area, the shape, or the delta power magnitude; (ii) a selection of at least one region of application; (iii) an arrangement on the spectacle lens; (iv) a selection of at least two time periods; wherein the application of the mini optical elements on the spectacle lens involves an execution of steps (i) to (iv).

A method of use of the spectacle apparatus kit of one or more of the claim D examples, wherein the specific wearing care regimen includes at least two time periods; wherein the at least two time periods may be separated by at least 2 hours, 4 hours, 6 hours, 8 hours, 12 hours, 1 day, 3 days, 5 days, 1 week, 2 weeks, 3 weeks, or 4 weeks.

A method of use of the spectacle apparatus kit of one or more of the claim D examples, wherein the arrangement on the spectacle lens includes a manner; wherein the manner includes arranging the axis of the flattest half meridian of the azimuthally and meridionally variant power distribution of the one or more mini optical elements such that the axis location is different between the at least two time periods.

A method of use of the spectacle apparatus kit of one or more of the claim D examples, wherein the one or more regional conoids of partial blur formed at the retina of the myopic eye serve as directional cue or an optical stop signal.

A method of use of the spectacle apparatus kit of one or more of the claim D examples, wherein the method provides the myopic eye with one or more regional conoids of partial blur for at least one or more regions on the retina.

A method of use of the spectacle apparatus kit of one or more of the claim D examples; wherein the method provides the myopic eye with a spatially and varying optical signal on the at least one region on the retina; wherein the spatially and varying optical signal provides a reduction of myopia progression that is substantially consistent over time.

A method of use of the spectacle apparatus kit of one or more of the claim D examples, wherein the axis of the flattest half-meridian within the meridionally and azimuthally variant power distributions is configured substantially different between the mini optical elements within the at least two time periods and is at least separated by 20 degrees.

A method of use of the spectacle apparatus kit of one or more of the claim D examples, wherein the type, the delta power magnitude, the shape, the surface area, the arrangement, the selected region of application on the spectacle lens, and/or the axis of the flattest half-meridian of the meridionally and azimuthally variant power distributions, is configured substantially different between the two or more of impermanent auxiliary mini optical elements within the at least two time periods.

A method of use of the spectacle apparatus kit of one or more of the claim D examples; wherein the execution of example claim described in example D1 includes consideration of the rate of progression and/or various risk factors of myopia progression.

A method of use of the spectacle apparatus kit of one or more of the claim D examples; wherein the execution of example claim described in example D1 includes consideration of a balanced visual performance while maintaining the optical signal to reduce the rate of myopia progression.

A method of use of the spectacle apparatus kit of one or more of the claim D examples; wherein the set of instructions includes the execution of example claim described in example D1 for a right myopic eye or a left myopic eye of an individual.

A spectacle apparatus kit of one or more of the claim D examples, wherein the myopic eye may have myopia with or without astigmatism.

A method of use of the spectacle apparatus kit of one or more of the claim D examples; wherein the at least one region of the retina of the myopic eye includes a sub-foveal, para-foveal, foveal, sub-macular, macular and/or paramacular region on the retina.

A method of use of the spectacle apparatus kit of one or more of the claim D examples; wherein the at least one region of the retina of the myopic eye includes at least 5 degrees of the visual field, 15 degrees of the visual field, or 30 degrees of the visual field.

A spectacle apparatus kit of one or more of the claim D examples, wherein the mini optical element may be configured on the spectacle lens using a desired thickness profile variation across the mini optical element.

A method of use of the spectacle apparatus kit of one or more of the claim D examples; wherein the set of instructions for the execution of example claim described in example D1 may include at least the following options (i) gluing onto the spectacle lens, (ii) made to adhere with finger pressure to the spectacle lens, (ii) may be used as a sticker on one of the surfaces of the spectacle lens, (iv) may be used as a peel-able adhesive on one of the surfaces of the spectacle lens, or a combination thereof.

A method of use of the spectacle apparatus kit of one or more of the claim D examples; wherein the set of instructions for repeating the execution of example claim described in example D1 at another subsequent time period may include at least the following options (i) use the edge of the mini optical element to aid in the removal or peel-off of the optical element from the spectacle lens, (ii) use of rubbing alcohol or similar cleaning liquid product to remove any residual glue or adhesive from the spectacle lens surface, (iii) repeat example claim described in example D1.

A method of use of the spectacle apparatus kit of one or more of the claim D examples; wherein the specific region on the retina may be a central, a nasal, a temporal, a superior, or an inferior portion of the retina.

The invention claimed is:

1. A spectacle apparatus kit for a myopic individual, the kit comprising at least a first pair and a second pair of optical films, wherein:
   the first and second pairs of optical films include first and second optical films that are configured to cover a substantial region of a standard single vision spectacle lens for the left eye of the myopic individual and third and fourth optical films that are configured to cover a substantial region of a standard single vision spectacle lens for the right eye of the myopic individual;
   each of the first, second, third and fourth optical films are impermanent auxiliary optical films and are configured with substantially plano power across the optical film;
   each of the first and second pairs of optical films include at least one optical film with a plurality of optical elements, at least one optical element of the plurality of optical elements configured with at least one meridionally and azimuthally variant power distributions, wherein:
   the at least one meridionally and azimuthally variant power distribution is different between at least one of: the first and second optical films, and the third and fourth optical films; and
   when the at least one optical film is used in juxtaposition with its respective single vision spectacle lens, covering the substantial region of the single vision spectacle lens, the combination of the single vision spectacle lens and the optical film provides at least one regional conoid of partial blur for a retina of a myopic eye of the myopic individual, for providing a directional cue or an optical stop signal to the myopic eye.

2. A spectacle apparatus kit of claim 1, wherein the at least one optical element configured with at least one meridionally and azimuthally variant power distribution has a surface area that is at least 3 square mm.

3. A spectacle apparatus kit of claim 1, wherein the at least one optical element configured with at least one meridionally and azimuthally variant power distribution has a shape that is circular or non-circular.

4. A spectacle apparatus kit of claim 1, wherein each of the optical films are configured to be placed on the anterior surface, posterior surface, or either the anterior surfaces or the posterior surface, of its respective standard single vision spectacle lens.

5. The spectacle apparatus kit of claim 1, wherein an axis of a flattest half-meridian within the meridionally and azimuthally variant power distributions is configured substantially different between the plurality of optical elements within the optical film and is at least separated by 20 degrees.

6. The spectacle apparatus kit of claim 1, wherein a type, a delta power magnitude, a shape, a surface area, an arrangement, a selected region of application on the single vision spectacle lens, or an axis of a flattest half-meridian of the meridionally and azimuthally variant power distributions of the plurality of optical elements, are configured substantially different between at least one of: the first and second optical films, and the third and fourth optical films.

7. A spectacle apparatus kit of claim 1, wherein the at least one meridionally and azimuthally variant power distribution is configured to provide the directional cue or optical stop signal over at least one region of the retina of the myopic eye that includes a sub-foveal, para-foveal, foveal, sub-macular, macular or paramacular region on the retina and wherein the at least one region on the retina may be a central, a nasal, a temporal, a superior, or an inferior portion of the retina; and wherein the at least one region of the retina of the myopic eye includes 10 degrees of the visual field.

8. A spectacle apparatus kit of claim 1 further comprising a set of instructions for the myopic individual comprising a specific wearing care regimen detailing the use of at least the first and second pairs of optical films.

9. The spectacle apparatus kit of claim 1, wherein the at least one meridionally and azimuthally variant power distribution is different between at least one of: the first and third optical films, and the second and fourth optical films.

10. The spectacle apparatus kit of claim 9, wherein the specific wearing care regimen comprises a wearing schedule for use of the first pair of optical films followed by use of the second pair of optical films.

11. The spectacle apparatus kit of claim 1, wherein the at least one meridionally and azimuthally variant power distribution comprises a variation in power of at least 0.75 D.

12. The spectacle apparatus kit of claim 11, wherein the wearing schedule specifies a time period of at least six hours between the use of the first pair of optical films and use of the second pair of optical films.

13. The spectacle apparatus kit of claim 1, wherein each of the first, second, third and fourth optical films include an adhesive.

14. The spectacle apparatus kit of claim 1, wherein each of the first, second, third and fourth impermanent auxiliary optical films are configured to adhere with figure pressure to the single vision spectacle lens.

\* \* \* \* \*